US009720185B2

(12) United States Patent
Halls et al.

(10) Patent No.: US 9,720,185 B2
(45) Date of Patent: Aug. 1, 2017

(54) SYSTEMS AND METHOD FOR PROCESSING OPTICAL CABLE ASSEMBLIES

(71) Applicants: ADC Telecommunications, Inc., Berwyn, PA (US); ADC Czech Republic, s.r.o., Brno (CZ)

(72) Inventors: Joel Halls, Faribault, MN (US); Scott Carlson, Bloomington, MN (US); Michael James Ott, Hudson, WI (US); Todd Curtis Strahl, Lakeville, MN (US); Jan Vozdecky, Brno (CZ); Francisco Gerardo Carrillo Velarde, El Paso, TX (US); Yu Lu, Eden Prairie, MN (US); Joseph Blaser, Shakopee, MN (US); Mark D. Narum, Minnetonka, MN (US)

(73) Assignees: CommScope Technologies LLC, Hickory, NC (US); ADC Czech Republic, S.R.O. (CZ)

( * ) Notice: Subject to any disclaimer, the term of this patent is extended or adjusted under 35 U.S.C. 154(b) by 145 days.

(21) Appl. No.: 14/718,850

(22) Filed: May 21, 2015

(65) Prior Publication Data
US 2015/0338582 A1 Nov. 26, 2015

Related U.S. Application Data

(60) Provisional application No. 62/002,514, filed on May 23, 2014, provisional application No. 62/057,522, filed on Sep. 30, 2014.

(51) Int. Cl.
*G02B 6/245* (2006.01)
*G02B 6/25* (2006.01)
(Continued)

(52) U.S. Cl.
CPC .......... *G02B 6/3846* (2013.01); *G02B 6/245* (2013.01); *G02B 6/25* (2013.01); *G02B 6/2553* (2013.01);
(Continued)

(58) Field of Classification Search
CPC ...... G02B 6/385; G02B 6/2553; G02B 6/245; G02B 6/2555; G02B 6/25; G02B 6/2558; G02B 6/3803; A47B 37/00
(Continued)

(56) References Cited

U.S. PATENT DOCUMENTS 1,668,072 A * 5/1928 Hearne .................... B25H 1/00
108/64
2,027,962 A 1/1936 Currie
(Continued)

FOREIGN PATENT DOCUMENTS

CA 2 354 718 A1 3/2002
DE 195 17 750 A1 11/1996
(Continued)

OTHER PUBLICATIONS

"Considerations for Optical Fiber Termination," AEN 89, Revision 3, Corning Cable Systems LLC, pp. 1-7 (Copyright 2008).
(Continued)

*Primary Examiner* — Robert B Davis
(74) *Attorney, Agent, or Firm* — Merchant & Gould P.C.

(57) ABSTRACT

A processing system to connectorize optical cables includes processing stations on a table arrangement; and a track arrangement. The processing stations include: a strip-clean-cleave station that creates prepared ends of cable fibers and stub fibers; a splice station that fusion splices the prepared ends of cable and stub fibers; an overmold station that injection molds hubs around the splices; a UV cure station and a heat cure station for the injection molding; and a
(Continued)

connector assembly station at which an optical connector is assembled at an end of each optical cable.

29 Claims, 40 Drawing Sheets

(51) Int. Cl.
G02B 6/255 (2006.01)
G02B 6/38 (2006.01)
A47B 37/00 (2006.01)

(52) U.S. Cl.
CPC .......... *G02B 6/2558* (2013.01); *G02B 6/385* (2013.01); *G02B 6/3803* (2013.01); *Y10T 83/242* (2015.04)

(58) Field of Classification Search
USPC .................. 108/50.11, 64; 425/DIG. 201
See application file for complete search history.

(56) References Cited

U.S. PATENT DOCUMENTS

| | | | |
|---|---|---|---|
| 3,086,242 A | 4/1963 | Cook et al. | |
| 3,597,372 A | 8/1971 | Cook | |
| 3,777,048 A | 12/1973 | Traut | |
| 4,220,394 A | 9/1980 | Tardy | |
| 4,389,428 A | 6/1983 | McDuffee et al. | |
| 4,410,469 A | 10/1983 | Katagiri et al. | |
| 4,410,561 A | 10/1983 | Hart, Jr. | |
| 4,598,974 A | 7/1986 | Munn et al. | |
| 4,662,307 A | 5/1987 | Amos et al. | |
| 4,711,752 A | 12/1987 | Deacon et al. | |
| 4,798,431 A | 1/1989 | Clark et al. | |
| 4,877,303 A | 10/1989 | Caldwell et al. | |
| 4,877,306 A | 10/1989 | Kar | |
| 4,902,095 A | 2/1990 | Baker et al. | |
| 4,920,366 A | 4/1990 | Bowen et al. | |
| 4,964,688 A | 10/1990 | Caldwell et al. | |
| 5,022,735 A | 6/1991 | Dahlgren | |
| 5,034,170 A | 7/1991 | Briggs, Jr. et al. | |
| 5,040,867 A | 8/1991 | de Jong et al. | |
| 5,042,901 A | 8/1991 | Merriken et al. | |
| 5,046,813 A | 9/1991 | Itoh et al. | |
| 5,093,048 A | 3/1992 | Kagan | |
| 5,127,820 A | 7/1992 | Briggs, Jr. et al. | |
| 5,222,171 A | 6/1993 | Straus | |
| 5,241,613 A | 8/1993 | Li et al. | |
| 5,263,105 A | 11/1993 | Johnson et al. | |
| 5,309,536 A | 5/1994 | Suganuma et al. | |
| 5,317,663 A | 5/1994 | Beard et al. | |
| 5,367,594 A | 11/1994 | Essert et al. | |
| 5,375,183 A | 12/1994 | Edwards et al. | |
| 5,465,313 A | 11/1995 | Belenkiy et al. | |
| 5,495,545 A | 2/1996 | Cina et al. | |
| 5,582,671 A | 12/1996 | Harman et al. | |
| 5,677,976 A | 10/1997 | Takahashi | |
| 5,748,819 A | 5/1998 | Szentesi et al. | |
| 5,815,619 A | 9/1998 | Bloom | |
| 5,832,162 A | 11/1998 | Sarbell | |
| 5,909,528 A | 6/1999 | Tamekuni et al. | |
| 5,963,692 A | 10/1999 | Marazzi et al. | |
| 5,963,698 A | 10/1999 | Brugger et al. | |
| 6,068,410 A | 5/2000 | Giebel et al. | |
| 6,120,193 A | 9/2000 | Luther et al. | |
| 6,122,936 A * | 9/2000 | Csipkes ............. G02B 6/2551 65/485 |
| 6,152,609 A | 11/2000 | Dzyck et al. | |
| 6,173,097 B1 | 1/2001 | Throckmorton et al. | |
| 6,179,482 B1 | 1/2001 | Takizawa et al. | |
| 6,186,672 B1 | 2/2001 | Takizawa et al. | |
| 6,247,850 B1 | 6/2001 | Edwards et al. | |
| 6,340,249 B1 | 1/2002 | Hayes et al. | |
| 6,419,810 B1 | 7/2002 | Tanaka et al. | |
| 6,439,780 B1 | 8/2002 | Mudd et al. | |
| 6,498,888 B1 | 12/2002 | Chenard et al. | |
| 6,503,422 B2 | 1/2003 | Chudoba et al. | |
| 6,520,689 B2 | 2/2003 | DeMartino et al. | |
| 6,532,327 B1 | 3/2003 | Gatica et al. | |
| 6,550,279 B1 | 4/2003 | Anderson et al. | |
| 6,648,520 B2 | 11/2003 | McDonald et al. | |
| 6,715,933 B1 | 4/2004 | Zimmer et al. | |
| 6,719,927 B2 | 4/2004 | Sakurai et al. | |
| 6,726,370 B2 | 4/2004 | Shimotsu | |
| 6,728,452 B2 | 4/2004 | Nishimura | |
| 6,738,552 B2 | 5/2004 | Hirsch | |
| 6,742,936 B1 | 6/2004 | Knecht et al. | |
| 6,811,323 B2 | 11/2004 | Murray et al. | |
| 6,827,508 B2 | 12/2004 | Stowe | |
| 6,840,687 B2 | 1/2005 | Riis et al. | |
| 6,856,748 B1 | 2/2005 | Elkins, II et al. | |
| 6,908,236 B2 | 6/2005 | Oishi et al. | |
| 6,918,703 B2 | 7/2005 | Chen et al. | |
| 6,962,446 B2 | 11/2005 | Greub et al. | |
| 6,964,288 B2 * | 11/2005 | Christopher ............. B08B 3/12 156/367 |
| 6,964,578 B2 | 11/2005 | Clark et al. | |
| 6,979,133 B2 | 12/2005 | Montena | |
| 7,016,592 B2 | 3/2006 | Elkins, II et al. | |
| 7,088,893 B2 | 8/2006 | Cooke et al. | |
| 7,090,406 B2 | 8/2006 | Melton et al. | |
| 7,104,702 B2 | 9/2006 | Barnes et al. | |
| 7,140,786 B2 | 11/2006 | Takayanagi et al. | |
| 7,209,629 B2 * | 4/2007 | Bianchi ................. G02B 6/381 385/134 |
| 7,216,512 B2 | 5/2007 | Danley et al. | |
| 7,220,061 B2 | 5/2007 | De Marchi | |
| 7,264,402 B2 | 9/2007 | Theuerkorn et al. | |
| 7,264,410 B1 | 9/2007 | Doss et al. | |
| 7,298,941 B2 | 11/2007 | Palen et al. | |
| 7,329,049 B2 | 2/2008 | Meek et al. | |
| 7,507,031 B2 | 3/2009 | Kawasaki | |
| 7,572,065 B2 | 8/2009 | Lu et al. | |
| 7,594,764 B2 | 9/2009 | Palmer et al. | |
| 7,628,549 B2 | 12/2009 | Takahashi et al. | |
| 7,708,476 B2 | 5/2010 | Liu | |
| 7,744,286 B2 | 6/2010 | Lu et al. | |
| 7,744,288 B2 | 6/2010 | Lu et al. | |
| 7,756,370 B2 | 7/2010 | Hayasaka | |
| 7,762,726 B2 | 7/2010 | Lu et al. | |
| 7,764,402 B2 | 7/2010 | Kakutani et al. | |
| 7,860,363 B2 | 12/2010 | Kawasaki | |
| 7,920,278 B2 * | 4/2011 | Nygaard ............. G01B 11/028 356/625 |
| 7,929,123 B2 * | 4/2011 | Caveney ................. G01M 11/35 356/43 |
| 7,942,590 B2 | 5/2011 | Lu et al. | |
| 8,041,166 B2 | 10/2011 | Kachmar | |
| 8,043,013 B2 | 10/2011 | Lichoulas et al. | |
| 8,939,654 B2 | 1/2015 | Lu et al. | |
| 9,016,953 B2 | 4/2015 | Ott et al. | |
| 2001/0017963 A1 | 8/2001 | Shimotsu | |
| 2002/0044749 A1 | 4/2002 | Koike et al. | |
| 2002/0064354 A1 * | 5/2002 | Ware ...................... G02B 6/245 385/95 |
| 2002/0131720 A1 | 9/2002 | Chudoba et al. | |
| 2002/0146214 A1 | 10/2002 | Tanaka et al. | |
| 2003/0000257 A1 * | 1/2003 | Chang ................... G02B 6/245 65/425 |
| 2003/0007774 A1 | 1/2003 | Christopher et al. | |
| 2003/0044143 A1 | 3/2003 | Trentelman et al. | |
| 2004/0047566 A1 | 3/2004 | McDonald et al. | |
| 2004/0062480 A1 | 4/2004 | Cronk et al. | |
| 2004/0151437 A1 | 8/2004 | Marrs et al. | |
| 2005/0042387 A1 | 2/2005 | Dower | |
| 2005/0063664 A1 | 3/2005 | Huang | |
| 2005/0175308 A1 | 8/2005 | Elkins, II et al. | |
| 2005/0213891 A1 | 9/2005 | Hardcastle et al. | |
| 2005/0238292 A1 | 10/2005 | Barnes et al. | |
| 2005/0276549 A1 | 12/2005 | Tabata et al. | |
| 2005/0276558 A1 | 12/2005 | Bianchi et al. | |
| 2006/0002662 A1 | 1/2006 | Manning et al. | |
| 2006/0078264 A1 | 4/2006 | Lauzier et al. | |
| 2006/0103039 A1 | 5/2006 | Shields et al. | |

(56) References Cited

U.S. PATENT DOCUMENTS

| | | |
|---|---|---|
| 2006/0233506 A1 | 10/2006 | Noonan et al. |
| 2007/0014526 A1 | 1/2007 | Lazo |
| 2007/0110371 A1 | 5/2007 | Zimmel et al. |
| 2007/0274657 A1 | 11/2007 | Billman et al. |
| 2008/0069500 A1 | 3/2008 | Harness et al. |
| 2008/0095504 A1 | 4/2008 | Kawasaki |
| 2008/0131056 A1 | 6/2008 | Isenhour et al. |
| 2008/0159701 A1 | 7/2008 | Honma |
| 2008/0193089 A1 | 8/2008 | Miyamoto et al. |
| 2008/0219624 A1 | 9/2008 | Pimpinella et al. |
| 2009/0162019 A1 | 6/2009 | Lichoulas et al. |
| 2010/0124394 A1 | 5/2010 | Meek et al. |
| 2010/0129031 A1 | 5/2010 | Danley et al. |
| 2010/0266242 A1 | 10/2010 | Lu et al. |
| 2010/0266244 A1 | 10/2010 | Lu et al. |
| 2010/0272397 A1 | 10/2010 | Komaki et al. |
| 2010/0284653 A1 | 11/2010 | Tamekuni et al. |
| 2010/0290741 A1 | 11/2010 | Lu et al. |
| 2010/0303425 A1 | 12/2010 | Liu |
| 2010/0322568 A1 | 12/2010 | Zimmel et al. |
| 2011/0002586 A1 | 1/2011 | Nhep |
| 2011/0097432 A1 | 4/2011 | Yu et al. |
| 2011/0103753 A1 | 5/2011 | Wouters |
| 2011/0173817 A1 | 7/2011 | Barnes et al. |
| 2011/0176774 A1 | 7/2011 | Barnes et al. |
| 2011/0176780 A1 | 7/2011 | Barnes et al. |
| 2011/0188813 A1 | 8/2011 | Marcouiller et al. |
| 2011/0226019 A1 | 9/2011 | Huang et al. |
| 2011/0280525 A1 | 11/2011 | Marcouiller et al. |
| 2012/0141082 A1* | 6/2012 | Sawicki ............... G02B 6/25 385/134 |
| 2012/0177328 A1 | 7/2012 | Marcouiller et al. |
| 2012/0219258 A1 | 8/2012 | Grandidge et al. |
| 2012/0243832 A1 | 9/2012 | Tamekuni et al. |
| 2012/0288238 A1 | 11/2012 | Park et al. |
| 2013/0008594 A1 | 1/2013 | Takeuchi et al. |
| 2013/0136857 A1 | 5/2013 | Blanchetiere et al. |
| 2013/0195409 A1 | 8/2013 | Endo et al. |
| 2014/0064665 A1 | 3/2014 | Ott et al. |
| 2014/0086534 A1 | 3/2014 | Lu et al. |
| 2014/0124140 A1 | 5/2014 | Verheyden et al. |
| 2014/0321813 A1 | 10/2014 | Lu |

FOREIGN PATENT DOCUMENTS

| | | |
|---|---|---|
| EP | 0 125 398 A1 | 11/1984 |
| EP | 1 122 564 A2 | 8/2001 |
| GB | 2 148 537 A | 5/1985 |
| JP | 61-9612 | 1/1986 |
| JP | 7-234344 | 9/1995 |
| JP | 8-234042 | 9/1996 |
| JP | 8-262271 | 10/1996 |
| JP | 11-287929 | 10/1999 |
| JP | 2002-82257 | 3/2002 |
| JP | 2008-116840 | 5/2008 |
| JP | 2011-95410 | 5/2011 |
| TW | 571134 | 1/2004 |
| TW | 592934 | 6/2004 |
| WO | WO 01/27673 | 4/2001 |
| WO | WO 2004/028993 A1 | 4/2004 |
| WO | WO 2006/032153 A1 | 3/2006 |
| WO | WO 2009/011799 A1 | 1/2009 |
| WO | WO 2010/090211 A1 | 8/2010 |
| WO | WO 2011/087941 A1 | 7/2011 |
| WO | WO 2011/087942 A1 | 7/2011 |
| WO | WO 2011/087944 A1 | 7/2011 |
| WO | WO 2012/005407 A1 | 1/2012 |

OTHER PUBLICATIONS

FuseConnect™ Fusion Spliced Field-terminated SC Connector, AFL Telecommunications, 6 pages (Copyright 2007).

Abe, K. et al., "Modal interference in a short fiber section: fiber length, splice loss, cutoff, and wavelength dependences," *Optical Fiber Communication Conference*, p. 139, No. ThA3 (Feb. 1991).

De Jong, M., "Cleave and crimp fiber optic connector for field installation," *Optical Fiber Communication Conference*, 1990 Technical Digest Series, vol. 1, Conference Edition, 3 pages (Jan. 1990).

Duff, D.G. et al., "Measurements of modal noise in single-mode lightwave systems," *Conference on Optical Fiber Communication*, Paper No. TU01, 5 pages (Feb. 1985).

FuseConnect™ ST Installation & Assembly Instructions, 14 pages (Mar. 2, 2011).

Goodwin, J.C. et al., "Modal Noise in Short Fiber Sections," *Journal of Lightwave Technology*, vol. 9, No. 8, pp. 954-958 (Aug. 1991).

Harris, D. et al., "Azimuthal Dependence of Modal Interference in Closely Spaced Single-Mode Fiber Joints," *IEEE Photonics Technology Letters*, vol. 6, No. 10, pp. 1235-1237 (Oct. 1994).

Harris, D.O. et al., "Characterizing Modal Interference in Field Installable Single-Mode Fiber Connectors Incorporating Short Fiber Stubs," *Technical Digest—Symposium on Optical Fiber Measurements*, NIST Special Publication 864, pp. 35-38 (Sep. 1994).

Heckmann, S., "Modal noise in single-mode fibres operated slightly above cutoff," *Electronics Letters*, vol. 17, No. 14, pp. 499-500 (Jul. 1981).

International Search Report and Written Opinion for PCT/US2013/026904 mailed Aug. 14, 2013.

Li, M-J. et al., "Optical Fiber Design for Field Mountable Connectors," *Journal of Lightwave Technology*, vol. 18, No. 3, pp. 314-319 (Mar. 2000).

Lynx2 CustomFit® MPO Splice-On Connector, http://www.sumitoelectric.com/products/fusionsplicers/lynx_mpo/, 2 pages (Copyright 2011).

Ohzawa, K. et al., "Development of new optical fiber fusion splicer for factory use,"*International Wire & Cable Symposium Proceedings*, pp. 644-649 (1999).

Olson, G. et al., "Modal Noise in Single-Mode Fiber-Optic Systems with Closely Spaced Splices," *Fiber and Integrated Optics*, vol. 9, pp. 237-244 (1990).

Partial International Search for PCT/US2013/026904 mailed May 31, 2013.

Throckmorton, R. et al., "Modal Interference in Field Installable Single-Mode Fiber-Optic Connectors," *Proc. 10th National Fiber Optic Engineers Conference*, vol. 3, pp. 399-406 (1994).

Yablon, Andrew D., "Optical Fusion Splicing" Section 6.6.1; 5 pp., 2005.

International Search Report and Written Opinion for Application No. PCT/US2015/032095 mailed Sep. 8, 2015.

\* cited by examiner

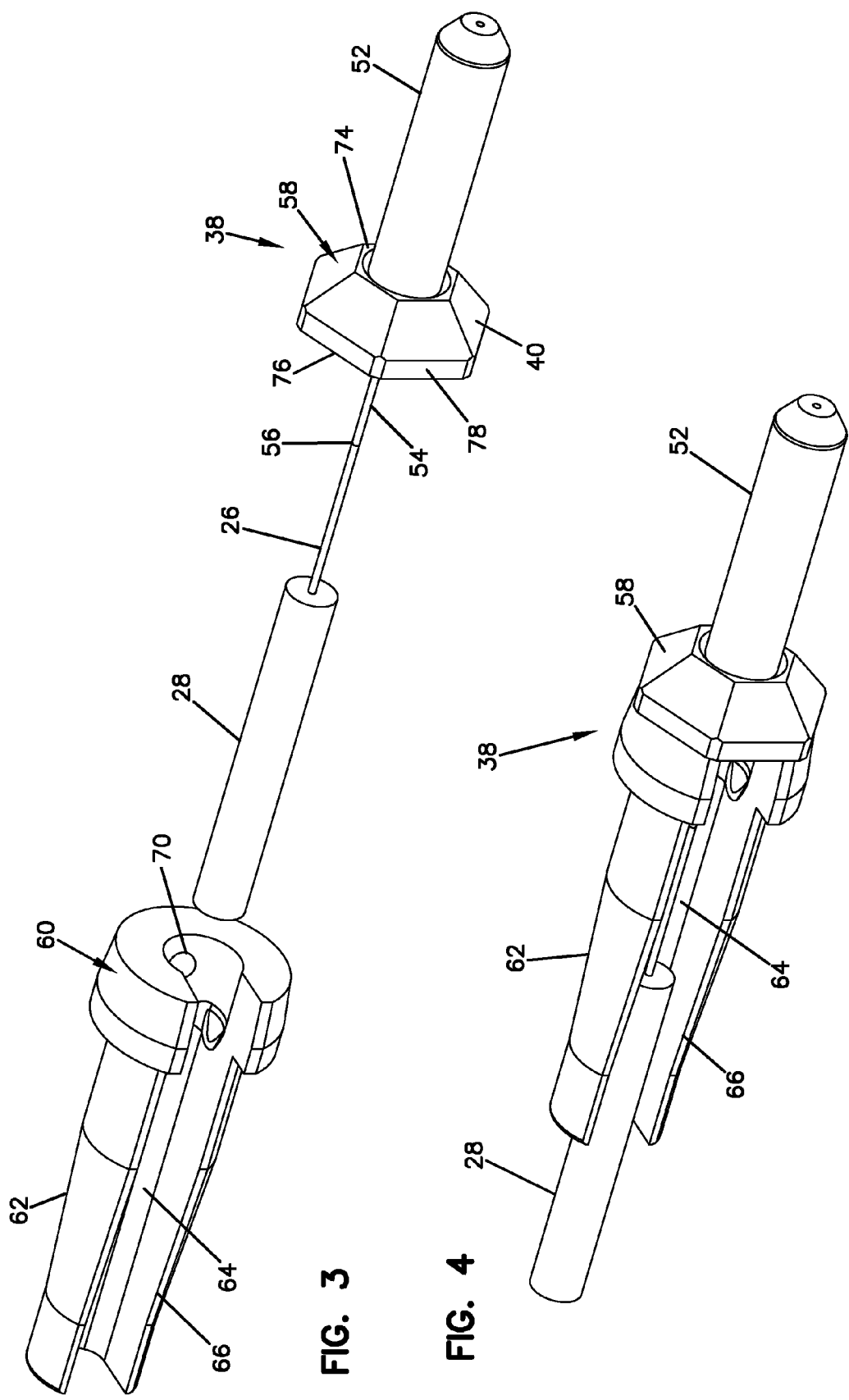

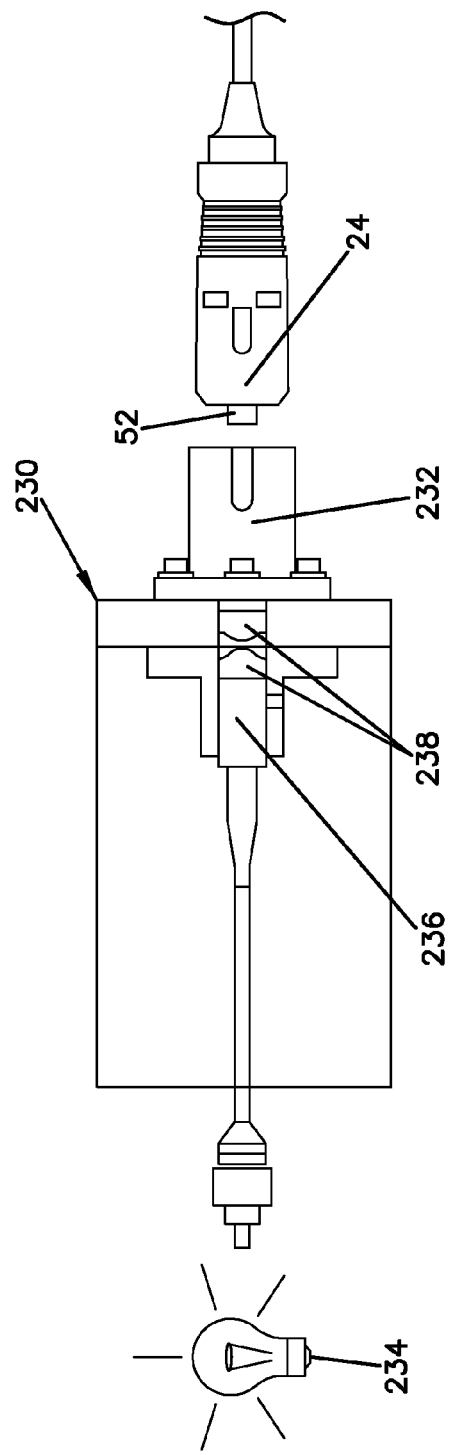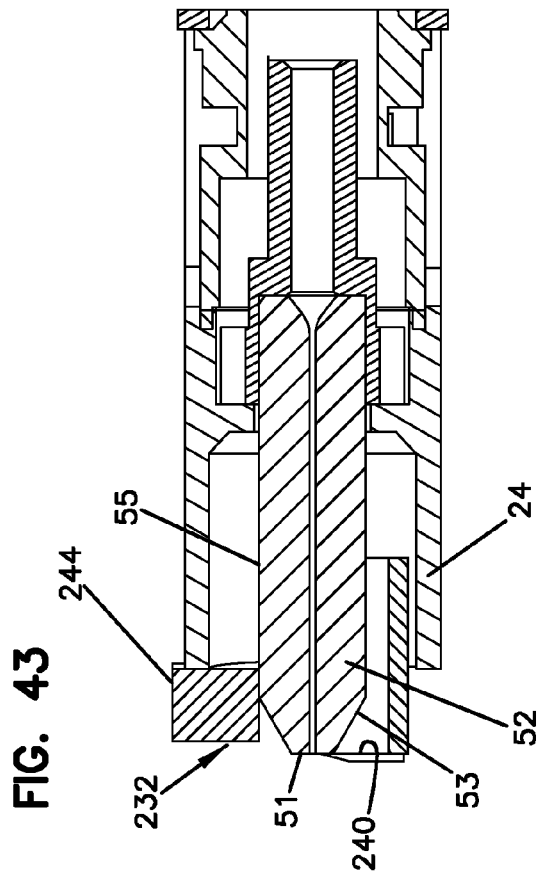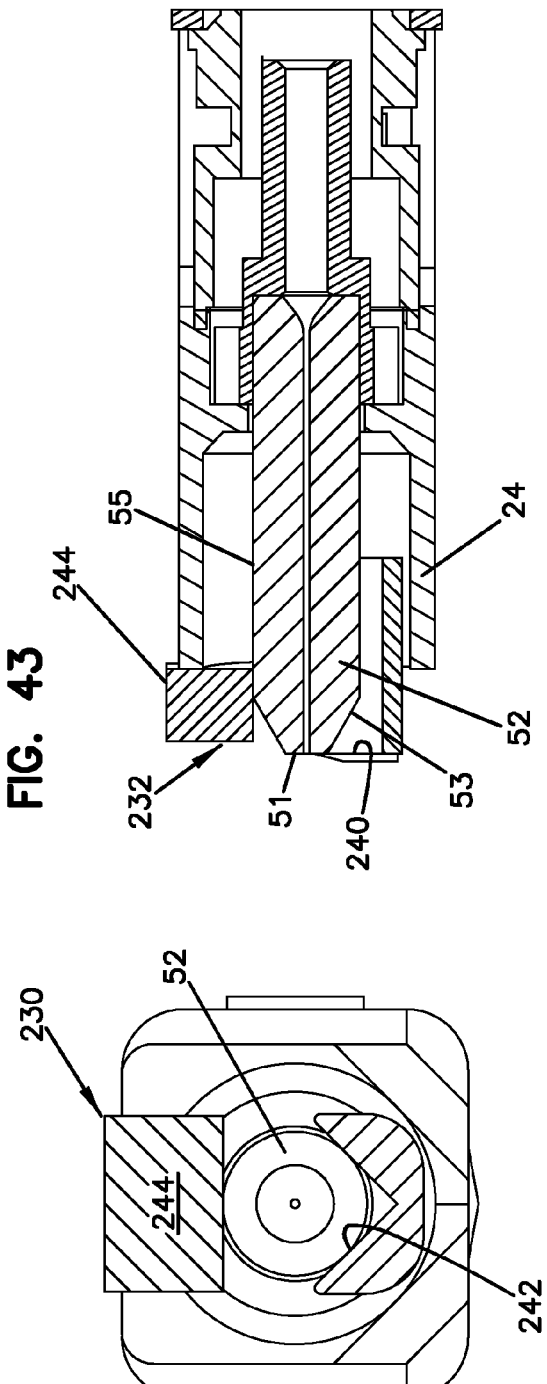
FIG. 41
FIG. 42
FIG. 43

SYSTEMS AND METHOD FOR PROCESSING OPTICAL CABLE ASSEMBLIES

CROSS REFERENCE TO RELATED APPLICATIONS

This application claims the benefit of U.S. Provisional Application No. 62/002,514, filed May 23, 2014, and titled "Systems and Method for Processing Optical Cable Assemblies," and U.S. Provisional Application No. 62/057,522, filed Sep. 30, 2014, and titled "Systems and Method for Processing Optical Cable Assemblies," the disclosures of which are hereby incorporated herein by reference in their entirety.

BACKGROUND

Modern optical devices and optical communications systems widely use fiber optic cables having optical fibers. Optical fibers are strands of glass fiber processed so that light beams transmitted through the glass fiber are subject to total internal reflection so that a large fraction of the incident intensity of light directed into the fiber is received at the other end of the fiber. Optical fibers usually have one or more coatings, for example a polymer coating made of acrylate or polyimide, to protect the surface of the fiber from chemical or mechanical damage.

To effect optical coupling, the end of each fiber is commonly presented for mating in a polished ferrule. A polished ferrule assembly is most readily prepared in a controlled setting wherein precision equipment and skilled personnel are available for cleaving the fiber, terminating the cleaved fiber in a ferrule, and polishing the ferrule and fiber to exacting tolerances. Alternatively, an end of an optical fiber cable can be optically coupled to a fiber stub that has already been terminated and polished in a ferrule. Several steps, including stripping, cleaving, and assembling, are implemented to terminate the optical fibers to stub fibers. These steps consume time and resources.

Improvements are desired.

SUMMARY

In accordance with some aspects of the disclosure, a processing system to connectorize optical cables includes a table arrangement on which a plurality of processing stations are disposed; and a track arrangement that is disposed above the table arrangement and from which coils of the optical cables to be connectorized are hung. The processing stations include: a strip-clean-cleave station configured to process optical fibers at the end of the optical cables to create a prepared end of the optical fiber; a splice station configured to fusion splice the prepared ends of the optical fibers to prepared ends of stub fibers at a splice location; an overmold station configured to injection mold a hub around each splice location; a UV cure station at which UV light is directed towards the hubs to cure the injection mold; a heat cure station including an oven configured to receive the ends of the optical cables to finish curing the injection mold; and a connector assembly station at which an optical connector is assembled around each hub.

In certain implementations, the processing stations also include a non-contact testing station including a receptacle to receive each assembled optical connector; and a light source to direct light into the assembled connector to determine coupling loss of the optical cable.

In certain implementations, the table arrangement includes a main table and a separate table. The strip-clean-cleave station is disposed at the main table. The splice station is disposed at the separate table.

In certain implementations, the table arrangement includes a first processing line and a second processing line. The first processing line includes the splice station, the overmold station, the UV cure station, the heat cure station, and the connector assembly station. The second processing line includes a second splice station, a second overmold station, a second UV cure station, a second heat cure station, and a second connector assembly station. In an example, the first and second processing lines share the strip-clean-cleave station. In an example, the first processing line includes the non-contact testing station and the second processing line includes a second non-contact testing station.

In certain examples, the table arrangement is U-shaped including two arm sections extending from a base section. The strip-clean-cleave station is located at the base section. Each of the processing lines extends along part of the base section and along a separate one of the arm sections. In certain examples, the track arrangement includes a first track disposed over the first processing line and a second track disposed over the second processing line.

In some implementations, a second strip-clean-cleave station is disposed at a separate location from the table arrangement. The second strip-clean-cleave station is configured to prepare an end of a fiber stub extending from a ferrule.

In certain implementations, a carrier is configured to transport a plurality of processed fiber stubs from the second strip-clean-cleave station to the table arrangement. The carrier inhibits contamination of the processed fiber stubs. In certain examples, the carrier defines a plurality of cavities in which the processed fiber stubs can be loaded. The carrier is configured to retain the ferrules holding the processed fiber stubs and to not contact bare glass of the processed fiber stubs. In an example, the carrier is configured to receive the processed stub fibers with dust caps mounted over the ferrules. In an example, the carrier is configured to transport at least fifty processed stub fibers.

In certain implementations, the overmold station also performs tensile testing on the splice location.

In certain implementations, the UV cure station includes a chamber recessed within the table arrangement.

In accordance with other aspects of the disclosure, a strip-clean-cleave arrangement is configured to prepare an end of an optical fiber that is retained by a holder. The strip-clean-cleave arrangement includes a body at which a plurality of sub-stations are disposed; a walking beam configured to automatically transport the optical fiber between the sub-stations from an input end to an output end using the holder; and a control unit configured to automatically operate the sub-stations and the walking beam during an operation cycle. The sub-stations include a load sub-station at the input end of the body; a strip sub-station at which a coating is removed from the optical fiber; a clean sub-station at which remnants of the coating are removed from the optical fiber by an ultrasonic bath; a cleave sub-station at which an end of the optical fiber is severed to form a prepared end of the optical fiber; and an unload sub-station at the output end of the body.

In certain implementations, the cleave-substation includes a tension cleaver to sever the end of the optical fiber.

In certain implementations, the clean sub-station includes two docks at each of which a separate optical fiber can be received at the ultrasonic bath. In certain examples, each of the docks is configured to angle the optical fiber relative to a vibrating floor of the ultrasonic bath. In certain examples, the clean sub-station is structured so that the end of the optical fiber touches a vibrating floor of the ultrasonic bath during operation of the clean-substation.

In certain implementations, the clean sub-station includes a leveler arrangement that maintains a level of cleaning fluid within the ultrasonic bath. In certain examples, the leveler arrangement includes a leveler tank that drains to a supply tank, a siphon that extends between the leveler tank and the ultrasonic bath, and a piston that pumps water into the leveler tank.

In certain implementations, the load and unload sub-stations are configured to move between inner and outer positions. The load and unload sub-stations are in range of the walking beam when in the respective inner positions and the are accessible to a user when in the respective outer position.

In certain implementations, a guard arrangement is coupled to the body to at least partially surround the sub-stations. The guard arrangement defines apertures through which the load and unload stations are accessible. In certain examples, the guard arrangement includes a light curtain extending across the apertures. Breaking the light curtain triggers the control unit to pause operation of the walking beam.

In certain implementations, at least one of the sub-stations includes a presence sensor for the holder. The at least one of the sub-stations operates during the operation cycle of the strip-clean-cleave arrangement only if a presence of the holder is detected by the presence sensor.

In certain implementations, the load sub-station also includes a heating unit configured to straighten a jacket disposed around the optical fiber.

In accordance with other aspects of the disclosure, an overmold tool including a base; an overmold fixture mounted to the base at a fixed location; and a holder fixture including a main plate and a plurality of holder mounts that are separately slidable relative to the main plate. The overmold fixture defines cavities that are sized and shaped to receive and axially retain ferrules of optical cable assemblies. The main plate is configured to releasably mount to the base. Each of the holder mounts is aligned with a respective one of the cavities. Each of the holder mounts is biased away from the respective cavity.

In certain implementations, each holder mount is configured to receive a cable holder secured to one of the optical cable assemblies. Each holder mount applies tension to a splice location of the respective optical cable assembly.

In certain implementations, the holder fixture includes a tensioning arrangement that enables a user to selectively increase a biasing force being applied to the holder mounts.

In certain implementations, each cavity is sized to receive a hub shell in alignment with the respective ferrule. In an example, the cavities are backlit by a light source and diffuser.

In accordance with other aspects of the disclosure, a holder includes a body; a cover mounted to the body to pivot between an open position and a closed position; and a retention arrangement. The body defines a V-groove extending inwardly from a first end of the body. The cover retains an optical fiber in the V-groove when disposed in the closed position. The retention arrangement holds the optical fiber within the V-groove without directly contacting the optical fiber.

In some implementations, the optical fiber is a stub fiber held by a ferrule. The retention arrangement includes a platform at the first end of the body against which a hub of the ferrule seats. The platform defines an aperture through which the stub fiber extends outwardly form the body. In an example, the body defines a cavity and the cover defines an aperture that aligns with the cavity. The cavity and aperture cooperate to accommodate a dust cap mounted to a ferrule. In other implementations, part of the optical fiber is disposed within a cable jacket. The body includes a clamp arrangement spaced along the V-groove from the cover. The clamp arrangement is configured to hold a jacketed portion of the optical fiber.

In accordance with other aspects of the disclosure, a processing method for an optical fiber includes loading a plurality of optical fibers into respective holders; mounting a first of the holders at an input end of a strip-clean-cleave station of a processing cell; triggering the strip-clean-cleave station to operate; loading a second of the holders at the input end of the strip-clean-cleave station during a first operation cycle; loading a third of the holders at the input end of the strip-clean-cleave station during a second operation cycle; loading a fourth of the holders at the input end of the strip-clean-cleave station during a third operation cycle; loading a fifth of the holders at the input end of the strip-clean-cleave station during a fourth operation cycle; loading a sixth of the holders at the input end of the strip-clean-cleave station during a fifth operation cycle; and retrieving the first holder from an output end of the strip-clean-cleave station during the fifth operation cycle.

In certain implementations, each operation cycle includes a first part and a second part. The first part of each operation cycle includes automatically conveying any holders within the strip-clean-cleave station to a subsequent sub-station. The second part of each operation cycle includes automatically operating at least one of the sub-stations.

In some implementations, the processing method also includes placing the first holder in a gravity feed arrangement. In other implementations, the processing method includes removing the fiber stub and optical ferrule from the first holder; mounting the fiber stub and optical ferrule to a carrier; and transporting the carrier to a table arrangement of a processing cell.

In accordance with other aspects of the disclosure, a holder includes a body defining a V-groove extending inwardly from a first end; a cover mounted to the body to pivot between an open position and a closed position; and a retention arrangement that holds the optical fiber within the V-groove without directly contacting the optical fiber. The cover is configured to aid in retaining the optical fiber in the V-groove when disposed in the closed position.

In some implementations, the optical fiber is a stub fiber held by a ferrule. In some such implementations, the retention arrangement includes a platform at the first end of the body against which a hub of the ferrule seats. The platform defines an aperture through which the stub fiber extends outwardly form the body. In certain examples, the cover presses the ferrule into the V-groove, thereby holding the fiber in the V-groove. In certain examples, the body defines a cavity and the cover defines an aperture that aligns with the cavity. The cavity and aperture cooperate to accommodate a dust cap mounted to a ferrule.

In other implementations, part of the optical fiber is disposed within a cable jacket. In some such implementations, the body includes a clamp arrangement spaced along the V-groove from the cover. The clamp arrangement is configured to hold a jacketed portion of the optical fiber. In certain examples, the clamp arrangement is spaced inwardly from a second end of the body. In an example, the clamp arrangement is disposed adjacent the cover.

In accordance with other aspects of the disclosure, an overmold tool includes a base; an overmold fixture mounted to the base at a fixed location; and a holder fixture including a main plate and a plurality of holder mounts that are separately slidable relative to the main plate. The overmold fixture defines cavities that are sized and shaped to receive and axially retain ferrules of optical cable assemblies. The main plate is configured to releasably mount to the base. Each of the holder mounts is aligned with a respective one of the cavities. Each of the holder mounts is biased away from the respective cavity.

In certain examples, each holder mount is configured to receive a cable holder secured to one of the optical cable assemblies and to apply tension to a splice location of the respective optical cable assembly. In certain examples, the holder fixture includes a tensioning arrangement that enables a user to selectively increase a biasing force being applied to the holder mounts.

In accordance with other aspects of the disclosure, a fusion splice method includes disposing a stub fiber and an optical fiber at the fusion splice tool so that an end of the stub fiber is located a distance of no more than 10 µm from an end of the optical fiber; applying a first electrical arc to the ends of the stub fiber and optical fiber for no more than about 40 ms; moving the ends of the stub fiber and optical fiber together until the ends overlap by no more than 10 µm; and applying a second electrical arc to the ends of the stub fiber and optical fiber for no more than about 2500 ms.

In certain examples, the distance between the end of the stub fiber and the end of the optical fiber is no more than about 7 µm. In certain examples, the first electrical arc is applied for no more than about 30 ms. In an example, the first electrical arc is applied for no more than about 20 ms.

In certain examples, the first electrical arc has an intensity of at least 2 mA less than a default value calibrated by the fusion splice tool. In certain examples, the first electrical arc has an intensity of at least 3 mA less than a default value calibrated by the fusion splice tool. In an example, the first electrical arc has an intensity of at least 3.7 mA less than a default value calibrated by the fusion splice tool.

In certain examples, the second electrical arc is applied for no more than 2200 ms. In an example, the second electrical arc is applied for about 2000 ms. In certain examples, the second electrical arc has an intensity of at least 0.5 mA greater than a default value calibrated by the fusion splice tool. In certain examples, the ends overlap by no more than 8 µm.

In accordance with other aspects of the disclosure, a non-contact testing tool includes a light source; a receptacle configured to receive an optical connector to be tested; and a launching arrangement including a launching fiber and a lens arrangement. The receptacle includes a V-groove sized to receive a ferrule of the optical connector to be tested and a pressure foot to press the ferrule into the V-groove. In certain examples, the receptacle also includes a ferrule stop that contacts an end face of the ferrule. The launching fiber carries light from the light source to the lens arrangement. The lens arrangement directs the light from the launching fiber to the receptacle in alignment with an optical ferrule of the optical connector to be tested when the optical connector to be tested is received at the ferrule.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 3 is a perspective view of an example ferrule assembly of the cable assembly of FIG. 1 with a ferrule hub shown axially exploded;

FIG. 4 is a perspective view of the ferrule assembly of FIG. 3 shown assembled;

FIG. 41 is a schematic view of an example non-contact testing station suitable for use in the processing cell of FIG. 7;

FIG. 42 is an end view of an optical connector to be tested received at a receptacle of the non-contact testing station of FIG. 41 with portions of the receptacle being visible; and FIG. 43 is an axial-cross-sectional view of the optical connector and partial receptacle of FIG. 42.

DETAILED DESCRIPTION

Figure 1:
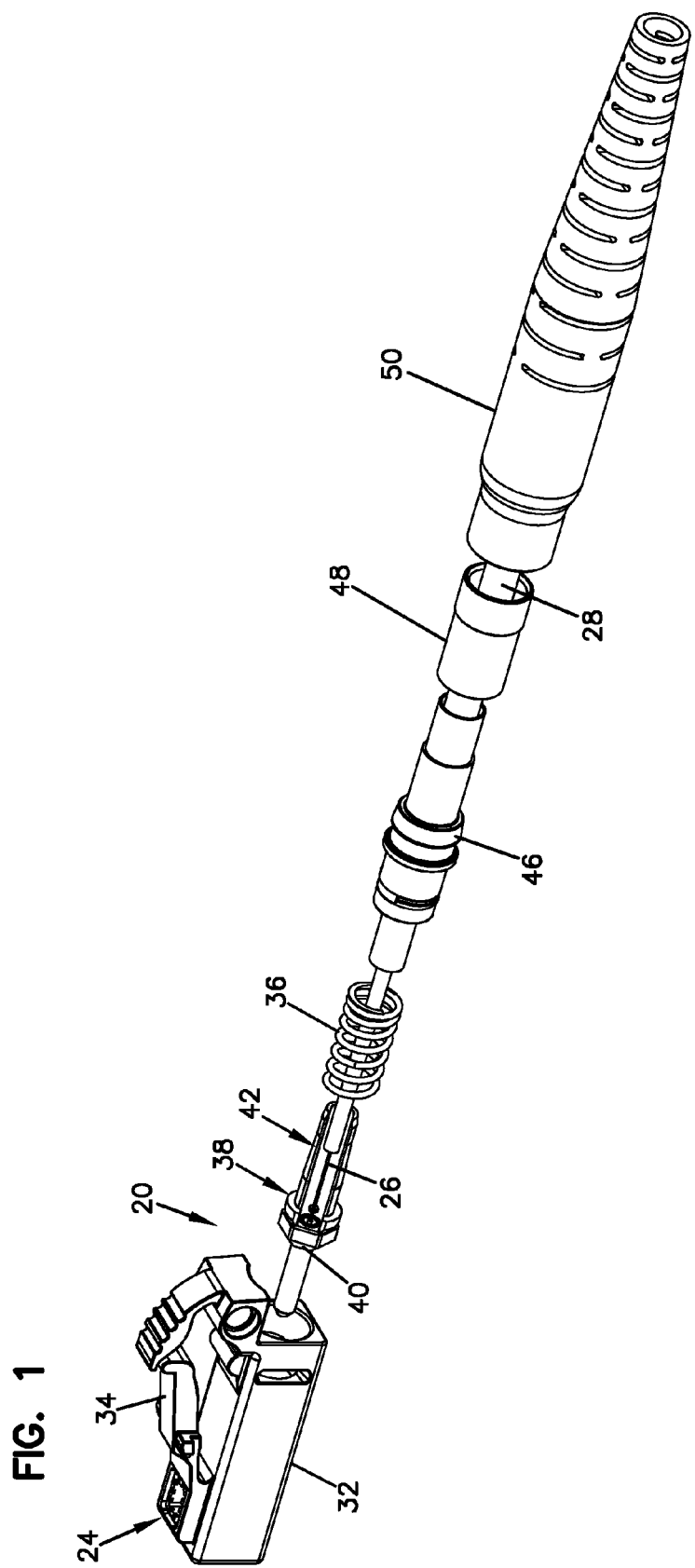
FIG. 1 is a perspective view of an example cable assembly including an optical connector shown axially exploded along an optical cable.

Reference will now be made in detail to exemplary aspects of the present disclosure that are illustrated in the accompanying drawings. Wherever possible, the same reference numbers will be used throughout the drawings to refer to the same or like parts.

The present disclosure relates generally to systems and methods for processing (e.g., making, manufacturing, assembling, etc.) a fiber optic cable assembly. In certain examples, the fiber optic cable assembly includes a fiber optic cable and a fiber optic connector mounted at an end of the fiber optic cable. In certain examples, the fiber optic cable includes at least one optical fiber, and the fiber optic connector includes an optical fiber stub that is spliced to the optical fiber of the fiber optic cable. In certain examples, the optical fiber stub is supported within a ferrule. In certain examples, the optical splice is protected within a hub formed at least in part by a curable material that is molded over the spliced location.

In certain examples, the fiber optic cable assembly is processed at a processing cell having various processing stations. In certain examples, the processing stations can include a strip, clean, cleave station for stripping, cleaning, and cleaving the optical fiber of the fiber optic cable. In certain examples, the processing cell can include a splice station for splicing the optical fiber stub of the connector to the stripped, cleaned, and cleaved end of the optical fiber of the fiber optic cable. In certain examples, the processing cell also can include an overmold station for overmolding the hub over the splice location, a UV curing station for initially curing the overmolded hub using UV radiation, a heating station for further curing the overmolded hub via heat, and a connector assembly station for assembling various components of the fiber optic connector to the end of the fiber optic cable. In still other examples, the processing station can include one or more inspection stations for performing testing (e.g., non-contact testing) of the fiber optic cable assemblies.

In certain examples, the processing cell can include a custom table arranged to facilitate efficient processing of the fiber optic cable assemblies. In certain examples, the table can have a U-shaped configuration. In certain examples, the processing cell can include a cable management track for managing and moving coiled/spooled portions of the fiber optic cables as the fiber optic cable assemblies are processed at the various stations of the processing cell. In certain examples, the cable management track can include one or more tracks arranged in unending loops. In certain examples, the tracks can be mounted aerially above the work table and can extend along paths that coincide with the shape of the work table. In certain examples, the work table can be configured such that the splice station is isolated from the remainder of the stations to minimize vibration during splicing. In certain examples, processing of the stub fibers can be performed at a strip-clean-cleave station that is separate from the processing cell. In certain examples, custom optical fibers stub handlers can be used to efficiently and safely transfer optical fiber stubs from the optical fiber stub strip-clean-cleave station to the processing cell.

Figure 2:
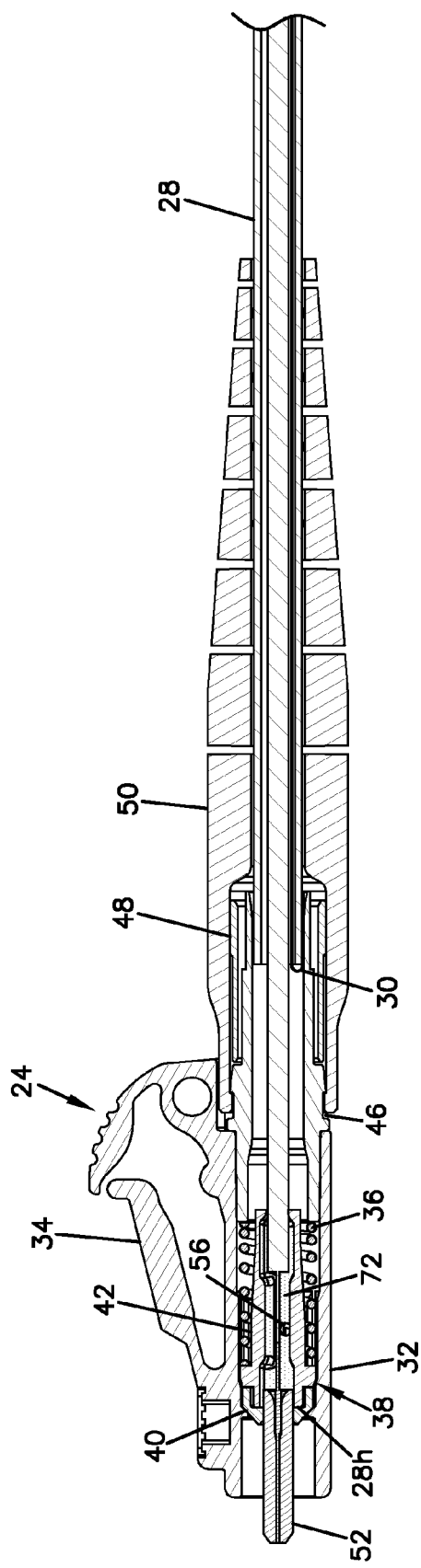
FIG. 2 is an axial cross-section of the cable assembly of FIG. 1 shown assembled.

FIGS. 1 and 2 show one example fiber optic cable assembly 20 that can be made using systems, methods, and equipment in accordance with the principles of the present disclosure. The fiber optic cable assembly 20 is shown including a fiber optic cable 22 and a fiber optic connector 24 mounted to one end of the fiber optic cable 22. The fiber optic connector 24 is depicted as having an LC-style form factor, but it will be appreciated that the various aspects of the present disclosure are also applicable to the manufacture of other styles of connectors such as SC connectors, FC connectors, and hardened connectors (e.g., DLX™ fiber optic connectors sold by TE Connectivity and OptiTap™ Fiber Optic Connectors sold by Corning Cable Systems).

Referring still to FIGS. 1 and 2, the fiber optic cable 22 includes an optical fiber 26 contained within a protective outer jacket 28. The fiber optic cable 22 also includes a mechanical reinforcing structure 30 (e.g., a tensile reinforcing structure such as aramid yarn, fiberglass or cable stiffeners such as fiber reinforced epoxy rods, metal rods, or other strength members) that prevent stress from being applied to the optical fiber 26.

The fiber optic connector 24 of the fiber optic cable assembly 20 includes a main connector body 32 having an integrated mechanical latching arrangement 34. The fiber optic connector 24 also includes a spring 36 for biasing a ferrule assembly 38 in a forward direction such that a chamfered section 40 of a hub 42 of the ferrule assembly 38 nests against a seat 44 formed within the interior of the main connector body 32. The fiber optic connector 24 further includes a rear housing 46 that retains the spring within the main connector body 32. The fiber optic connector 24 also includes a crimp sleeve 48 for securing the reinforcing structure 30 of the fiber optic cable 22 to the rear housing 46, and a flexible boot 50 that provides strain relief and fiber bend radius control at the cable-to-connector interface.

FIGS. 3 and 4 show the ferrule assembly 38 in isolation from the remainder of the fiber optic connector 24. The ferrule assembly 38 includes a ferrule 52 supporting an optical fiber stub 54. As shown at FIGS. 1 and 2, the optical fiber stub 54 is fusion spliced to the optical fiber 26 of the fiber optic cable 22 at a splice location 56. The hub 42 mounts to a rear end of the ferrule 52 and covers the splice location 56. The hub 42 includes a front hub portion 58 and a rear hub portion 60. The front hub portion 58 can be pre-formed on the ferrule 52 prior to splicing of the optical fiber stub 54 to the optical fiber 26 and prior to installation of the rear hub portion 60 over the splice location 56. The front hub portion 58 can include a relatively hard, polymeric construction and can define the chamfered section 40 of the hub 42.

The rear hub portion 60 includes an outer hub shell 62 defining an interior cavity 64. The outer hub shell 62 includes an axial/longitudinal slot 66 that allows the outer hub shell 62 to be inserted laterally over the optical fiber stub 54 and the optical fiber 26 at the splice location 56 after the optical fiber stub 54 has been spliced to the optical fiber 26. The outer hub shell 62 also includes a port 70 for allowing the outer hub shell 62 to be filled with an overmold material (e.g., a UV curable material, a hot melt material, a thermoplastic material, an epoxy material, a thermal set material, or other materials). The overmold material 72 is not shown at FIGS. 3 and 4, but is depicted at FIG. 2. The outer hub shell 62 can function as a mold for shaping the overmold material 72 about the splice location 56 and along lengths of the optical fiber 26 and the optical fiber stub 54. The outer hub shell 62 remains a permanent part of the hub 42 after the overmold material 72 has been injected therein.

The front hub portion 58 can be overmolded on the ferrule 52 or otherwise mounted on the ferrule 52. As shown at FIGS. 3 and 4, the front hub portion 58 includes a front end 74 and a rear end 76. The rear end 76 is forwardly offset from a rear end of the ferrule 52 such that the rear end of the ferrule 52 projects rearwardly from the rear end 76 of the front hub portion 58. In certain examples, the front hub portion 58 is made of a harder, more rugged material than the overmold material 72. The front hub portion 58 can include a series of flats 78 used for indexing or otherwise rotationally positioning the ferrule assembly 38 in the main connector body 32. Indicia can be provided on one of the flats 78 so as to indicate a tuned position of the optical fiber stub 54 within the ferrule 52. In this way, the ferrule assembly 38 can be rotationally oriented within the main connector body 32 taking tuning into consideration. The chamfered section 40 of the hub 42 is defined by the front end 74 of the front hub portion 58. The front hub portion 58 can be secured on the ferrule 52 prior to the stripping, cleaning, cleaving, active alignment, and splicing operations. In this way, the front hub portion 58 can be used to facilitate handling of the ferrule assembly 38 during such operations.

In certain examples, the outer hub shell 62 abuts against the rear end 76 of the front hub portion 58. The outer hub shell 62 can receive the rear end of the ferrule 52 and can include internal clearance for allowing the overmold material 72 to surround and bond to the rear end of the ferrule 52. In certain examples, the outer hub shell 62 is a molded, polymeric part such as an injection molded part. The outer hub shell 62 can be made of material that is harder and more durable/robust than the overmold material 72 so as to reinforce the rear hub portion 60 and to protect and contain the overmold material 72. In the case where the overmold material 72 is UV curable, the outer hub shell 62 can be manufactured of a material that is transmissive with respect to UV light such that the overmold material 72 can be cured by transmitting UV light/radiation through the outer hub shell 62.

Further details about other types of fiber optic cable assemblies, fiber optic connectors, ferrule assemblies and other structures suitable for processing in accordance with the principles of the present disclosure are disclosed at International Application No. PCT/US2013/026904, which is hereby incorporated by reference in its entirety.

Figure 5:
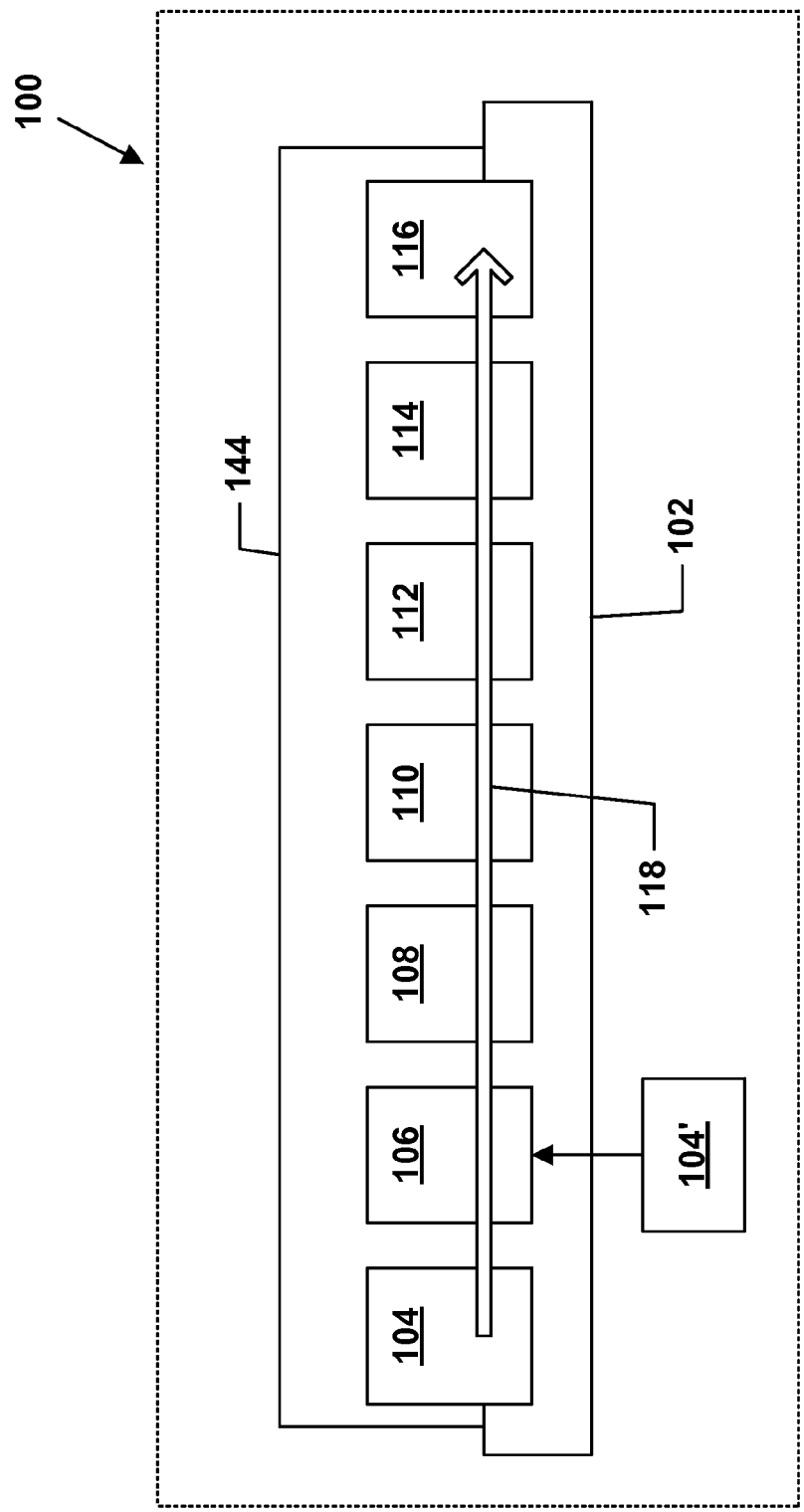
FIG. 5 is a schematic diagram of an example processing cell by which the cable assembly of FIG. 1 can be processed and assembled.

FIG. 5 shows a processing cell 100 in accordance with the principles of the present disclosure for processing a fiber optic cable assembly, such as the fiber optic cable assembly 20. In one example, the processing cell 100 includes a table arrangement 102 supporting and coordinating a plurality of processing stations. In one example, the processing stations can include a strip-clean-cleave station 104, a splice station 106, an overmold station 108, a UV cure station 110, a heat cure station 112, a connector assembly station 114, and a non-contact test station 116. Fibers 26 of optical fiber cables 22 and/or stubs 54 of optical ferrules 52 move between the stations in a processing line 118.

During processing, a spool of a cable 22 being processed is suspended over the table arrangement 102 and an end of the cable 22 to be processed ends downwardly towards the table arrangement 102. For example, a track 144 can be disposed above the table arrangement 102. A hook or hanger can be coupled to the track 144 to hold the cable spool or coiled cable. The cable 22 is initially suspended above the strip-clean-cleave station 104 while the end of the cable 22 is being processed. As the cable end moves through the various stations, the hook or hanger is slid along the track 144 above the stations. After testing, the spool is removed from the hook corresponding to the track 144, and the hook is loaded with a new cable spool and moved back to a position generally above the strip-clean-cleave station 104 for processing of the new fiber optic cable 22.

It will be appreciated that the strip-clean-cleave station 104 is configured for automatically stripping, cleaning and cleaving the ends of the optical fibers 26 of the fiber optic cables 22. The strip-clean-cleave station 104 can be highly automated to enhance the speed of the strip, clean and cleave operations. In certain examples, the ends of the optical fibers 26 can be supported in customized holders (e.g., clips) that are used to facilitate handling of the optical fibers 26 during the stripping, cleaning, and cleaving operations. In certain examples, an automated conveying device (e.g., a walking beam system having a three-dimensional range of movement) can be used to handle the customized holders and to move the customized holders through the various processing regions of the strip-clean-cleave station 104 as will be discussed in more detail herein.

In certain examples, the strip-clean-cleave station 104 is configured to strip, clean, and cleave the optical fibers 26 of the fiber optic cables 22. In certain examples, the strip-clean-cleave station 104 is configured to strip, clean, and cleave the optical fiber stubs 54 corresponding to the ferrules 52. In other examples, however, a separate strip-clean-cleave station 104' is configured to strip, clean, and cleave the optical fiber stubs 54 corresponding to the ferrules 52. In the example shown, the separate strip-clean-cleave station 104' is located at a separate location from the table arrangement 102. In other examples, the separate strip-clean-cleave station 104' can be located on the table arrangement 102. In still other examples, the processing cell 100 can work in combination with another processing cell (not shown) including a strip-clean-cleave station 104' suitable for stripping, cleaning, and cleaving the optical fiber stubs 54 corresponding to the ferrules 52.

The fiber stub strip-clean-cleave station 104' prepares the optical fiber stubs 54 for splicing to the optical fibers 26 of the fiber optic cable 22. It will be appreciated that the strip-clean-cleave station 104' for processing the optical fiber stubs 54 can operate in a manner similar to the strip-clean-cleave station 104 for processing the optical fiber 26. Once the optical fiber stubs 54 have been processed at the fiber stub strip-clean-cleave station 104', the processed optical fiber stubs 54 and their corresponding ferrules 52 can be loaded into a customized carrier 80 (FIG. 6) configured for transferring a relatively large number of the ferrules 52 and their corresponding optical fiber stubs 54 (e.g., at least 10, at least 25, at least 50, or at least 100) from the fiber stub strip-clean-cleave station 104' to the splice station 106 (e.g., at the table arrangement 102).

It will be appreciated that the carrier 80 can be configured for protecting and preventing contact with the processed ends of the optical fiber stubs 54. Additionally, in transit, polished ends of the ferrules 52 can be protected by dust caps. The customized carriers 80 can be configured to facilitate carrying a plurality of the optical fiber stubs 54 and their corresponding ferrules 52 from the fiber stub strip-clean-cleave station 104' to the fusion splice stations 106 of the processing cell 100. The customized carriers 80 may facilitate transporting the processed fiber stubs 54 while inhibiting contamination of the processed ends of the stubs 54.

Figure 6:
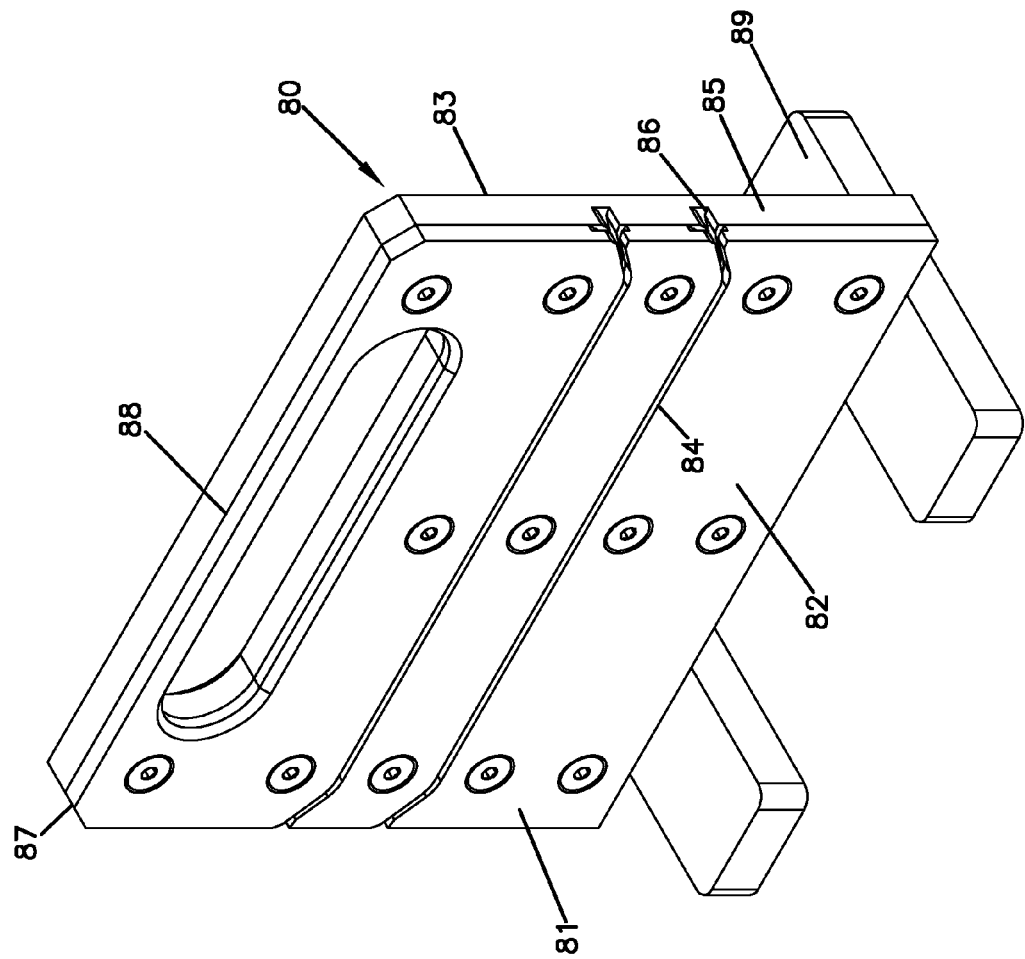
FIG. 6 is an example carrier suitable for holding one or more optical ferrules coupled to stub fibers.

FIG. 6 shows one example carrier 80 suitable for transporting the optical stubs 54. The carrier 80 includes a body 82 defining one or more cavities 86 in which the ferrules 52 can be retained. In certain examples, the cavity 86 is sized to receive the ferrule 52 with a dust cap mounted thereon. In certain examples, the body 82 defines multiple cavities 86 that hold the ferrules 52 generally parallel to each other. In certain examples, the carrier body 82 includes a handle 88 for carrying the body 82. In certain examples, the carrier body 82 includes feet 89 or other support members to enable the body 82 to seat on a surface, such as the table arrangement 102.

In some implementations, the carrier body 82 has opposite sides 81, 83 that extend between a first end 85 and a second end 87 of the body 82. In certain implementations, each cavity 86 extends between the first and second ends 85, 87 so that the first and second ends 85, 87 define access openings to the cavity 86. In certain implementations, a slot 84 extends from each cavity to the first side 81 of the body 82. In some examples, the ferrule 52 is oriented in the cavity so that the stub 54 extends out of the ferrule 52 through the slot 84. In certain examples, the slot 84 is sufficiently long that the stub 54 is recessed into the slot 84 relative to the first side 81. In certain examples, the dust cap disposed over the ferrule 52 faces towards a closed end of the cavity 86, which faces towards the second side 83.

In some implementations, the cavities 86 are profiled to hold the ferrule assemblies 38 without contacting the processed ends of the stub fibers 54. In certain implementations, the cavities 86 are profiled to inhibit axial movement of the ferrules 52 and/or stubs 54. In certain examples, the cavities 86 can be profiled to retain the front hub portion 58 of the ferrules 52 (e.g., see FIG. 6). In certain examples, the ferrules 52 are sequentially inserted into the cavity 86 from the first or second end 85, 87 of the body 82 so that the stubs 54 are aligned in a row. In certain examples, the ferrules 52 are sequentially removed from the cavity 86 from the first or second end 85, 87 of the body 82. In certain examples, the cavities 86 curve or taper upwardly at the ends 85, 87 to inhibit the ferrules 52 from exiting the cavities 86 through the ends 85, 87.

In certain examples, the strip-clean-cleave stations 104, 104' can process optical fibers 26 and stubs 54 at a rate that is about twice as fast as the other operations performed at the various stations 106, 108, 110, 112, 114, and 116 within the processing cell 100. Thus, in certain examples, one strip-clean-cleave station 104 is provided at a central location of the processing cell 100 and two separate processing lines 118a, 118b branch out from the strip-clean-cleave station 104. Each of the processing lines 118a, 118b includes a separate fusion splice station 106a, 106b, an overmold station 108a, 108b, a UV cure station 110a, 110b, a heat cure station 112a, 112b, a connector assembly station 114a, 114b, and a non-contact test station 116a, 116b.

Figure 7:
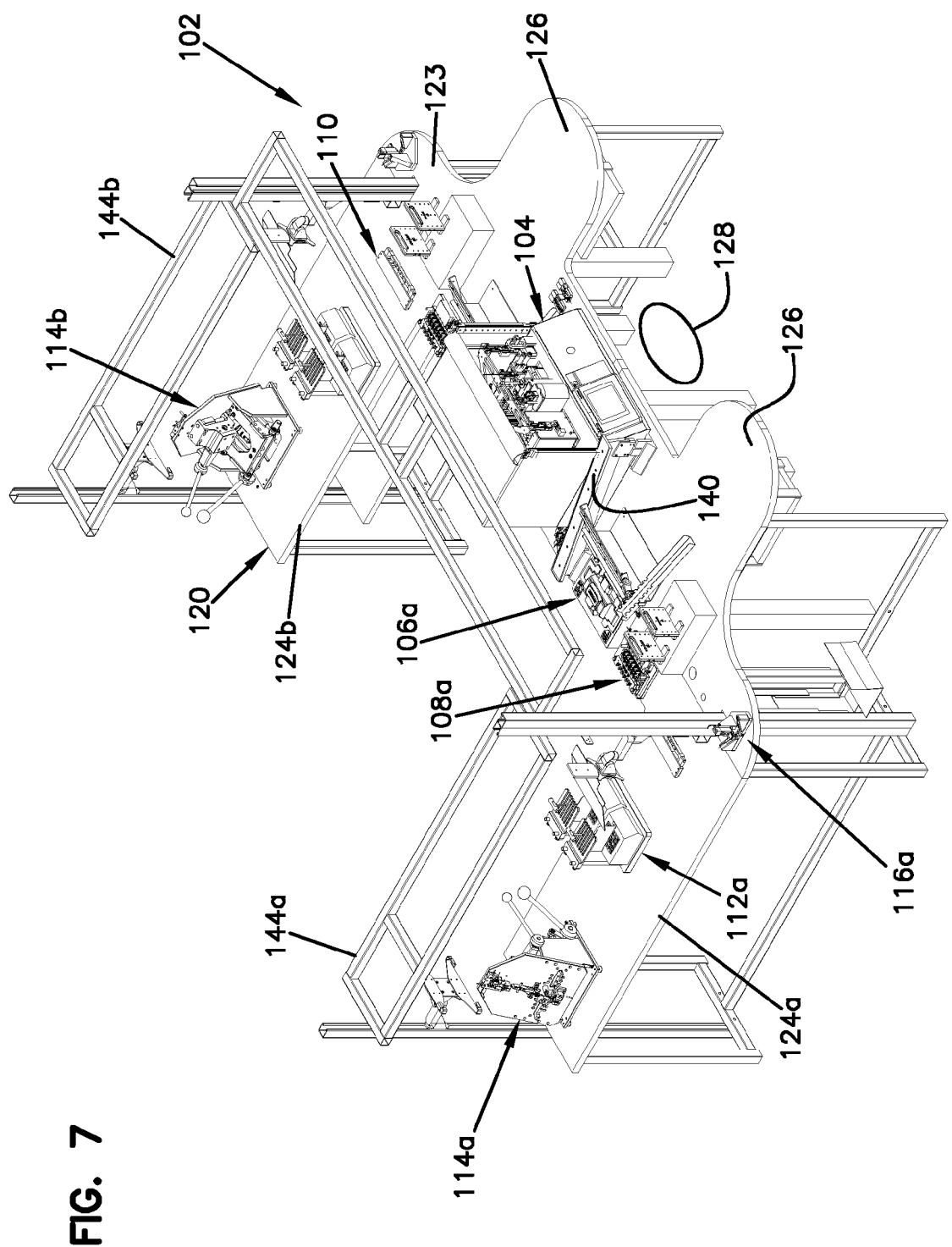
FIG. 7 is a perspective view of an example table arrangement implementing one example processing cell of FIG. 5.
Figure 8:
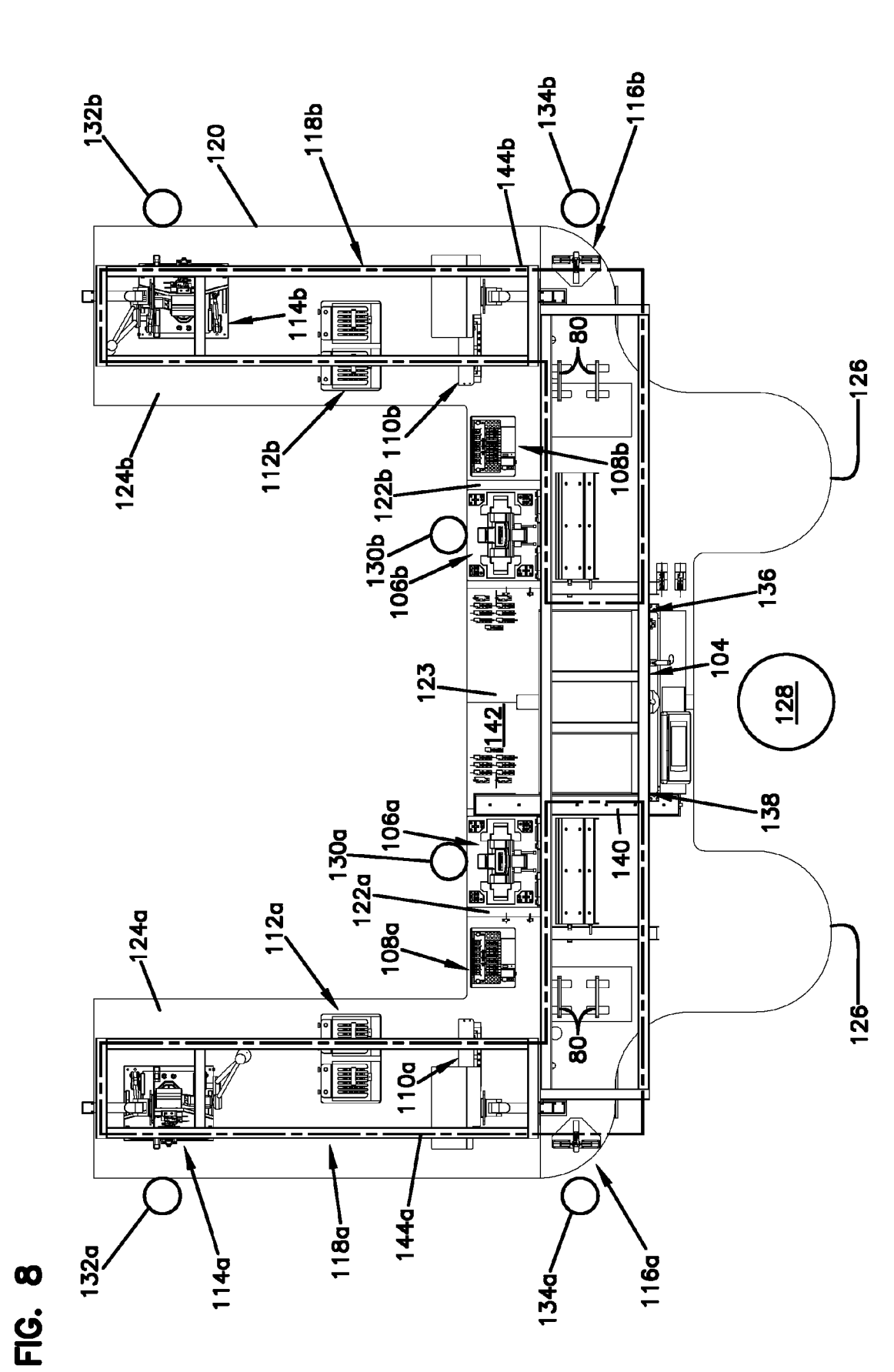
FIG. 8 is a plan view of the table arrangement of FIG. 7.

Referring to FIGS. 7 and 8, the table arrangement 102 is configured to support the dual processing lines 118a, 118b that branch out from the single strip-clean-cleave station 104. In certain examples, the table arrangement 102 includes a main table 120 having a generally U-shaped configuration. In certain examples, the table arrangement 102 also includes separate tables 122 for supporting the fusion splice stations (e.g., see FIG. 26). For example, a first splice station 106a can be mounted to a first separate table 122a and a second splice station 106b can be mounted to a second separate table 122b. The separate tables 122a, 122b isolate the fusion splice stations 106a, 106b from vibrations generated at the main table 120. In certain examples, the main table 120 includes a base section 123 and parallel, spaced apart arms 124a, 124b that extend outwardly from the base section 123 to define the U-shaped configuration. The main table 120 also includes extensions 126 that project outwardly from the base section 123 in a direction opposite from the arms 124a, 124b.

The extensions 126 are spaced-apart and an operator location 128 for the strip-clean-cleave station 104 is defined between the extensions 126. Operator locations 130a, 130b for the fusion splice locations 106a, 106b, the overmold stations 108a, 108b, the UV cure stations 110a, 110b, and the heat cure stations 112a, 112b are located adjacent the base section 123 and between the arms 124a, 124b. Operator locations 132a, 132b for the connector assembly stations 114a, 114b are positioned outside the arms 124a, 124b. Additionally, operator locations 134a, 134b for the non-contact test stations 116a, 116b are also positioned outside the arms 124a, 124b generally at a transition between the base section 123 and the arms 124a, 124b.

Tracks 144a, 144b are disposed above the main table 120 to aerially support the cable spools being processed. The tracks 144a, 144b can support hooks that slide along the tracks 144a, 144b. The hooks can engage the spools of the fiber optic cables 22, thereby holding the spools elevated above the main table 120. Ends of the fiber optic cables 22 hang down towards the main table 120 for processing. In certain examples, the tracks 144a, 144b can be arranged in continuous loops. In certain examples, each track 144a, 144b can have a generally L-shaped configuration that extends along a respective arm 124a, 124b as well as along a respective portion of the base section 123.

During processing, the spool of a given cable 22 being processed is initially held over the strip-clean-cleave station 104 with the end of the fiber optic cable 22 hanging down and being processed at the strip-clean-cleave station 104. After processing at the strip-clean-cleave station 104, the spool can be slid along one of the tracks 144a, 144b to move the cable end from station to station. For example, towards the corresponding fusion splice stations 106a, 106b. The cable spool continues to be moved along the respective track 144a, 144b until the processed end of the cable passes the testing performed at the non-contact testing station 116a, 116bb. The tested cable is removed from the hook and a new cable is mounted to the hook, which is again positioned above the strip-clean-cleave station 104.

Referring to FIGS. 7 and 8, the strip-clean-cleave station 104 includes an input side 136 and an output side 138. A gravity feed arrangement 140 automatically feeds the processed optical fibers 26, which are supported by the customized holders, from the output side 138 of the strip-clean-cleave station 104 to a staging area 142 located between the fusion splice stations 106a, 106b. Thus, the ends of the fiber optic cables 22 that have been stripped, cleaned, and cleaved at the strip-clean-cleave station 104 can be readily accessed by operators at the fusion splice stations 106a, 106b for fusion splice operations. In certain embodiments, the gravity feed arrangement 140 for moving the optical fibers 26 processed by the strip-clean-cleave station 104 to the staging area 142 can include a ramp on which the holders holding the optical fibers 26 slide from the output of the strip-clean-cleave station 104 to the staging area 142.

At the fusion splice stations 106, the processed optical fiber stubs 54 are fusion spliced to the processed optical fibers 26 of the fiber optic cables 22. Thereafter, the fiber 26 and stub 54 are moved together through the various stations. For example, the spliced cable 22 and stub 54 are moved to the overmold station 108 at which overmold material encapsulates the splice location. Initial curing of the overmold material occurs at the UV cure station 110 and final curing of the overmold material occurs at the heat cure station 112. A fiber optic connector 24 is assembled around the overmolded cable at the assembly station 114. The fiber optic cable assembly 20 including the assembled connector 24 and the spliced fiber 26 and stub 54 are tested at the non-contact test station 116.

Figure 9:
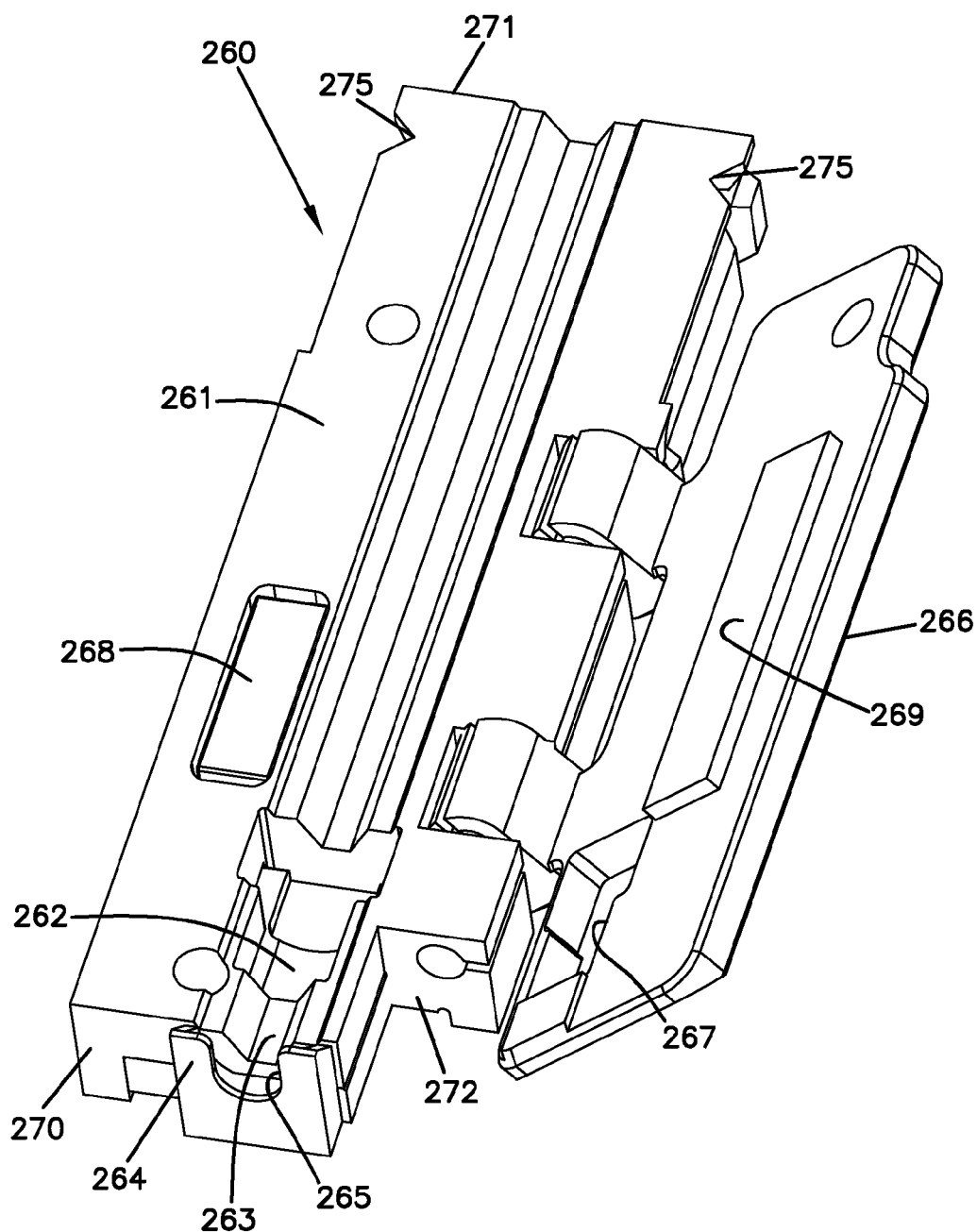
FIG. 9 is a perspective view of an example stub holder suitable for retaining a ferrule from which a stub fiber extends.
Figure 10:
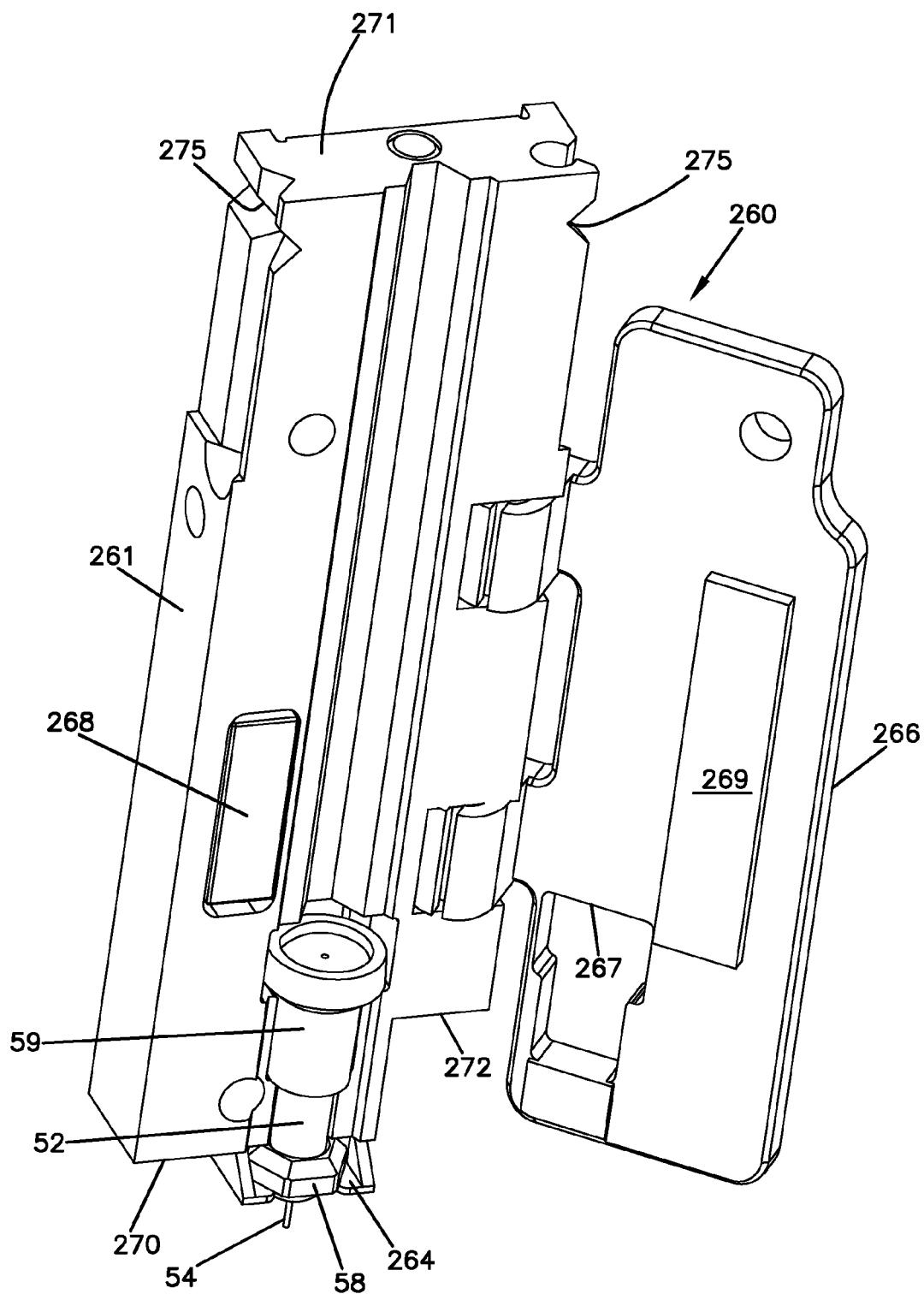
FIG. 10 is a perspective view of the stub holder of FIG. 9 with an example ferrule and dust cap mounted to the stub holder.
Figure 11:
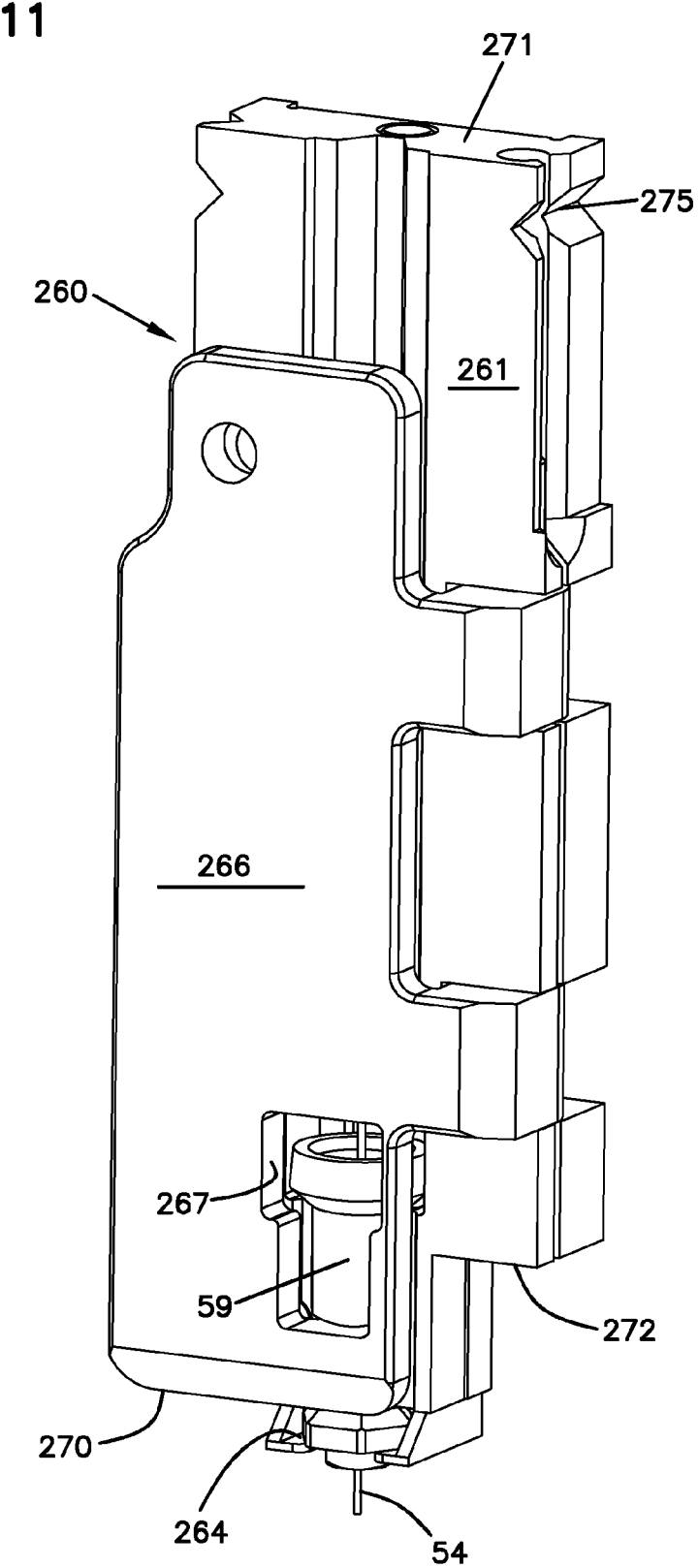
FIG. 11 is a perspective view of the stub holder of FIG. 10 with the cover closed.
Figure 12:
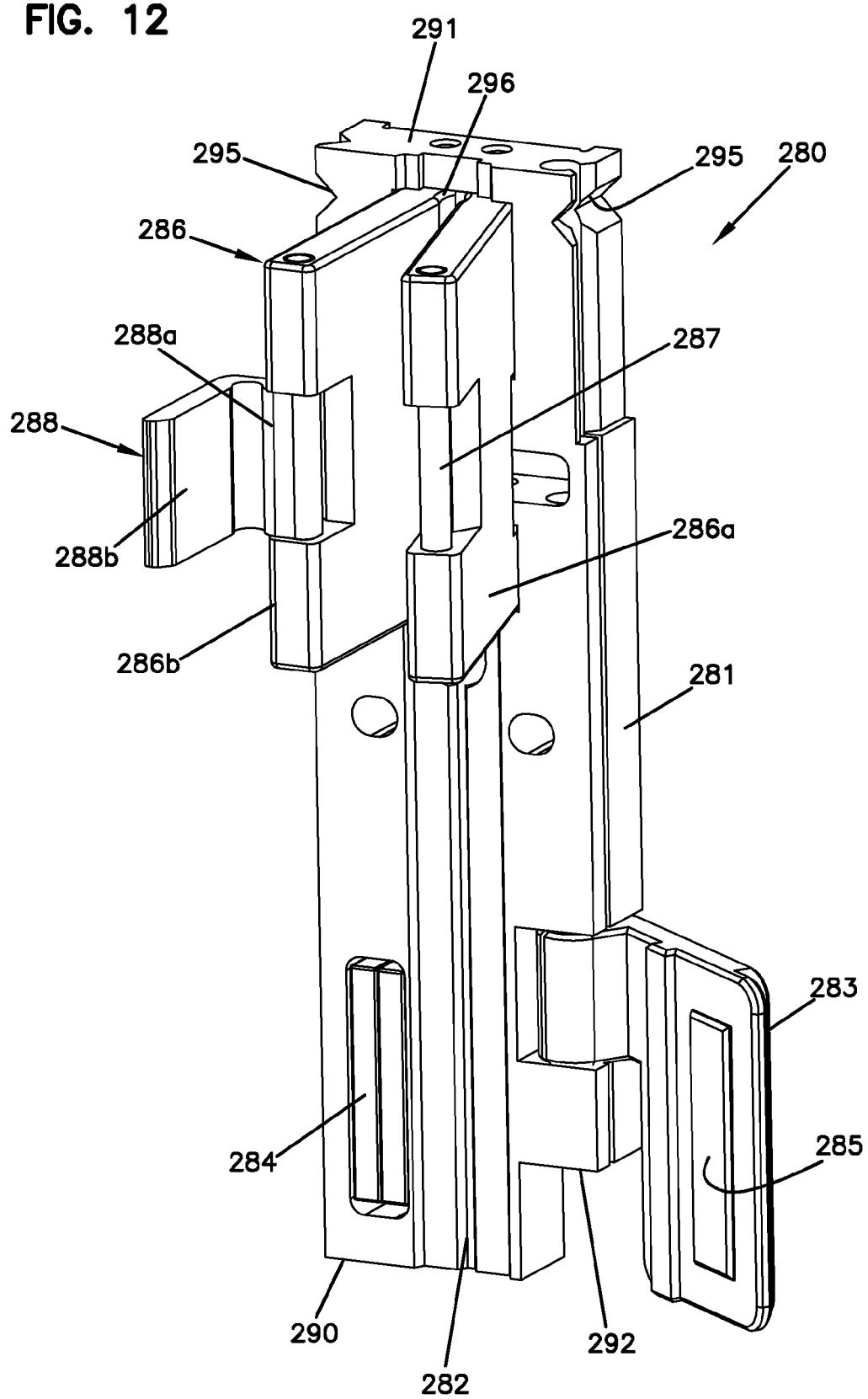
FIG. 12 is a perspective view of an example cable holder suitable for retaining an end of an optical cable.
Figure 13:
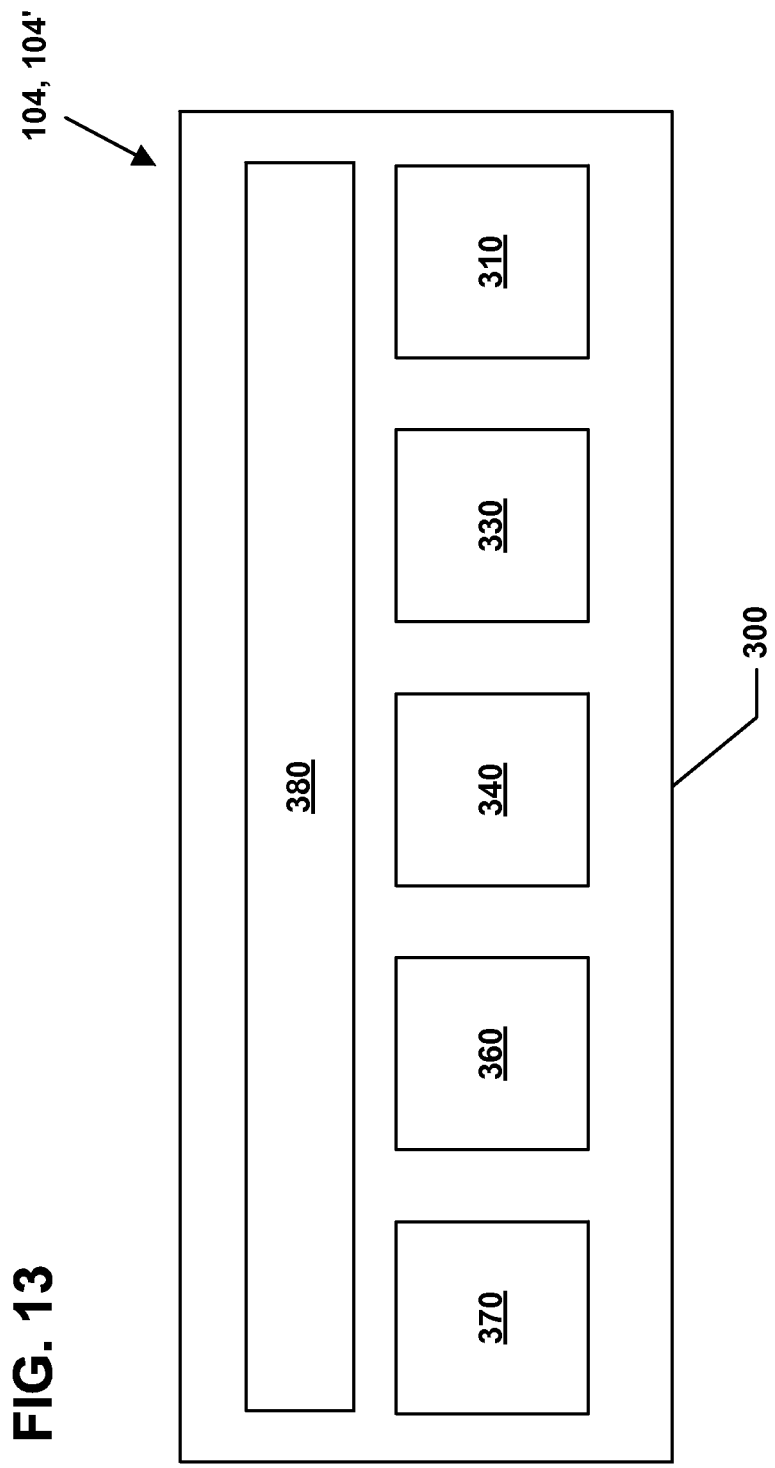
FIG. 13 is a schematic diagram of a strip-clean-cleave station suitable for processing either the stub fiber of the stub holder or an optical fiber of the cable holder.
Figure 14:
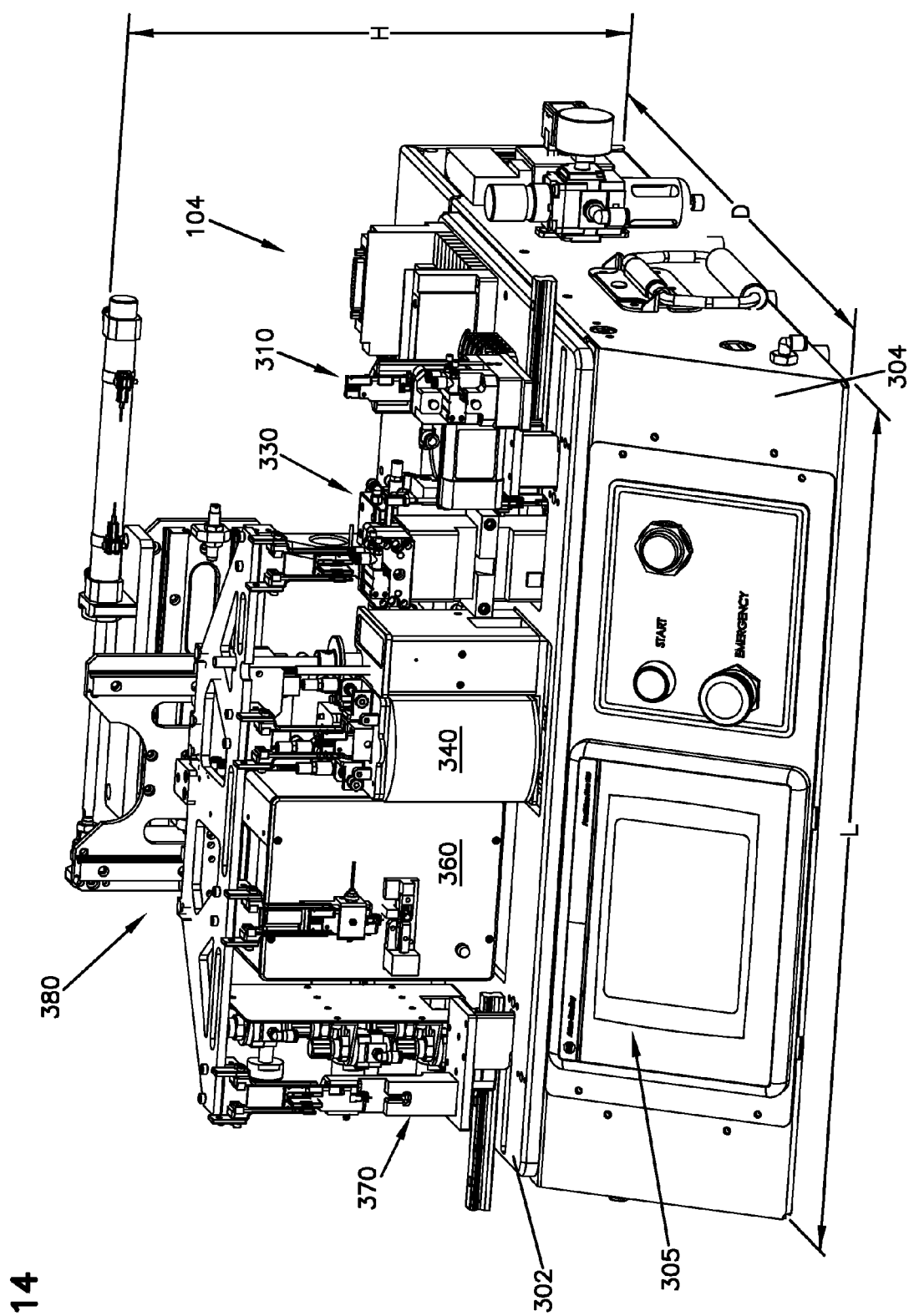
FIG. 14 is a perspective view of an example strip-clean-cleave station.

Referring to FIGS. 9-12, each cable fiber 26 and stub 54 to be processed at the processing cell 100 is mounted to a holder to facilitate handling and transport within the cell 100. FIGS. 9-11 illustrate an example stub holder 260 for holding the ferrule 52 and stub 54; FIG. 12 illustrates an example cable holder 280 for holding the optical fiber 26 and a jacketed portion 28 of the cable 22. The holders 260, 280 are configured to releasably hold the stub 54/fiber 26 without damaging the stub 54 or fiber 26. In certain examples, the holders 260, 280 are sized and shaped to be grasped by a user. In certain examples, the holders 260, 280 are sized and shaped to be grasped by a conveyance device (e.g., a walking beam).

As shown in FIGS. 9-11, the stub holder 260 includes a main body 261 extending from a first end 270 to a second end 271. The main body 261 defines a notched section at the first end 270 to form a recessed shoulder 272 offset from the first end 270. The main body 261 defines a channel (e.g., a V-groove) 263 sized to receive the ferrule 52. In certain examples, the channel 263 extends inwardly from the first end 270 of the main body 261. A platform 264 is disposed at the first end 270 of the main body 261 to axially retain the ferrule 52 within the channel 263. For example, the front hub portion 58 of the ferrule hub 42 may seat on an inner surface of the platform 264. In certain examples, the platform 264 may define a slot or aperture 265 through which the stub 54 can extend outwardly from the ferrule 52 and outwardly from the stub holder 260.

The channel 263 is contoured to retain the ferrule 52 in a laterally fixed position. A cover (e.g., a door) 266 can selectively hold the ferrule 52 within the channel 263. In certain examples, the cover 266 is pivotally mounted to the main body 261 to move between an open position and a closed position. In certain examples, the door 266 is held in the closed position. In the example shown, the main body 261 includes a first magnetic member 268 and the door 266 includes a second magnetic member 269 that interacts with the first magnetic member 268 to maintain the door 266 in the closed position. In other examples, the door 266 can be latched, friction-fit, fastened, or otherwise temporarily held in the closed position so that the holder 260 retains the ferrule 52 and stub 54.

In certain examples, the stub holder 260 is structured to apply a retention pressure to only the ferrule 52. For example, the aperture 265 defined in the platform 264 may be sufficiently large to inhibit contact with the stub fiber 54. In certain examples, the main body 261 also defines a cavity 262 sized to accommodate a dust cap 59 (FIG. 11) mounted over the ferrule 52. In an example, the cover 266 defines an aperture 267 that aligns with the cavity 262 when the cover 266 is closed (e.g., see FIG. 11). The aperture 267 cooperates with the cavity 262 to accommodate the dust cap 59. In an example, the aperture 267 and cavity 262 are sized so that the stub holder 260 does not directly contact the dust cap. In other examples, the aperture 267 and cavity 262 are sized so that the stub holder 260 does not apply pressure to the dust cap.

As shown in FIG. 12, the cable holder 280 includes a main body 281 extending from a first end 290 to a second end 291. The main body 281 defines a notched section at the first end 290 to form a recessed shoulder 292 offset from the first end 290. The main body 281 defines a channel (e.g., a V-groove) 282 sized to receive the cable 22. In certain examples, the channel 282 extends inwardly from the first end 290 towards the second end 291. The cable 22 enters the cable holder 280 at the second end 291 and the optical fiber 26 to be processed extends outwardly from the first end 290. The cable jacket 28 extends at least partially along the channel 282.

In certain implementations, the cable holder 280 includes a cover 283 that selectively encloses a portion of the fiber 26 within the channel 282 to secure the fiber 26 to the cable holder 280. In certain examples, the cover 283 presses the optical fiber 26 into the channel 282 to maintain a position of the optical fiber 26 relative to the cable holder 280. In certain examples, the cover 283 encloses and presses against the jacket 28 of the cable 22 and retains the fiber 26 through the jacket 28.

In certain implementations, the cover 283 is pivotally mounted to the main body 281 to move between an open position and a closed position. In certain examples, the door 283 is held in the closed position. In the example shown, the main body 281 includes a first magnetic member 284 and the cover 283 includes a second magnetic member 285 that interacts with the first magnetic member 284 to maintain the cover 283 in the closed position. In other examples, the cover 283 can be latched, friction-fit, fastened, or otherwise temporarily held in the closed position so that the cable holder 280 retains the fiber 26.

In certain examples, the cable holder 280 includes a clamp arrangement 286 to hold the cable jacket 28 to the cable holder 280. In certain examples, the clamp arrangement 286 aligns the cable 22, and in particular the optical fiber 26, along an axis of the channel 282. In the example shown, the clamp arrangement 286 includes a first clamp member 286a and a second clamp member 286b. The cable jacket 28 extends between the clamp members 286a, 286b when the cable 22 is mounted to the cable holder 280. At least one of the clamp members 286a, 286b is movable (e.g., pivotal) towards the other to compress a portion of the cable jacket 28 therebetween.

In certain examples, the clamp members 286a, 286b each define part of a groove 296 through which the cable 22 extends. The groove 296 is sized to accommodate the jacketed portion of the cable 22 while holding the cable 22 in the channel 282. In certain examples, the clamp arrangement 286 can be held in the closed position. In the example shown, the first clamp member 286a includes a pin or other support structure 287 and the second clamp member 286b includes a latch member 288 that is configured to hook over the pin 287. In other examples, the clamp arrangement 286 can be otherwise selectively held together.

In certain examples, the clamp arrangement 286 is disposed at an opposite end of the holder body 281 from the cover 283. For example, the cover 283 may be disposed at the first end 290 and the clamp arrangement 286 may be disposed at the second end 291. In other examples, the clamp arrangement 286 may be disposed adjacent to the cover 283. In such examples, deformation of the jacket 28 caused by the clamp arrangement 286 may be covered by a subsequently applied connector strain relief boot.

FIGS. 13-25 illustrate one example strip-clean-cleave station 104, 104' suitable for use in the processing cell 100. The strip-clean-cleave station 104, 104' includes a station body 300 that encloses one or more sub-stations. In the example shown, the strip-clean-cleave station body 300 includes a load sub-station 310, a strip sub-station 330, a clean sub-station 340, a cleave sub-station 360, and an unload sub-station 370. In other examples, the station body 300 may include additional sub-stations. In some implementations, the cable strip-clean-cleave station 104 and the stub strip-clean-cleave station 104' have the same sub-stations. In other implementations, one or more of the sub-stations can vary between the cable strip-clean-cleave station 104 and the stub strip-clean-cleave station 104'. In an example, the load sub-station 310 of the cable strip-clean-cleave station 104 may include a heating unit as will be disclosed in more detail below while the load sub-station 310 of the stub strip-clean-cleave station 104' does not include a heating unit.

In some implementations, the strip-clean-cleave station 104, 104' can include a control unit 304 that manages the operation of the sub-stations 310, 330, 340, 360, 370. For example, the control unit 304 may include motors, pistons, pumps, or other such devices to move or otherwise operate the sub-stations. In certain examples, the control unit 304 includes a user interface 305 through which a user can control operation of the strip-clean-cleave station 104, 104'. For example, a user can start and stop operation of the strip-clean-cleave station 104, 104' via the user interface 305. In an example, the user interface 305 includes a touch screen. In an example, the user interface 305 includes buttons, switches, toggles, or other such input devices. In certain examples, the sub-stations 310, 330, 340, 360, 370 are disposed on a base 302 that is located above the control unit 304.

In certain examples, the station body 300 also includes an automated conveying device 380 (e.g., a walking beam) that moves the fiber 26 or stub 54 from one sub-station 310, 330, 340, 360 to the next sub-station 330, 340, 360, 370. In examples, the conveying device 380 is configured to grasp the holder 260, 280 holding the fiber 26 or stub 54 and to transport the holder 260, 280 between the sub-stations. In certain examples, the control unit 304 manages operation of the walking beam 380 to automatically move the stub holder 260 or cable holder 280 through the strip-clean-cleave station 104, 104'.

For example, in use, a holder 260, 280 holding the stub 54 or fiber 26 may be disposed at the load sub-station 310 to place the holder 260, 280 in range of the walking beam 380. The walking beam 380 moves the holder 260, 280 to the strip sub-station 330 to remove a coating from the stub 54 or optical fiber 26. The walking beam 380 then moves the holder 260, 280 to the clean sub-station 340 to remove any remaining coating particles from the stripped stub 54 or stripped fiber 26. The walking beam 380 then moves the holder 260, 280 to the cleave sub-station 360 at which an end of the stub 54 or optical fiber 26 is removed. The walking beam 380 then moves the holder 260, 280 to the unload sub-station 370 which places the holder 260, 280 in range of a user for removal from the station body 300.

Figure 15:
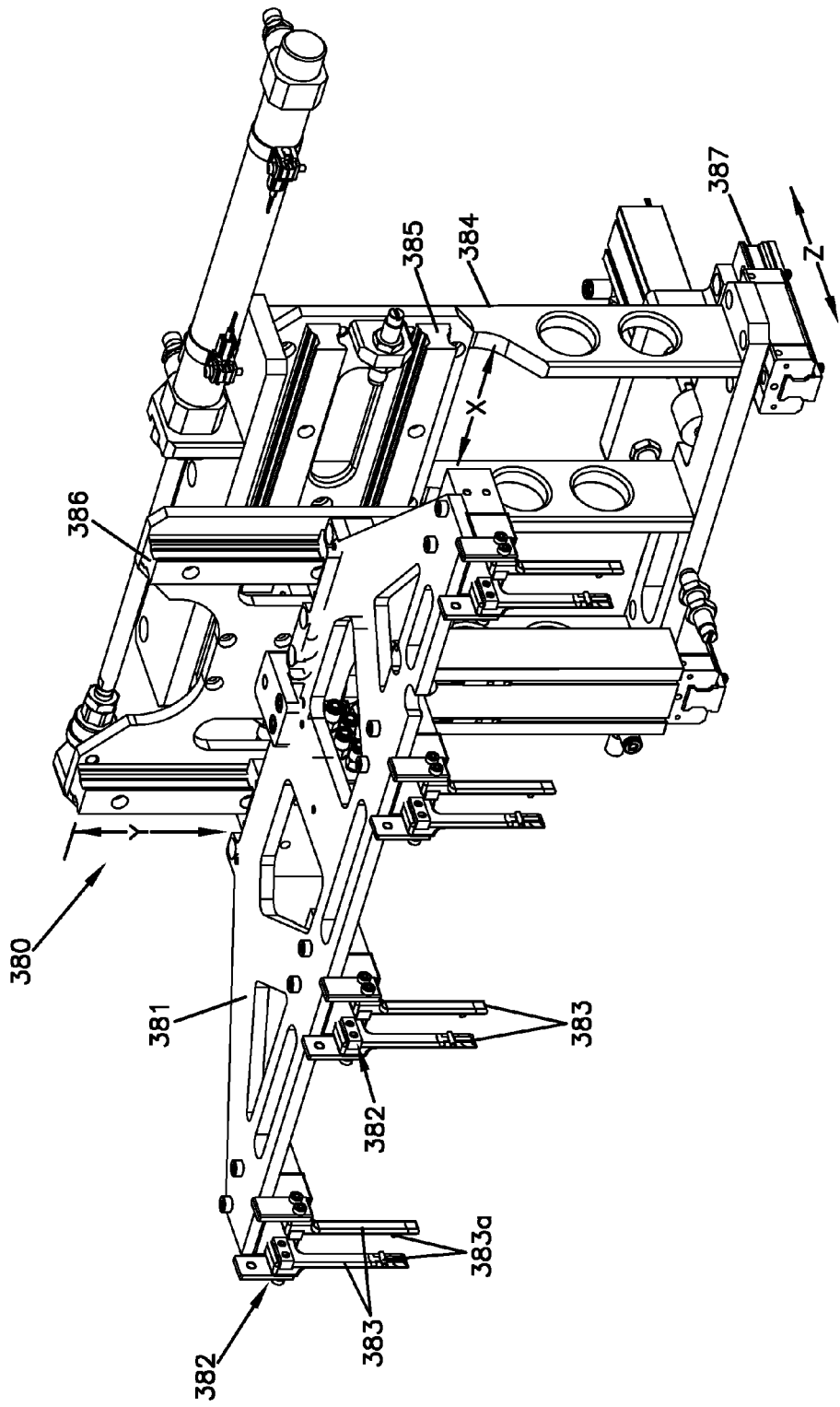
FIG. 15 is a perspective view of an example conveying device suitable for use in the strip-clean-cleave station of FIG. 14.

FIG. 15 illustrates one example walking beam 380 suitable for use in a strip-clean-cleave station 104, 104'. The walking beam 380 includes a beam or platform 381 including one or more grasping arrangements 382. In an example, the platform 381 includes a single grasping arrangement 382. In other examples, the platform 381 includes multiple grasping arrangements 382. In some implementations, the walking beam 380 includes one fewer grasping arrangement 382 than the strip-clean-cleave station 104 includes sub-stations. In the example shown, the platform 381 includes four grasping arrangements 382.

In some implementations, each grasping arrangement 382 includes two fingers 383 that pinch or otherwise retain the holders 260, 280. For example, the fingers 383 may be moved towards and away from each other to grasp and release the holders 260, 280. In certain examples, each finger 383 may include a protrusion 383a that fits into a notch, slot, or receiving channel 275, 295 defined in opposite sides of the holders 260, 280 (e.g., see FIGS. 9 and 12). In other implementations, each grasping arrangement 382 can include a clamp, magnet, hook, or other releasable retention element.

The platform 381 is movably mounted to a frame 384 to enable movement of the grasping arrangements 382. In some implementations, the platform 381 is configured to move along a length L (FIG. 14), a height H (FIG. 14), and/or a depth D (FIG. 14) of the station body 300. For example, as shown in FIG. 15, the platform 381 is configured to move horizontally along an X-axis, which extends along the length L of the station body 300. The sub-stations 310, 330, 340, 360, 370 are spaced along the length L. Accordingly, the walking beam 380 moves between the sub-stations 310, 330, 340, 360, 370 as it moves along the X-axis.

In some examples, the walking beam 380 also moves vertically along a Y-axis, which extends along the height H of the station body 300. For example, the walking beam 380 may lift the holders 260, 280 away from the sub-stations 310, 330, 340, 360, 370 to a predetermined height before moving along the X-axis. Raising the holders 260, 280 inhibits interference between the holders 260, 280 and sub-stations 310, 330, 340, 360, 370 during movement along the X-axis. In certain examples, the walking beam 380 also moves horizontally along a Z-axis, which extends along the depth D of the station body 300. For example, the walking beam 380 may move between a forward position and a rearward position relative to the station body 300.

In certain examples, the frame 384 includes one or more rails or tracks along which the platform 381 slides. In the example shown, the frame 384 includes a first track arrangement 385 that extends along the X-axis, a second track arrangement 386 that extends along the Y-axis, and a third track arrangement 387 that extends along the Z-axis. In other examples, the frame 384 may have any desired arrangement of tracks. In certain examples, the platform 381 is automatically moved relative to the frame 384 by solenoids or other actuators managed by the control unit 304.

A cycle of the strip-clean-cleave stations 104, 104' begins with the walking beam 380 in a starting position in which the grasping arrangements 382 aligned with the strip, clean, and cleave sub-stations 330, 340, 360. During the cycle, the walking beam 380 lowers, grasps any holders 260, 280 within reach of the grasping arrangements 382, raises, and slides towards the output side 138 of the station body 300 until the grasping arrangements 382 align with the strip, clean, cleave, and unload sub-stations 330, 340, 360, 370. The walking beam 380 lowers again and releases any holders 260, 280 held by the grasping arrangements 382. Finally, the walking beam 380 raises again, moves rearwardly out of alignment with the sub-stations, slides towards the input side 136 of the station body 300, and moves forwardly into alignment with the strip, clean, and cleave sub-stations 330, 340, 360.

Figure 16:
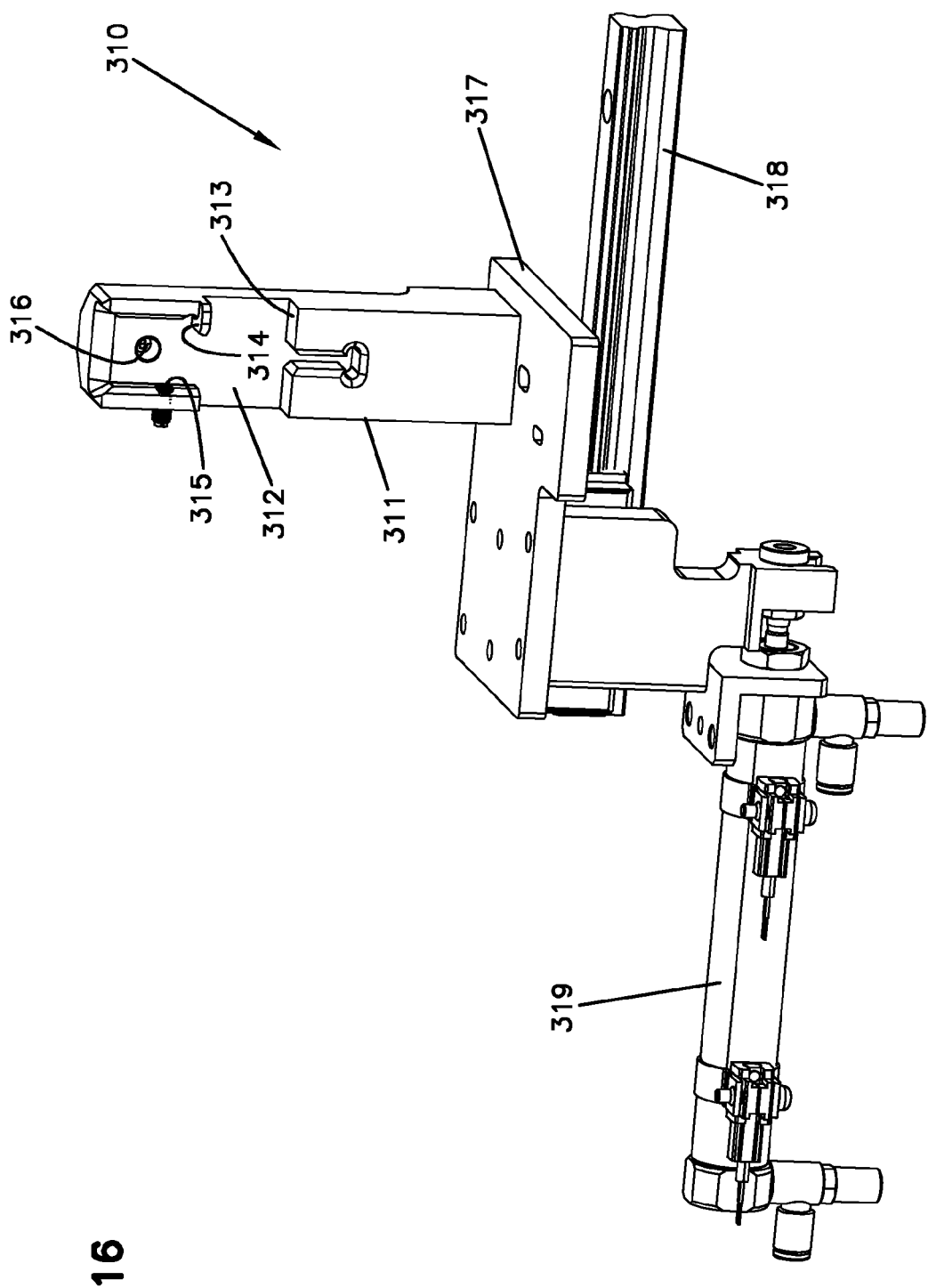
FIG. 16 is a perspective view of a load sub-station suitable for use in the strip-clean-cleave station of FIG. 14.
Figure 17:
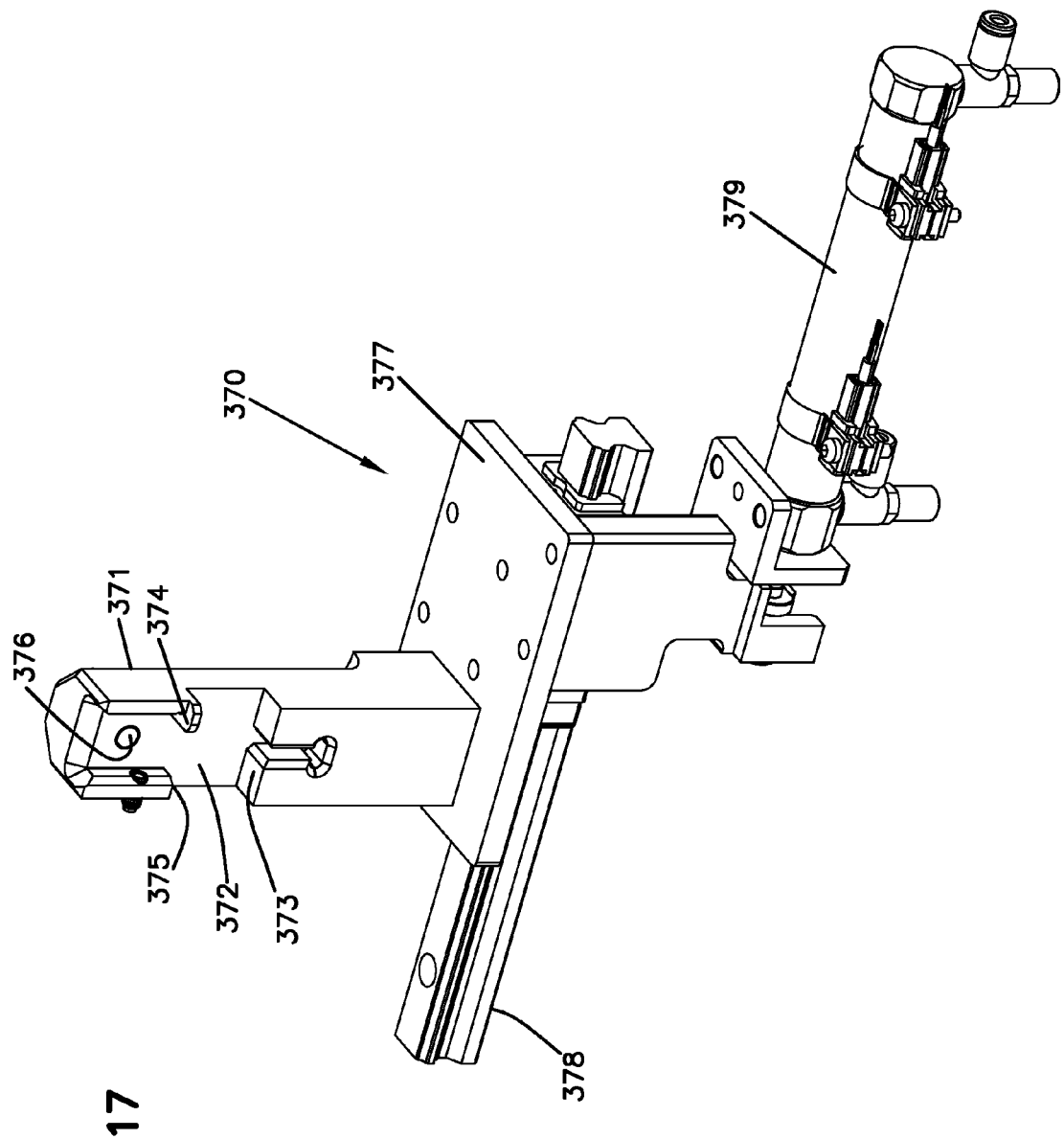
FIG. 17 is a perspective view of an unload sub-station suitable for use in the strip-clean-cleave station of FIG. 14.

FIGS. 16-24 illustrate examples of the sub-stations 310, 330, 340, 360, 370 of the strip-clean-cleave station 104, 104'. FIG. 16 illustrates an example load sub-station 310 configured to releasably receive a holder 260, 280 at the input side 136 of the strip-clean-cleave station 104, 104'. FIG. 17 illustrates an example unload sub-station 370 configured to releasably receive a holder 260, 280 at the output side 138 of the strip-clean-cleave station 104, 104'. The load sub-station 310 and unload sub-station 370 each include a dock member 311, 371 at which the holder 260, 280 can be releasably positioned. In certain examples, the dock member 311, 371 includes a sensor (e.g., an optical sensor) 316, 376 that detects a presence of the holder 260, 280 when the holder 260, 280 is mounted to the dock member 311, 371.

In certain examples, the dock member 311, 371 defines a recessed cavity 312, 372 sized to accommodate the holder 260, 280. In certain examples, the dock member 311, 371 includes a shoulder 313, 373 at one end of the cavity 312, 372 on which the first end 270, 290 of the holder 260, 280 can seat. In certain examples, the dock member 311, 371 includes side flanges that provide support for the holder 260, 280. For example, one side flange can include a platform 314, 374 on which the notched section 272, 292 of the holder 260, 280 can seat. In certain examples, another side flange can include a spring-biased ball plunger (or other such device) 315, 375 that applies pressure to the holder 260, 280 to maintain the holder 260, 280 at the dock member 311, 371.

In certain examples, each dock member 311, 371 is movable relative to the other sub-stations 330, 340, 360. For example, each dock member 311, 371 is configured to move between a respective inner position and a respective outer position. The inner position is located closer to the other sub-stations than the outer position. In an example, the dock members 311, 371 are configured to slide between the inner and outer positions. In use, the dock member 311 moves to the outer position to facilitate a user mounting a holder 260, 280 to the dock member 311 at the input side 136 of the station body 300. The dock members 311, 371 move to the outer positions to receive the holders 260, 280 from or provide the holders 260, 280 to the user. The dock members 311, 371 move to the inner positions to provide the holders 260, 280 to or receive the holders 260, 280 from the walking beam 380.

In certain implementations, the dock member 311, 371 of is mounted to a carriage 317, 377 that slides over a rail 318, 378 to move the dock member 311, 371 between the first and second positions. In certain examples, the carriage 317, 377 is coupled to a solenoid 319, 379 that moves the carriage 317, 377 over the rail 318, 378. In other examples, the carriage 317, 377 can be coupled to a different movement device to automatically move the dock member 311, 371 between the first and second positions. In still other implementations, the dock member 311, 371 can be manually moved between the first and second positions.

Figure 18:
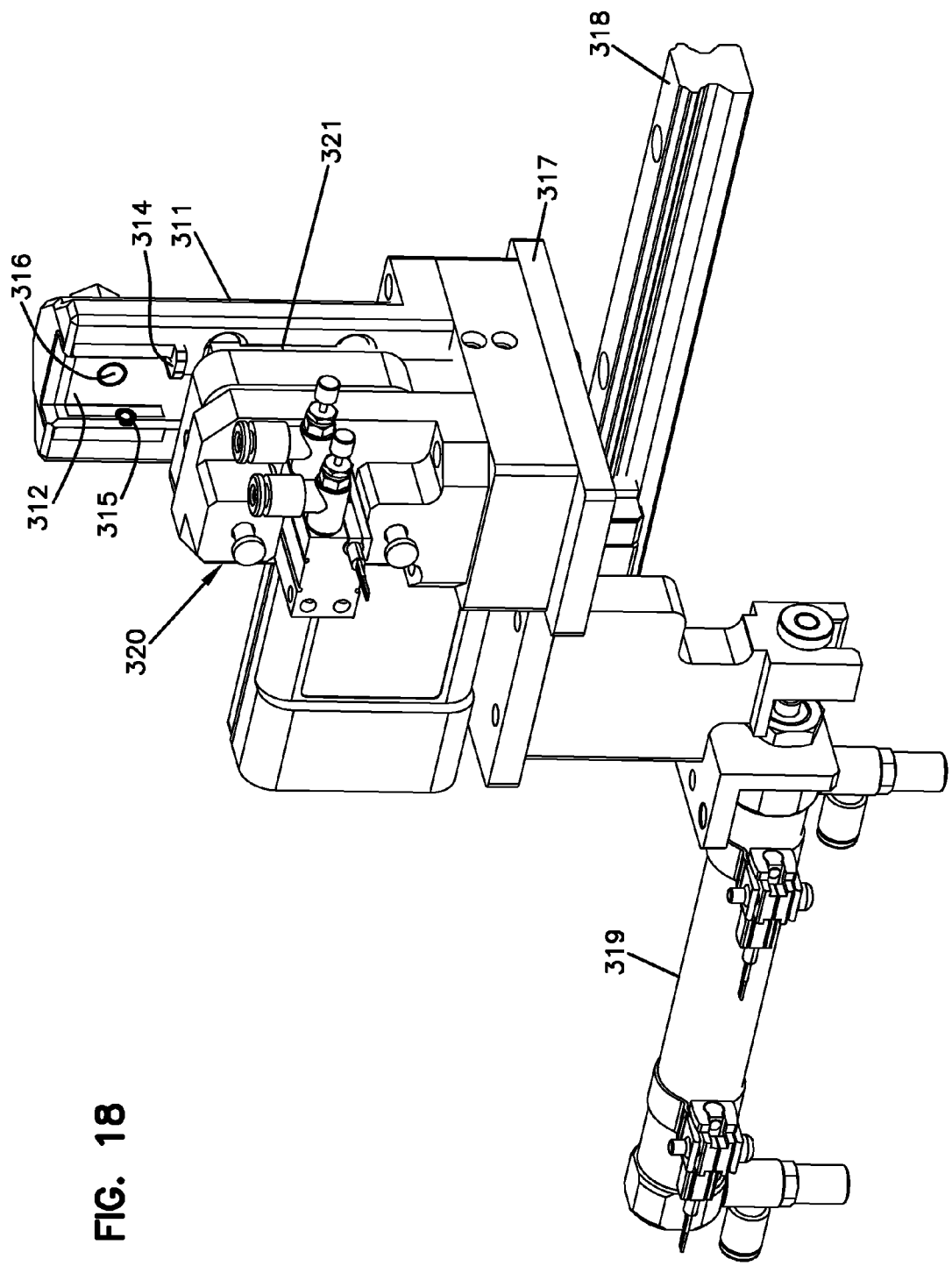
FIG. 18 is a perspective view of another example load sub-station including a heating unit.

FIG. 18 illustrates an example variation of the load sub-station 310 suitable for use in the cable strip-clean-cleave station 104. The shown load sub-station 310 includes a heating unit 320 that is configured to apply heat to the jacketed portion 28 of the cable 22 to aid in straightening the end of the cable 22 to be processed. For example, the heating unit 320 can include a heating surface 321 or element that faces the cable holder 280 in proximity to an exposed portion of the cable jacket 28. In an example, the heating surface 321 contacts the exposed portion of the cable jacket 28. In certain examples, the heating unit 320 moves with the dock member 311 between the first and second positions. In certain examples, the heating unit 320 applies heat during movement between the first and second positions.

Figure 19:
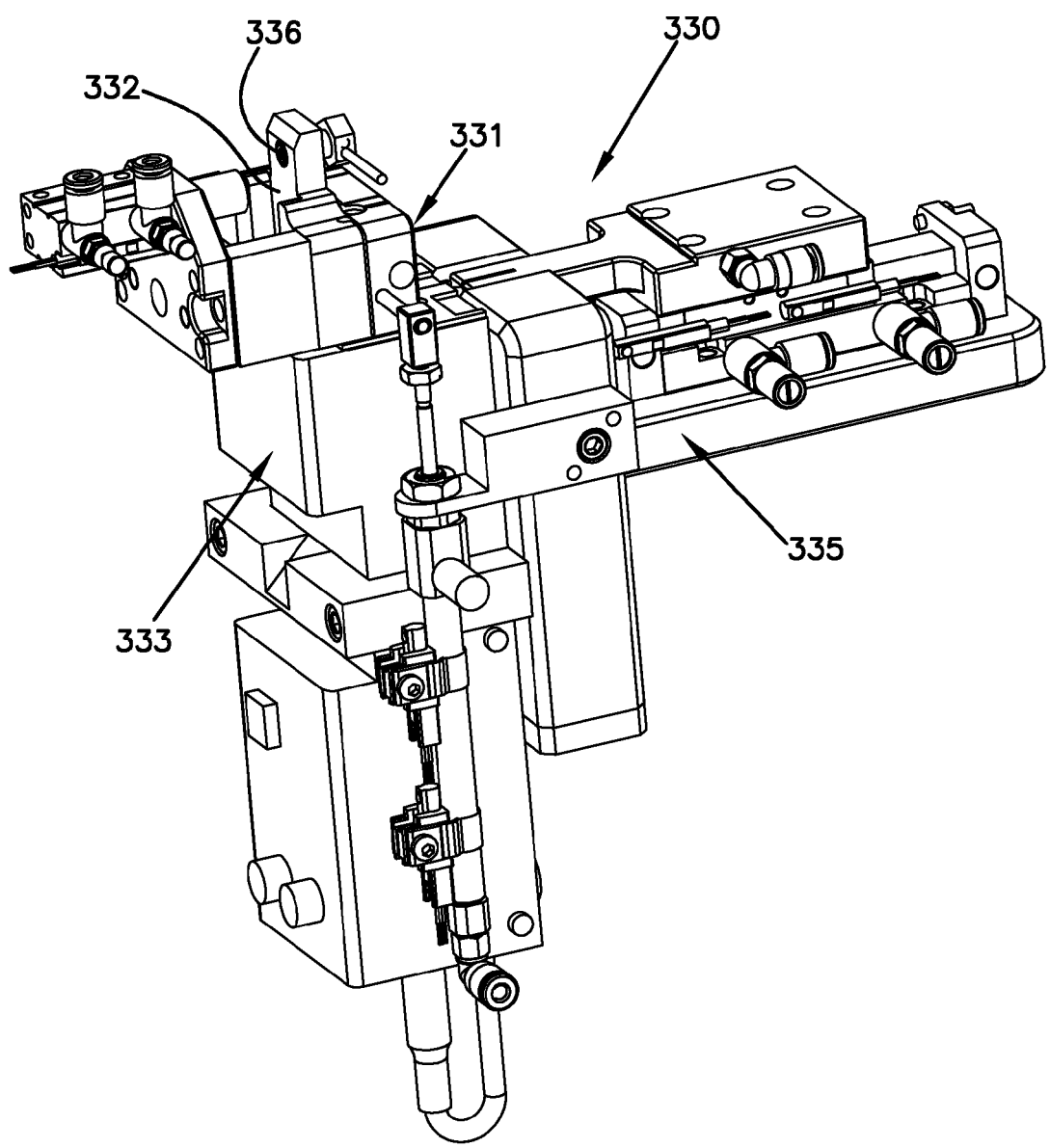
FIG. 19 is a perspective view of an example strip sub-station suitable for use in the strip-clean-cleave station of FIG. 14.
Figure 20:
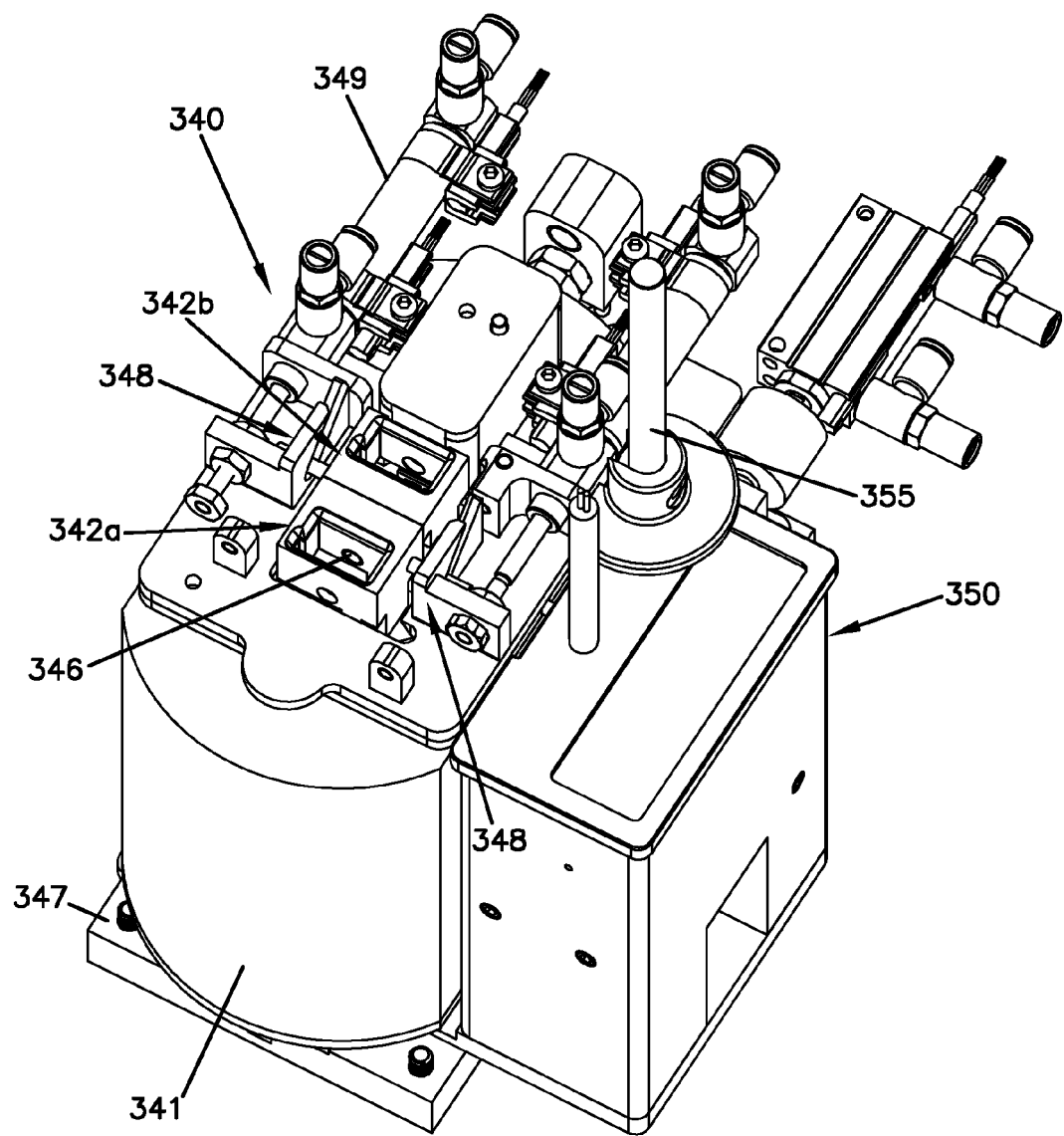
FIG. 20 is a perspective view of an example clean sub-station suitable for use in the strip-clean-cleave station of FIG. 14.

FIG. 19 illustrates an example strip sub-station 330 suitable for use in removing a coating from a core of the optical fiber to be processed (e.g., fiber 26 or stub 54). In certain examples, the strip sub-station 330 also removes the jacket 28 or buffer from the fiber 26 or stub 54. The example strip sub-station 330 includes a retaining arrangement 331 defining a dock 332. The walking beam 380 positions the holder 260, 280 at the dock 332 of the retaining arrangement 331. The end of the fiber to be processed extends into a stripping arrangement 333 that holds blades, heating elements, and/or other elements suitable for removing the coating from the fiber core. For example, heating elements may soften/melt the coating before the blades or other elements remove the coating from the fiber core.

In certain examples, the retaining arrangement 331 moves relative to the stripping arrangement 333 to move the end of the fiber relative to the blades and/or heating elements. In an example, the retaining arrangement 331 moves vertically relative to the stripping arrangement 333. In certain examples, a blower arrangement 335 directs a fluid at the stripped fiber core to separate the stripped coating/buffer/jacket from the fiber core. For example, the blower arrangement 335 may direct a blast of air at the fiber core.

Figure 21:
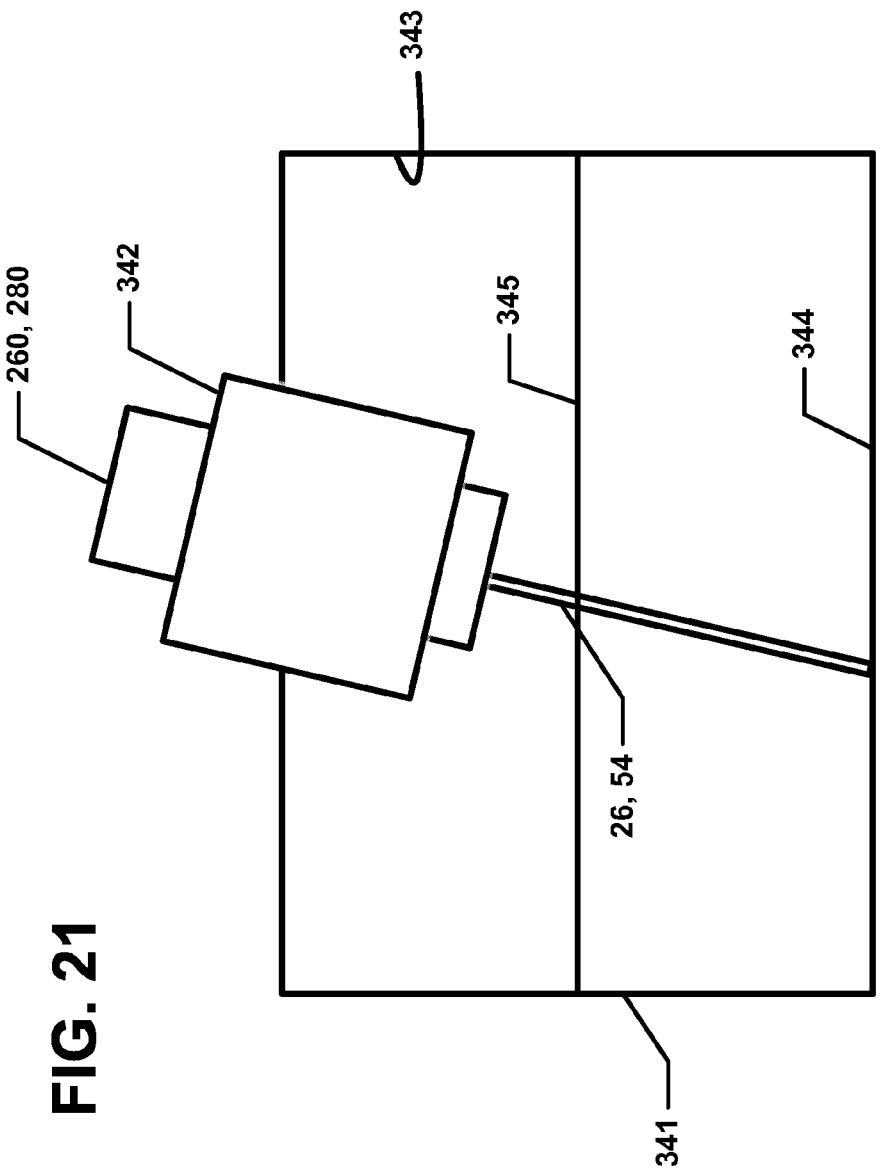
FIG. 21 is a schematic diagram of an example bath tank suitable for use in the clean sub-station of FIG. 20.
Figure 22:
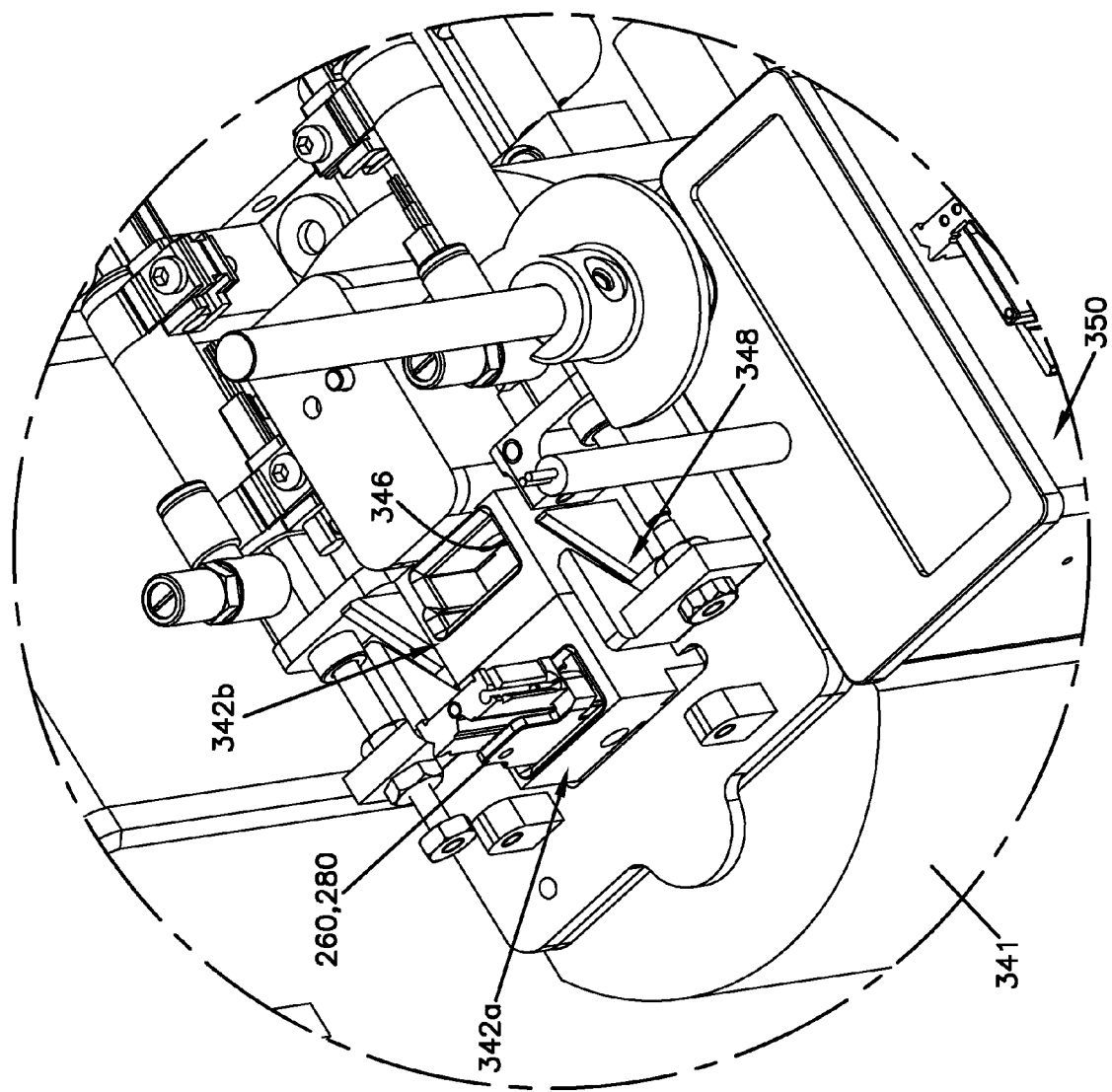
FIG. 22 is an enlarged view of a portion of FIG. 20.

FIGS. 20-23 illustrate an example clean sub-station 340 suitable for use in cleaning the stripped fiber core. The clean sub-station 340 includes an ultrasonic bath tank 341 that defines a cavity 343 and a vibration surface 344. Cleaning fluid 345 can be disposed in the cavity 343 to provide a bath. The vibration surface 344 can vibrate or otherwise move to create turbulence within the cleaning fluid 345. As shown in FIG. 21, the bath tank 341 also includes a dock 342 at which the stub holder 260 or cable holder 280 can be positioned. When the holder 260, 280 is placed at the dock 342, the stripped end of the fiber core extends into the bath cavity 343 and into the cleaning fluid 345. In certain examples, the dock 342 includes a sensor 346 that detects a presence of the holder 260, 280.

In some implementations, the bath cavity 343 is sized so that the stripped end of the fiber core extends to and contacts the vibration surface 344. In certain implementations, the bath cavity 343 is sized so that the fiber cores bends in a curve between the holder 260, 280 and the stripped end contacting the vibration surface 344. In other implementations, the bath cavity 343 is sized so that the stripped end of the fiber core is fully surrounded by cleaning fluid 345. In some implementations, the dock 342 is configured to orient the holder 260, 280 so that the stripped fiber core extends at an angle relative to the vibration surface 344 (e.g., see FIG. 21). In certain examples, the dock 342 is configured to move (e.g., pivot) between a non-angled orientation and an angled orientation relative to the bath tank 341.

In some implementations, the bath tank 341 includes multiple docks 342 so that multiple holders 260, 280 can be processed at the clean sub-station 340 simultaneously. For example, multiple stripped fiber cores may extend into the cleaning fluid 345 during the same cycle. In the example shown, the docks 342 include a first dock 342a and a second dock 342b. In other examples, the bath tank 341 can include any desired number of docks 342.

In certain examples, actuators 348 move each of the first dock 342a and the second dock 342b between a non-angled orientation and an angled orientation relative to the bath tank 341. In some examples, the non-angled orientation of the first dock 342a differs from the non-angled orientation of the second dock 342b. For example, the first dock 342a may orient the fiber towards the input side 136 of the station body 300 and the second dock 342b may orient the fiber towards the output side 138 of the station body 300. In other examples, the non-angled orientations of the docks 342a, 342b may align.

In certain implementations, the bath tank 341 can move relative to the station body 300 between a forward and rearward position. Such movement facilitates loading and unloading of the holders 260, 280 at the various docks 342. For example, the bath tank 341 can be disposed in a rearward position in which the first dock 342a is aligned with the grasping arrangement 382 of the walking beam 380 while the walking beam 380 is disposed in the start position. The bath tank 341 also can be disposed in a forward position in which the second dock 342b is aligned with the grasping arrangement 382 of the walking beam 380 while the walking beam 380 is disposed in the start position.

During one cycle of the strip-clean-cleave station 104, 104', the walking beam 380 can deposit a first holder 260, 280 at the first dock 342a of the bath tank 341 while the bath tank 341 is disposed in the rearward position. During a subsequent cycle, the walking beam 380 can deposit a second holder 260, 280 at the second dock 342b while the bath tank 341 is disposed in the forward position. In certain examples, the first holder 260, 280 can remain in the first dock 342a during that subsequent cycle. Accordingly, the stripped fiber core of each holder 260, 280 can be cleaned over the course of two operations cycles. During a third cycle, the walking beam 380 retrieves the first holder 260, 280 from the first dock 342a and deposits a new holder 260, 280 at the first dock 342a. Also during this third cycle, the second holder 260, 280 remains at the second dock 342b.

Figure 23:
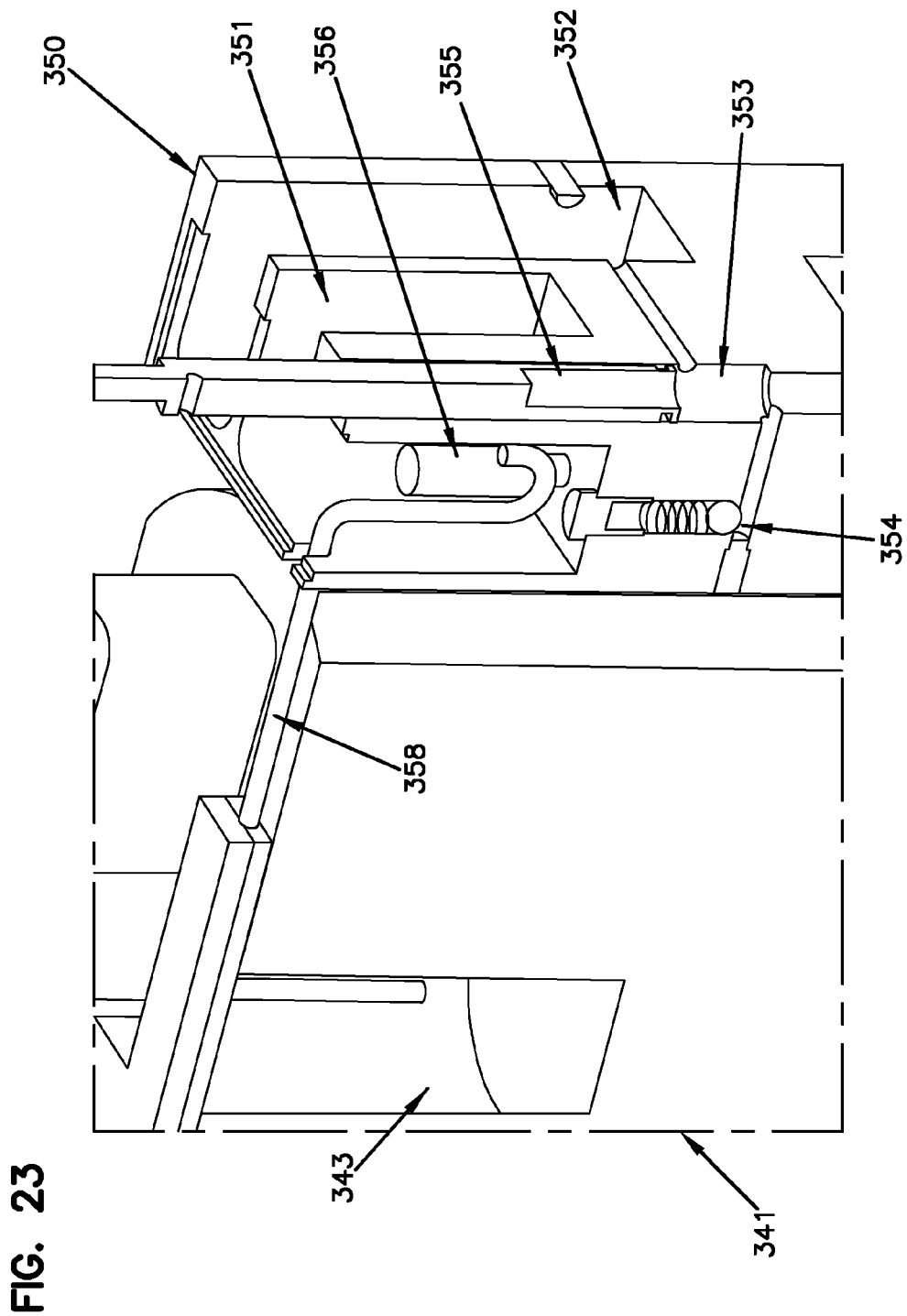
FIG. 23 is a cross-sectional view of the clean sub-station of FIG. 20 in which a leveler arrangement is visible.

In some implementations, the clean sub-station 340 includes a reservoir 350 to hold extra cleaning fluid 345. The cleaning fluid 345 within the bath cavity 343 can be replenished from the reservoir 350 between operation cycles. In certain implementations, the clean sub-station 340 is configured to maintain the cleaning fluid 345 within the bath cavity 343 at a predetermined level. For example, as shown in FIG. 23, the reservoir 350 can include a leveler arrangement including a leveler tank 351 and a supply tank 352. A siphon tube 358 extends between the leveler tank 351 and the bath cavity 343 to evenly distribute the cleaning fluid 345 between the leveler tank 351 and the bath cavity 343. In an example, the siphon tube 358 maintains the fluid level within the ultrasonic bath 343 within about 0.5 mm above or below a desired level.

Each operation cycle of the strip-clean-cleave station 104, 104', a piston 355 pumps a small amount of cleaning fluid 345 from the supply tank 352 to the leveler tank 351. For example, the piston 355 may pump the fluid 345 through conduits 353 and through a one-way valve 354. In certain examples, the leveler tank 351 is sized to overfill with cleaning fluid 345 so that a portion of the cleaning fluid 345 drains back into the supply tank 352. In an example, a threaded collar 356 can be used to adjust the drain level within the leveler tank 351.

Figure 24:
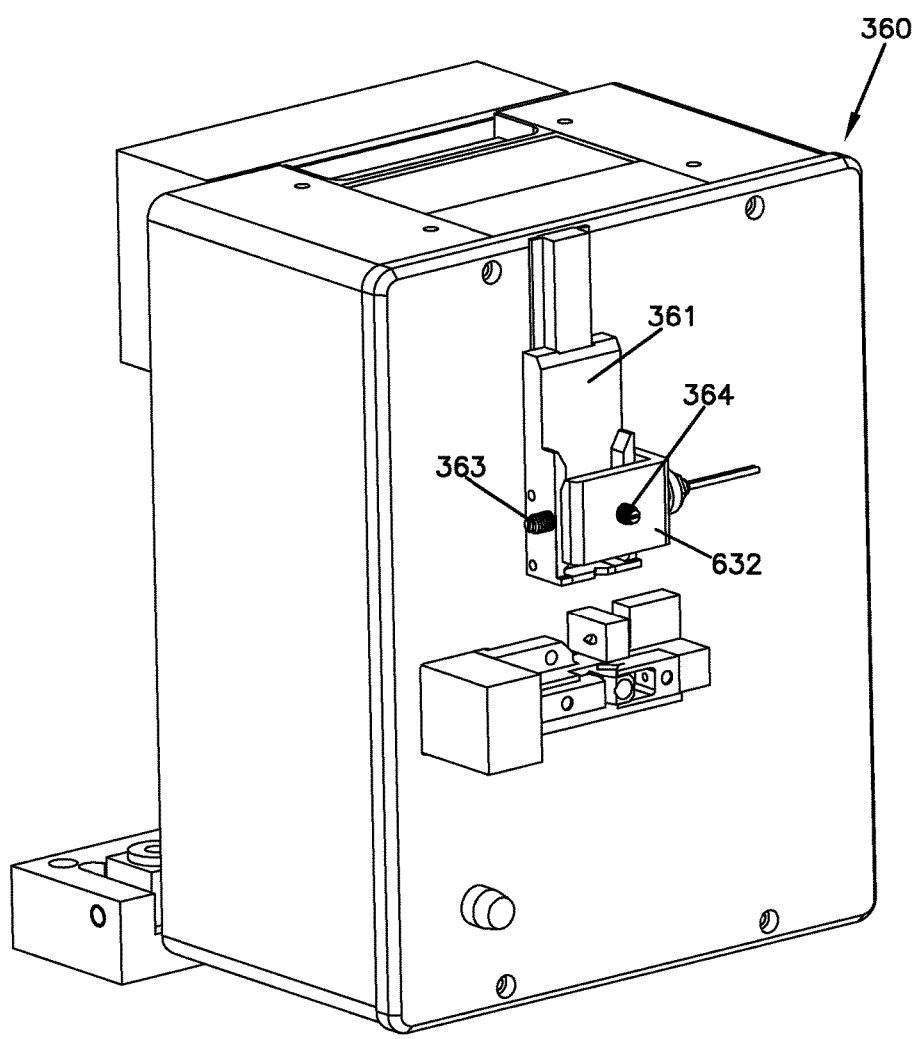
FIG. 24 is a perspective view of an example cleave sub-station suitable for use in the strip-clean-cleave station of FIG. 14.

FIG. 24 illustrates an example cleave sub-station 360 that is configured to sever and end of the stripped, cleaned fiber core to prepare the end for splicing. In some implementations, the cleave sub-station 360 includes a tension cleaver that applies tension to the stripped, cleaned fiber core and applies a cutting pressure to the tensioned fiber core. In the example shown, the cleave sub-station 360 includes a dock 361 at which the holder 260, 280 is retained. In certain examples, the dock 361 includes a door or closing flange 362. In certain examples, one or more spring-biased ball plungers or other such biasing devices hold the holder 260, 280 at a predetermined position at the dock 361. In the example shown, a first ball plunger 363 urges the holder 260, 280 sideways relative to the dock 361 and a second ball plunger 364 urges the holder 260, 280 against the dock 361.

Figure 25:
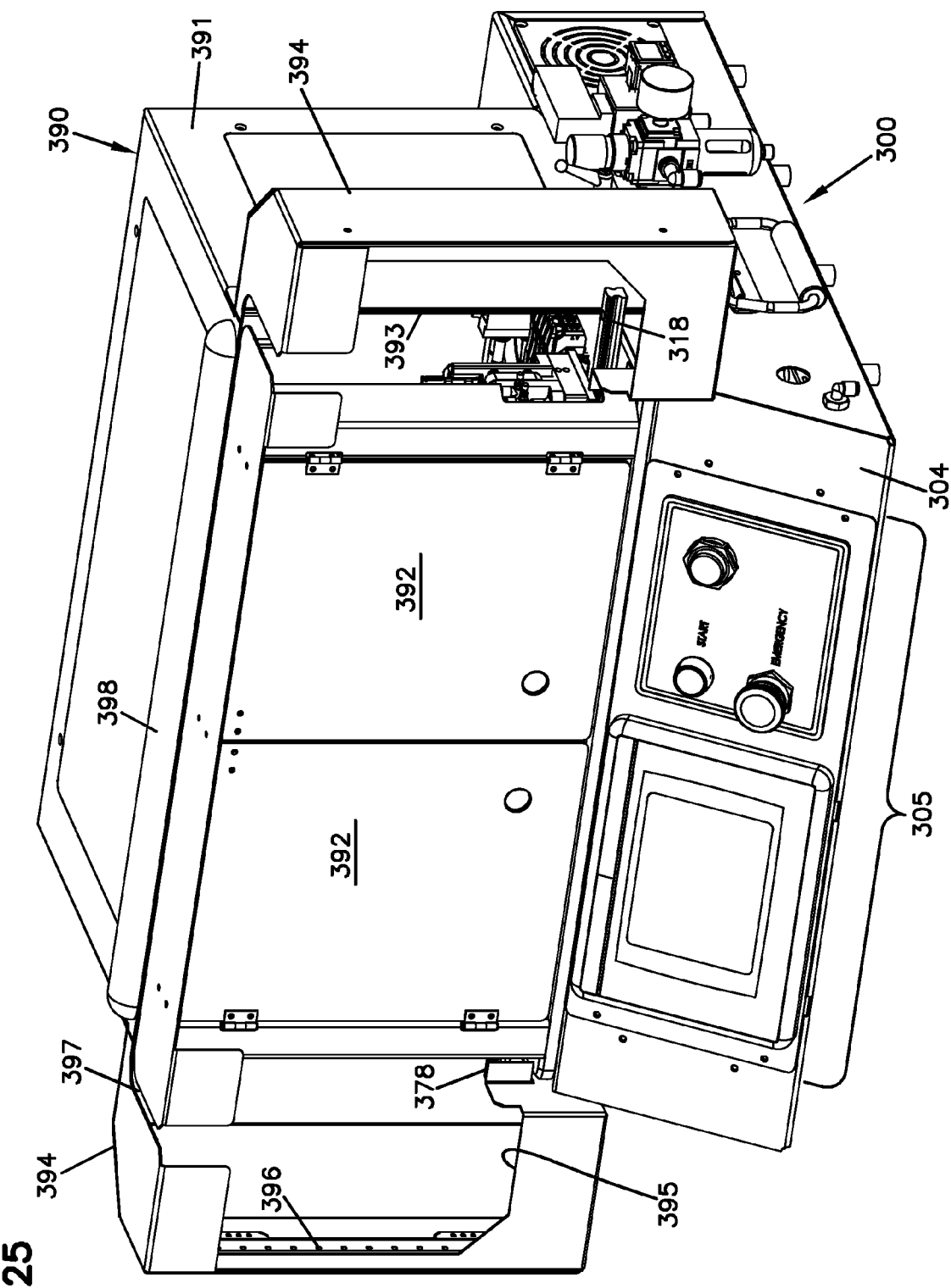
FIG. 25 is a perspective view of the strip-clean-cleave station of FIG. 14 with a guard arrangement mounted thereon.

FIG. 25 illustrates a guard arrangement 390 mounted to the station body 300. The guard arrangement 390 includes a guard body 391 having a rear wall and a top wall that both extend between opposing sidewalls. The guard body 391 defines an open bottom through which the sub-stations 310, 330, 340, 360, 370 extend into the guard body 391. The guard body 391 also defines an open front through which the sub-stations can be accessed by a user. In some implementations, the open front can be selectively closed with one or more guard doors 392 (e.g., pivoting doors, sliding doors, etc.). During operation of the strip-clean-cleave station 104, 104', the guard doors 392 remain shut. Accordingly, the guard doors 392 aid in inhibiting the cables 22 being processed from exiting the guard body 391 during movement of the walking beam 380.

In some implementations, the guard body 391 defines apertures 393 through which the rails 318, 378 extend. Accordingly, the dock members 311, 371 of the load and unload sub-stations 310, 370 can move into and out of the guard body 391 through the apertures 393 when moving between the first and second positions. Enclosure wings 394 extend outwardly from the guard body 391 at the apertures 393 to partially enclose a work space around the distal ends of the rails 318, 378. For example, the enclosure wings 394 can cover a rear, top, and side of the work space. The enclosure wings 394 define front apertures 395 or open fronts through which the dock members 311, 371 can be accessed. For example, the load and unload dock members 311, 371 can be accessed through one of the apertures 395 when in the outer positions. In certain examples, the dock members 311, 371 cannot be accessed through one of the apertures 395 when in the inner positions.

In some implementations, the guard arrangement 390 includes a light curtain arrangement 396 that extends across the front apertures 395 of the enclosure wings 394. In certain examples, the control unit 304 pauses or ceases operation of the walking beam 380 when the light curtain is broken or otherwise tripped. Accordingly, the light curtain 396 protects the user from the walking beam 380 during movement. In certain implementations, the light curtain is deactivated during operation of the sub-stations (e.g., when the load and unload sub-stations 310, 370 are moved to the outer positions). Accordingly, the user can access the docks 311, 371 to load holders 260, 280 to be processed and to retrieve processed holders 260, 280.

In some implementations, the guard arrangement 390 defines a top slot 397 or channel through which the cables 22 can extend from the cable holders 280 when being processed at the cable strip-clean-cleave station 104. Cables 22 hanging down from the tracks 144 extend through the top slot 397 to the holders 280 being processed. In certain examples, the top slot 397 extends across a length of the guard body 391 to accommodate the cables 22 as the holder 280 is moved between sub-stations 310, 330, 340, 360, 370. In certain examples, the top slot 397 is defined through the enclosure wings 394 to accommodate the cable 22 when the holder 280 is mounted at the load dock 311 and retrieved from the unload dock 371.

In certain implementations, a cable indexing arrangement is disposed at the top slot 397 of the guard arrangement 390. The cable indexing arrangement contacts the cables 22 and advances the cables 22 along the top slot 397 in synchronization with the walking beam 380. In some examples, the cable indexing arrangement includes a belt arrangement that holds the cables 22 between two belts. Each belt can be mounted over rollers so that the belt is configured to slide in a continuous loop. In certain examples, one belt can be advanced by rotating the rollers, thereby indexing the cables 22.

In use, a user inserts a first holder 260, 280 through the front aperture 395 of an enclosure wing 394 and places the first holder 260, 280 at the load dock 311. The load dock 311 moves to the inner position, thereby carrying the first holder 260, 280 into alignment with one of the grasping arrangements 382 of the walking beam 380. The walking beam 380 moves the first holder 260, 280 from the load dock 311 to the strip sub-station 330 at which a coating is removed from a fiber core of an optical fiber or stub held by the first holder 260, 280. While the strip sub-station 330 is operating, a user loads a second holder 260, 280 at the load dock 311.

When the strip sub-station 330 completes operation, the walking beam 380 moves the first holder 260, 280 from the strip sub-station 330 to one of the docks 342*a*, 342*b* of the clean sub-station 340. The clean sub-station 340 cleans (e.g., removes coating particles or other remnants from) the stripped fiber core while the strip sub-station 330 removes a coating from a fiber core of an optical fiber or stub held by the second holder 260, 280. When the strip sub-station 330 completes operation, the walking beam 380 moves the second holder 260, 280 to one of the docks 342*a*, 342*b* of the clean sub-station 340.

In some examples, the walking beam 380 places the second holder 260, 280 at a different dock 342*a*, 342*b* of the clean sub-station 340 than the first holder 260, 280. For example, the clean sub-station 340 may move between a forward and rearward position to align a different dock 342*a*, 342*b* with the walking beam 380. Accordingly, both holders 260, 280 may be processed by the clean sub-station 340 during the same cycle. On the next cycle, the walking beam 380 moves the first holder 260, 280 to the cleave sub-station 360. In other examples, the walking beam 380 moves the first holder 260, 280 to the cleave sub-station 360 when the second holder 260, 280 is moved to the clean sub-station 340.

The cleave sub-station 360 severs a tip of the stripped and cleaned fiber core of the first holder 260, 280. For example, the cleave sub-station 360 may tension cleave the fiber core. When the cleave sub-station 360 completes operation, the walking beam 380 carries the first holder 260, 280 to the unload dock 371. The walking beam 380 also carries the second holder 260, 280 to the cleave sub-station 360. The unload dock 371 moves to the outer position to provide a user with access to the processed first holder 260, 280. The user can retrieve the first holder 260, 280 from the output side 138 of the strip-clean-cleave station 104, 104' while the second holder 260, 280 is being processed by the cleave sub-station 360.

In some implementations, the control unit 304 of the strip-clean-cleave station 104, 104' operates each of the sub-stations 310, 330, 340, 360, 370 regardless of whether a holder 260, 280 is received at the sub-station. In other implementations, the control unit 304 only operates the sub-station 310, 330, 340, 360, 370 when the presence sensor 316, 336, 346, 376 indicates that a holder 260, 280 is received at the sub-station. In certain examples, each sub-station 310, 330, 340, 360, 370 includes a presence sensor. In other examples, one or more sub-stations 310, 330, 340, 360, 370 do not include a presence sensor.

The holders 280 holding the optical fibers 26 processed by the cable strip-clean-cleave station 104 are placed in the gravity feed arrangement 140, which directs the processed holders 280 to the staging area 142 (see FIG. 8). The cables 20 extending from the holders 280 are moved along the track 144. The stubs 54 processed by the stub strip-clean-cleave station 104' and corresponding ferrules 52 are removed from the holders 260 and placed in the carrier 80, which is brought to the table arrangement 102 (e.g., to the staging area 142 or elsewhere within reach of a user operating one of the splice stations 106). A user loads the holders 280 and ferrules 52 into the splice station 106.

Figure 26:
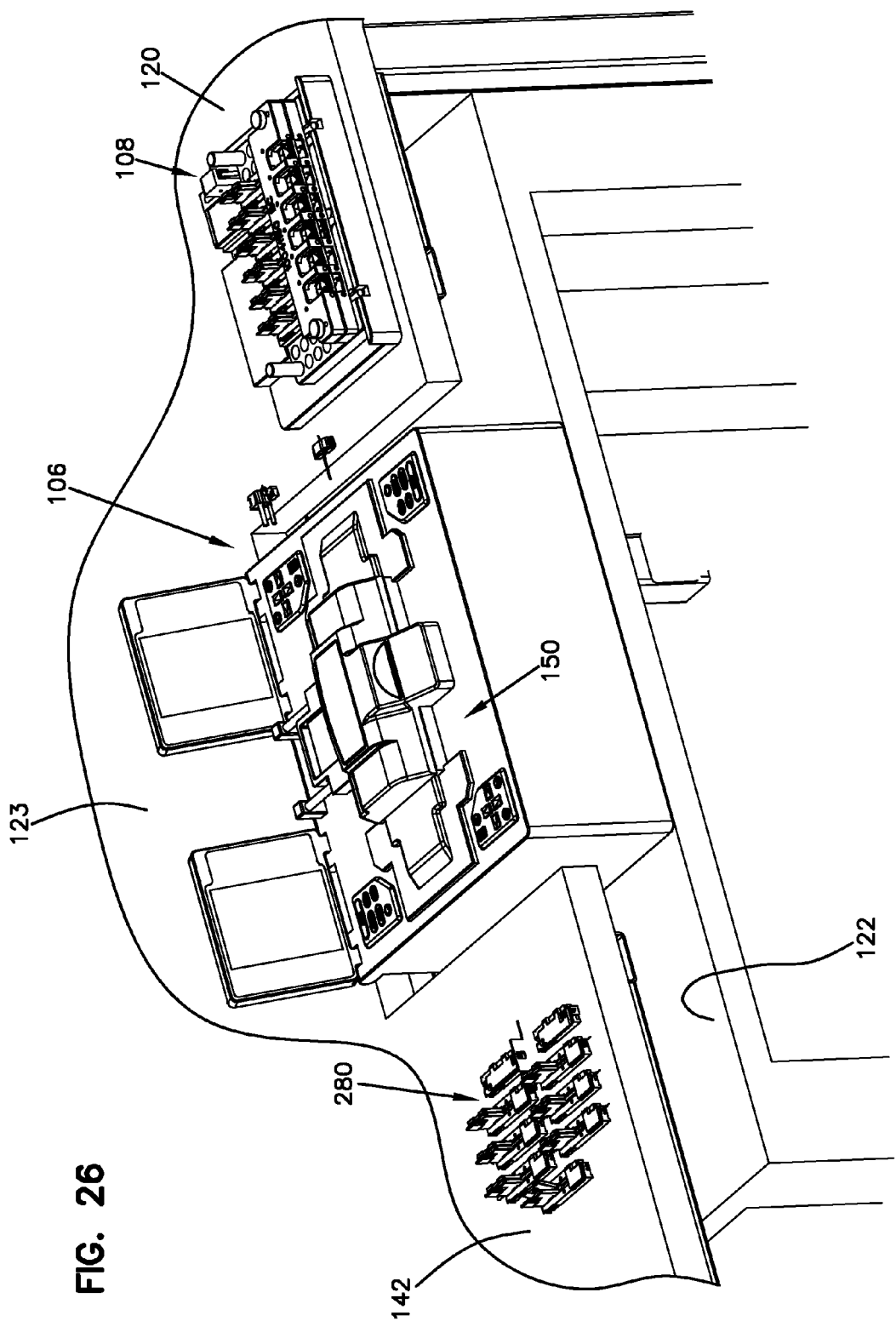
FIG. 26 is an enlarged view of an example splice station suitable for use in the processing cell of FIG. 7.
Figure 27:
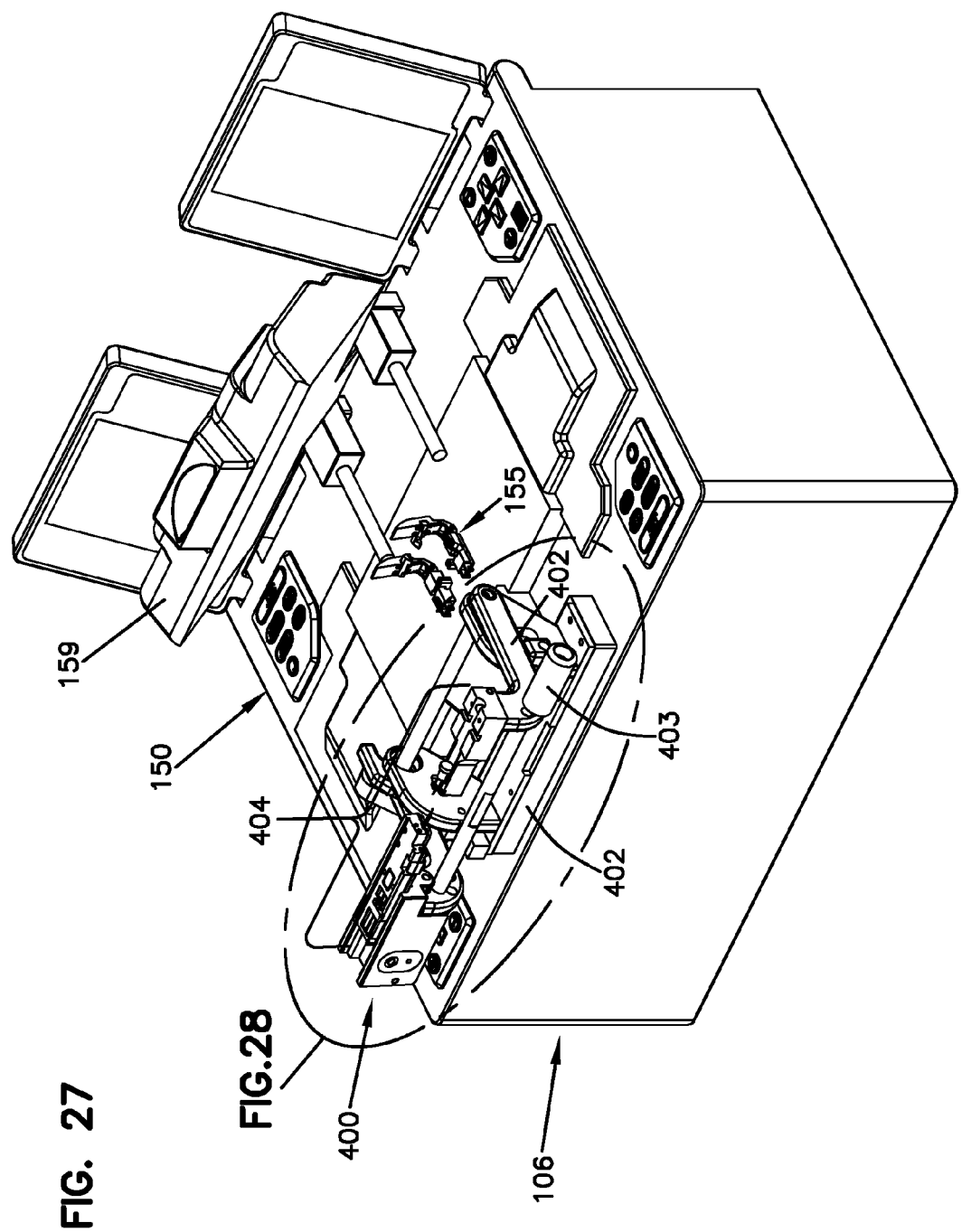
FIGS. 27-33 illustrate an example pre-positioning arrangement that facilitates mounting the ferrule of the optical fiber stub and the holder of the optical fiber at the alignment system.

FIG. 26 illustrates an example optical (e.g., fusion) splice station 106 supported by a table 122 that is separate from the main table 120. In certain examples, each optical splice station 106 includes an optical splice machine 150. The optical splice machine 150 can include one or more holder mounting locations for mounting one or more of the holders supporting the processed optical fibers 26 of the fiber optic cables 22. The optical splice machine 150 can also include one or more mounting locations for mounting one or more of the ferrules 52 with the processed optical stubs 54. For ease in explanation, the following disclosure will refer to a fiber optic cable 22 and a ferrule stub 54. It will be understood, however, that some machines 150 may service multiple cables 22 and stubs 54 simultaneously.

It will be appreciated that the ferrule 52 with the optical fiber stub 54 can be removed from the custom carrier 80 and loaded into the appropriate mounting location within the optical splice machine 150. It will be appreciated that the mounting location for the ferrule 52 with the optical fiber stub 54 is in general axial alignment with the mounting location for the holder 280 that hold the optical fiber 26 of the fiber optic cable 22. In certain examples, the optical splice machine 150 can include an active-alignment system 155 that adjusts the positions of the optical fiber stub 54 relative to the positions of the optical fiber 26 so as to achieve coaxial alignment between the optical fiber stub 54 and their corresponding optical fiber 26 of the fiber optic cable 22.

In certain examples, the optical fiber stub 54 can be processed at the stub strip-clean-cleave 104' to partially remove a coating from the stub 54, resulting in a stub 54 having a bare fiber section at the end and a coated fiber section at the ferrule 52. The coated fiber section can include a coating such as a 250 micron acrylate coating. In certain examples, the mounting location within the fusion splice machine 150 for receiving the optical fiber stub 54 can include a V-groove for receiving the coated portion of the optical fiber stub 54. In certain examples, the V-groove is defined within a material, such as ceramic, suitable for protecting the coated portion of the optical fiber stub 54 during fusion splicing. A clamping mechanism can be used to hold the coated portion of the optical fiber stub 54 within the V-groove.

Similarly, the mounting location within the fusion splice machine 150 for receiving the optical fiber 26 and its corresponding holder 280 can define a V-groove for receiving a coated portion of the optical fiber 26. The V-groove can be defined within a material, such as ceramic, suitable for protecting the coated portion of the optical fiber 26 during fusion splicing. Clamping mechanisms can be used to press the coated portions of the optical fiber 26 into their corresponding V-groove.

In accordance with some aspects of the disclosure, the fusion splice machine 150 can include a pre-positioning arrangement that facilitates mounting the optical fiber 26 and the optical fiber stub 54 at the alignment system 155 of the optical splice machine 150. FIGS. 27-33 illustrate an example pre-positioning arrangement 400 that facilitates mounting the ferrule 52 of the optical fiber stub 54 and the holder 280 of the optical fiber 26 at the alignment system 155. The pre-positioning arrangement 400 enables a user to align (e.g., coaxially) the optical fiber 26 and the optical fiber stub 54 at a first position (e.g., see FIGS. 27 and 31) away from the alignment system 155 of the fusion splice machine 150 and to unitarily move the optical fiber 26 and the optical fiber stub 54 to a second position (e.g., see FIG. 33) at the alignment system 155 while maintaining the alignment of the optical fiber 26 and the optical fiber stub 54.

In some implementations, the pre-positioning arrangement 400 includes a base 401, a frame 402 that is movable relative to the base 401 between the first and second positions, and a mounting area 404 that is disposed on the frame 402. The base 401 is disposed at a fixed position relative to the fusion splice machine 150. In an example, the base 401 is mounted to the fusion splice machine 150 (e.g., see FIG. 27). The optical fiber 26 and the optical fiber stub 54 can be disposed at the mounting area 404 when the mounting area 404 is disposed in the first position (e.g., see FIG. 31). Moving the frame 402 to the second position moves the optical fiber 26 and the optical fiber stub 54 to the alignment arrangement of the splice machine 150 (e.g., see FIG. 33).

Accordingly, the pre-positioning arrangement 400 can facilitate tuning the optical fibers 26, 54. For example, in some splice machines 150, the stub fiber 54 must be positioned on the alignment arrangement 155 so that the tuning indicium/indicia faces/face away from the user (e.g., downwardly). The pre-positioning arrangement 400 enables the user to position the stub fiber 54 at the mounting area 404 with the tuning indicium/indicia facing towards the user (e.g., upwardly) for ease in viewing. The mounting area 404 can then be moved so that the stub fiber 54 is positioned at the alignment arrangement 155 with the tuning indicium/indicia facing away from the user as appropriate. In this way, the stub fiber 54 can be more precisely positioned relative to the cable fiber 26.

The mounting area 404 is configured to receive the optical fiber 26 and the optical fiber stub 54 prior to the optical fiber 26 and the optical fiber stub 54 being disposed at the alignment arrangement. In some implementations, the mounting area 404 faces away from the alignment system of the fusion splice machine 150 when in the first position and the mounting area 404 faces towards the alignment system when in the second position. Accordingly, the optical fiber 26 and the optical fiber stub 54 have a first rotational orientation when in the first position (e.g., see FIG. 31) and have a second rotational orientation when in the second position (e.g., see FIG. 33). In certain examples, the frame 402 pivots between the first and second positions.

In some implementations, the pre-positioning arrangement 400 includes a retention arrangement at the mounting area 404. The retention arrangement is configured to selectively retain the optical fiber 26 and the optical fiber stub 54 the mounting area 404 in a fixed axial orientation relative to each other and to selectively release the optical fiber 26 and the optical fiber stub 54 from the mounting area 404. The retention arrangement selectively holds the optical fiber 26 and the optical fiber stub 54 in alignment even when the frame 402 is being moved towards the second position.

Figure 28:
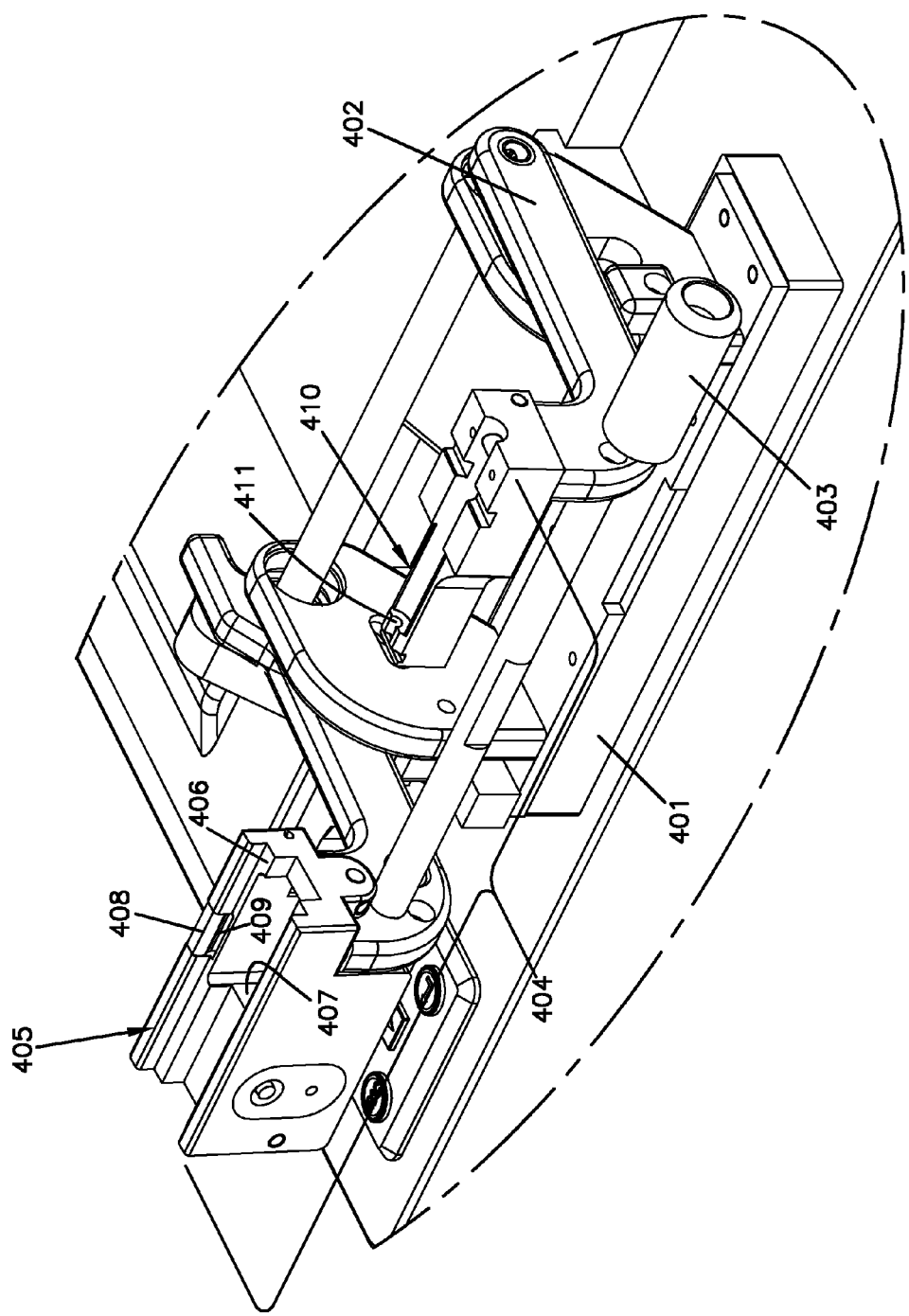

In some implementations, the mounting area 404 includes a cable mounting area 405 and a stub mounting area 410 (e.g., see FIG. 28). The cable mounting area 405 is spaced from the stub mounting area 410 along an axis of the cable fiber 26 and stub fiber 54. The cable mounting area 405 and the stub mounting area 410 are configured to receive the optical fiber 26 and the optical fiber stub 54, respectively, so that the optical fiber 26 and the optical fiber stub 54 faces each other in axial (e.g., coaxial) alignment (e.g., see FIG. 30).

The cable mounting area 405 is structured to receive the holder 280 of the optical fiber 26. In examples, the cable mounting area 405 includes a recessed seat 406 at which the holder 280 can be disposed (e.g., see FIG. 28). In certain examples, the cable mounting area 405 is structured to receive the cable holder 280 with the clamp arrangement 286 (FIG. 12) facing downwardly (e.g., towards the splice machine 150) when the pre-positioning system 400 is disposed in the first position (e.g., see FIGS. 30-31). For example, the cable mounting area 405 may defines an aperture or recess 407 sized to accommodate the clamp arrangement 286 of the cable holder 280 (e.g., see FIG. 28).

Figure 30:
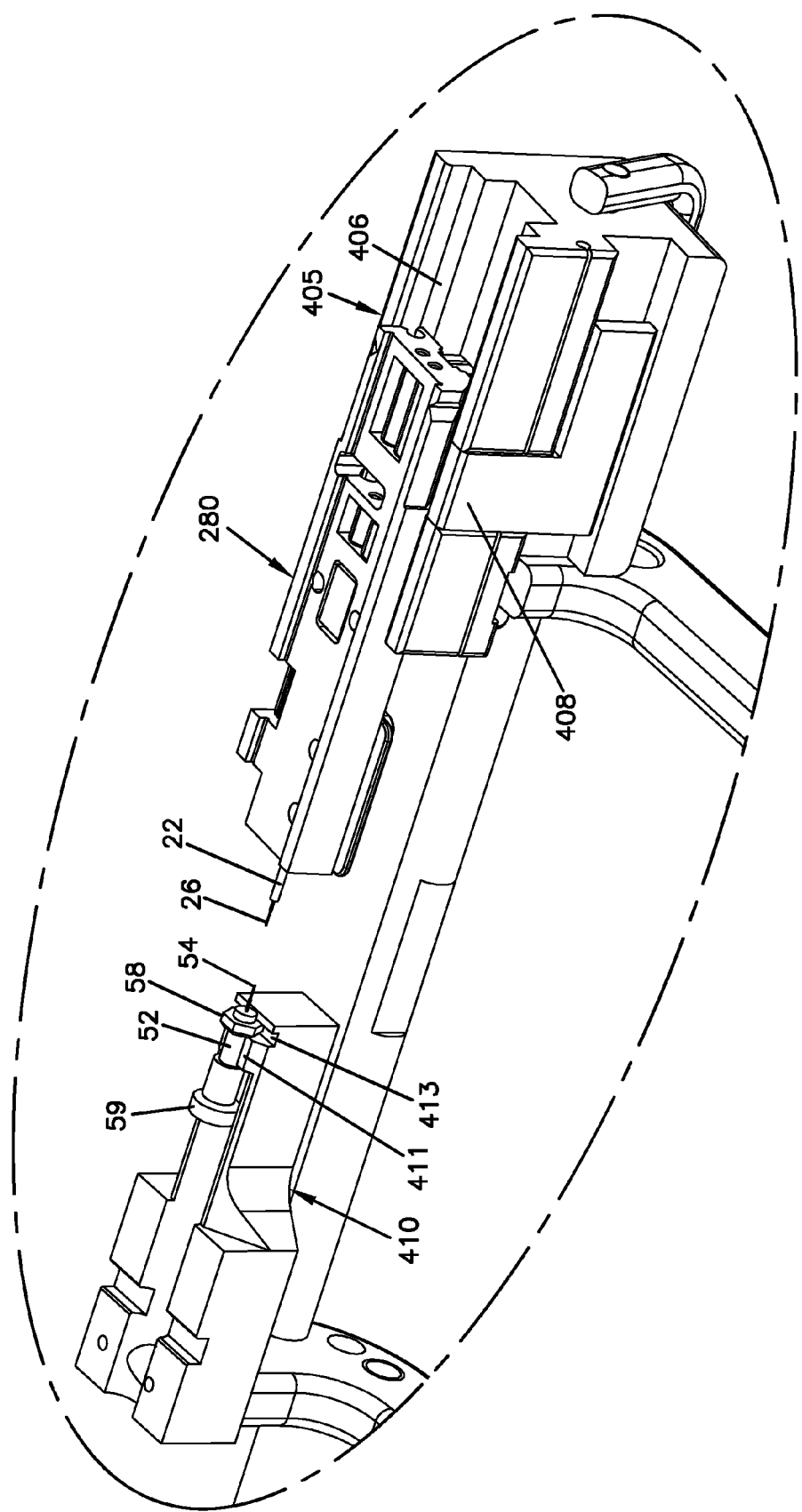

In some implementations, the retention arrangement of the pre-positioning arrangement 400 includes a finger or flange 408 disposed at the cable mounting area 405 (e.g., see FIGS. 28 and 30). The finger 408 is movable (e.g., slidable, pivotable, deflectable) towards and away from the holder 280. In an example, the finger or flange 408 includes a latching hook 409 that latches to the holder 280 when the finger or flange 408 is moved towards the holder 280 and unlatches from the holder 280 when the finger or flange 408 is moved away from the holder 280. In another example, the finger or flange 408 clamps and unclamps the holder 280 when the finger or flange is moved towards and away from the holder 280.

Figure 29:
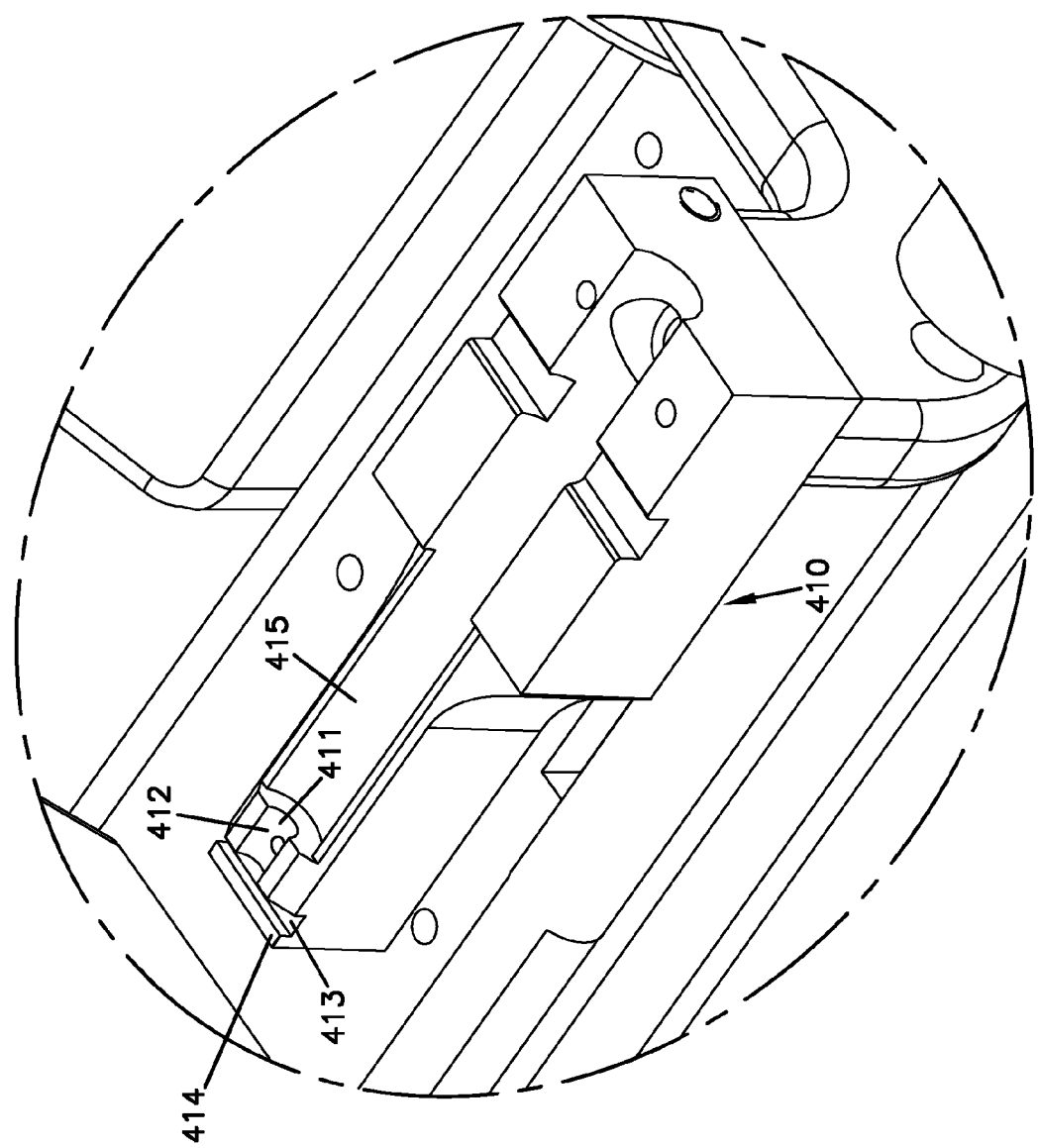

In some implementations, the stub mounting area 410 includes a ferrule mount 411 at which the ferrule 52 of the stub fiber 54 can be disposed (e.g., FIG. 29). In certain examples, the stub mounting area 410 is configured to hold the front hub portion 58 of the stub fiber 54. For example, the stub mounting area 410 may define a recess 413 and a shoulder 414. The recess 413 is sized to receive an edge of the front hub portion 58 (FIG. 3) so that the rear end 76 of the front hub portion 58 abuts against the shoulder 414 (e.g., see FIG. 30). In certain examples, the stub mounting area 410 is configured is accommodate a dust cap 58 (FIG. 10) mounted over the ferrule 52. For example, the stub mounting area 410 defines a channel 415 sized to accommodate the dust cap 58 (e.g., see FIG. 30).

In some implementations, the retention arrangement of the pre-positioning arrangement 400 includes a vacuum system. For example, the ferrule mount 411 may define a port 412 at which a vacuum force can be applied to the ferrule 52 (see FIG. 29). The vacuum force holds the ferrule 52 to the ferrule mount 411. In certain implementations, the vacuum force also can be applied to the finger 408 of the cable mounting area 405 to actuate movement of the finger 408 towards the holder 280. In certain examples, a vacuum of the vacuum system can be disposed at a location remote from the fusion splice machine 150 and vacuum tubes can be routed between the vacuum and the stub mounting area 410 and/or the cable mounting area 405 of the pre-positioning arrangement 400.

In some implementations, the vacuum force can be discontinued at the port 412 (and/or at the finger 408) to release the stub fiber 54 (and/or the optical fiber 26). In other implementations, the vacuum force can be reversed at the port 412 (and/or at the finger 408) to release the stub fiber 54 (and/or the optical fiber 26). For example, air or other fluid can be emitted from the port 412 to push the ferrule 52 of the stub fiber 54 away from the stub mounting area 410. In an example, air or other fluid can be used to push the finger 408 away from the holder 280. In other implementations, the cable mounting area 405 may define a port at which a vacuum force and/or reverse vacuum force can be directly applied to the holder 280.

In some implementations, the retention arrangement is configured to automatically retain the stub fiber 54 and the optical fiber 26 when the mounting area 404 is disposed in the first position. In certain implementations, the retention arrangement is configured to automatically release the stub fiber 54 and the optical fiber 26 when the mounting area 404 is disposed in the second position. For example, the pre-positioning arrangement 400 may include one or more sensors that determine the position of the mounting area 404. In an example, when the one or more sensors determine that the mounting area 404 is disposed in the first position, the sensors trigger the vacuum to apply the vacuum force. When the one or more sensors determine that the mounting area 404 is disposed in the second position, the sensors trigger the vacuum to discontinue or reverse the vacuum force.

In an example, a first microswitch is disposed at the pre-positioning arrangement 400 to be actuated when the frame 402 is moved to the first position. For example, the first microswitch may be configured to be actuated when the frame 402 reaches the first position. The first microswitch triggers the vacuum to apply a vacuum force. A second microswitch is disposed at the pre-positioning arrangement 400 to be actuated when the frame 402 is moved to the second position. For example, the second microswitch may be configured to be actuated when the frame 402 reaches the second position. The second microswitch triggers the vacuum to reverse the vacuum force.

Figure 31:
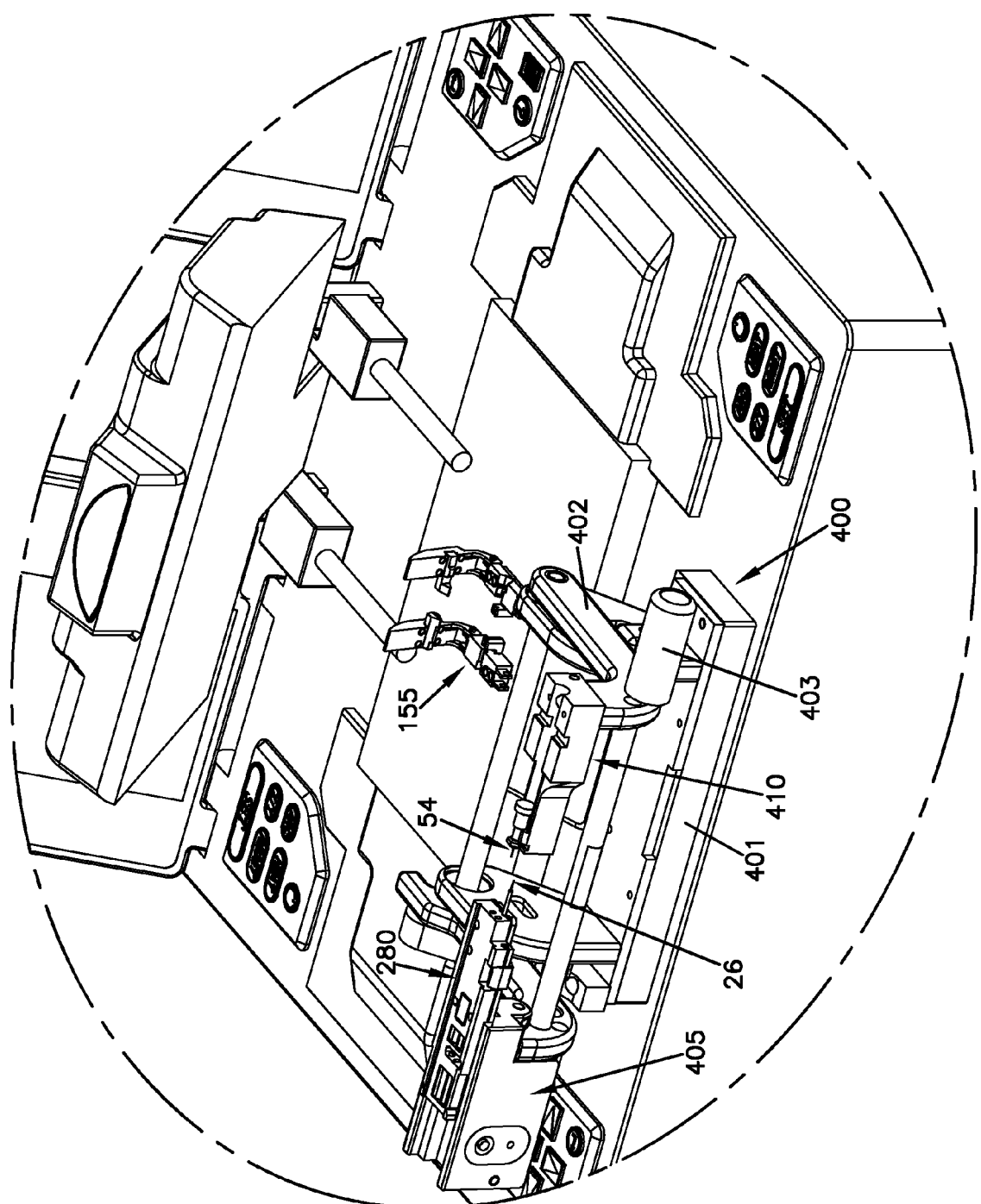
Figure 32:
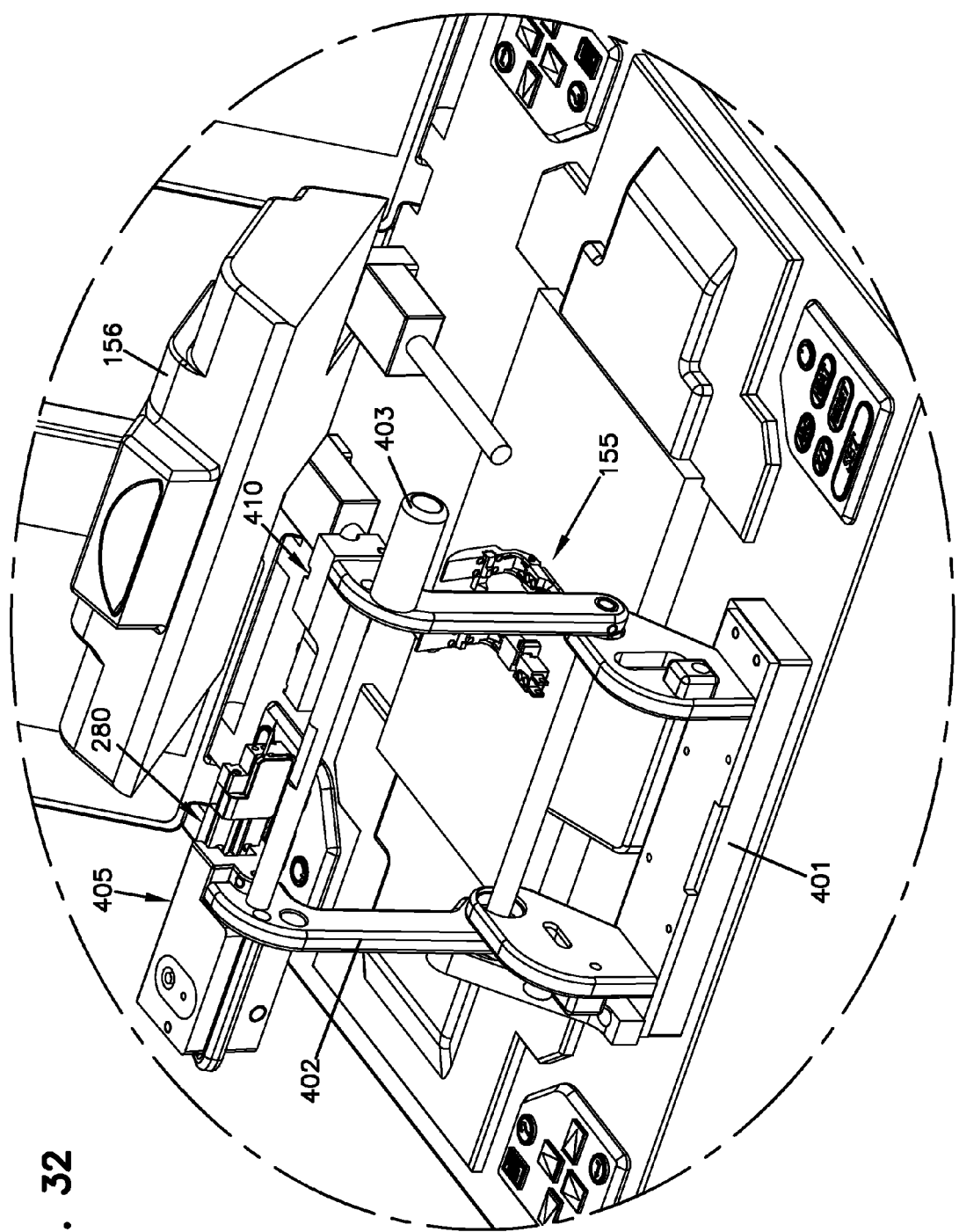
Figure 33:
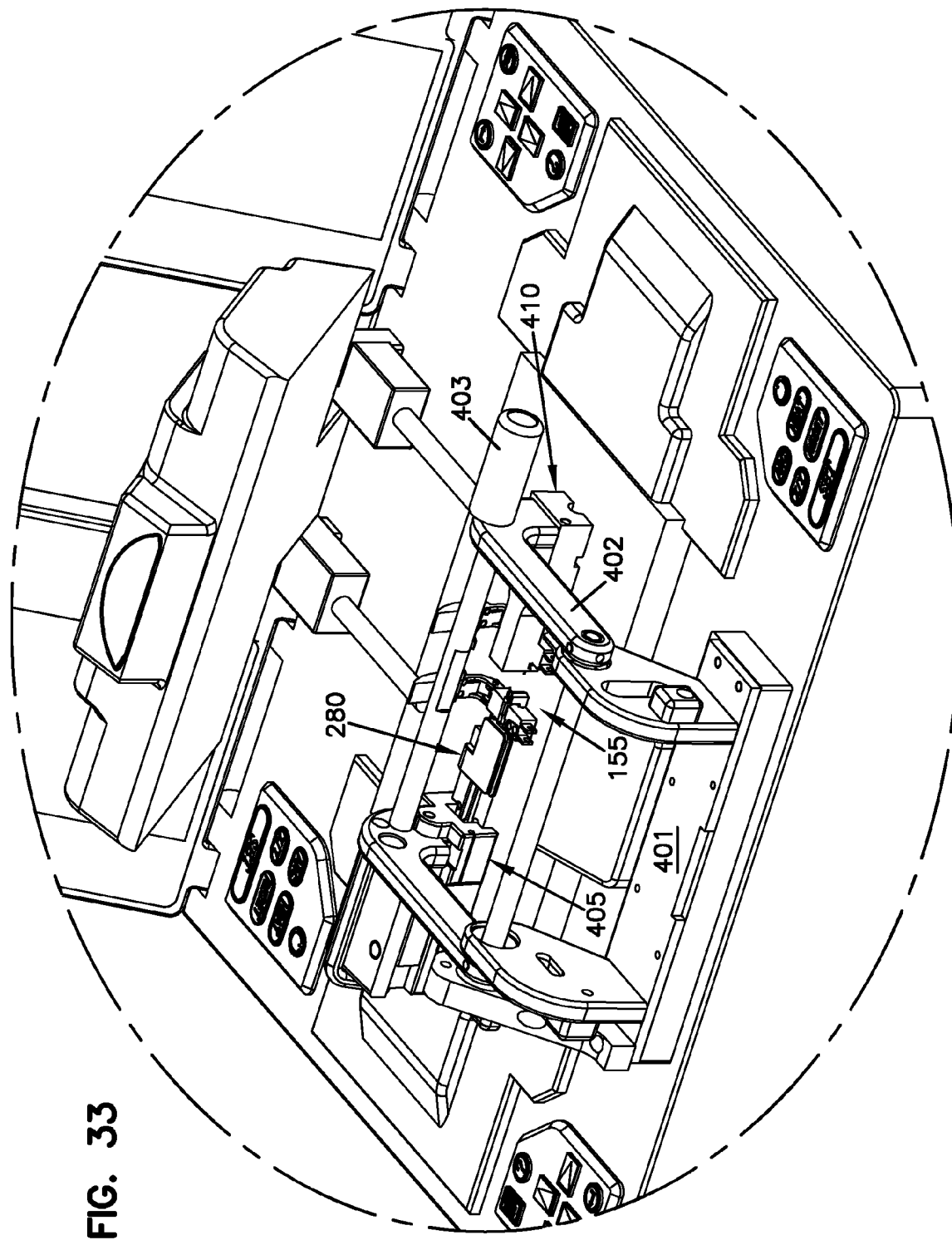
Figure 34:
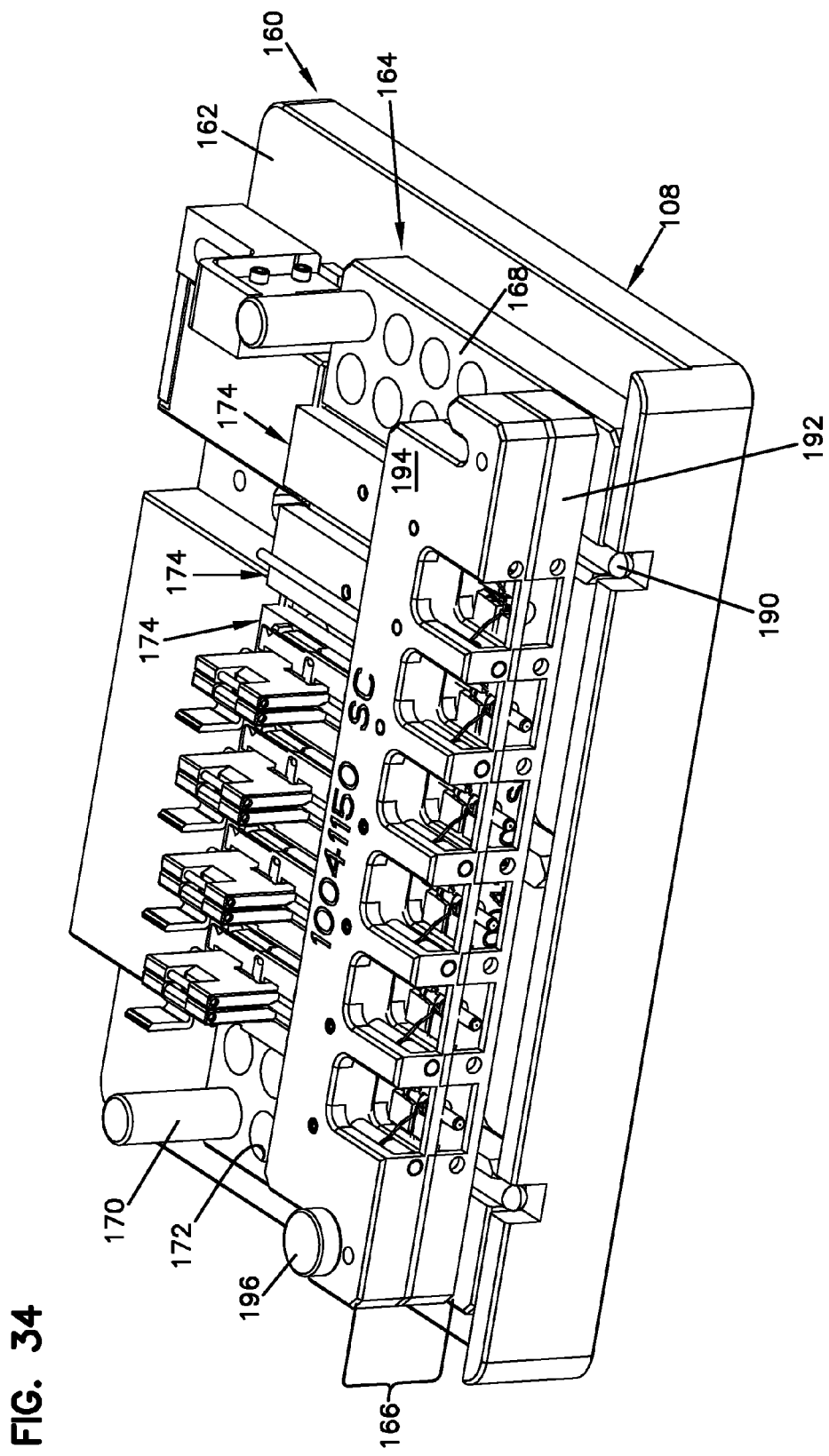
FIGS. 34-36 is an enlarged view of an example overmold station suitable for use in the processing cell of FIG. 7.
Figure 35:
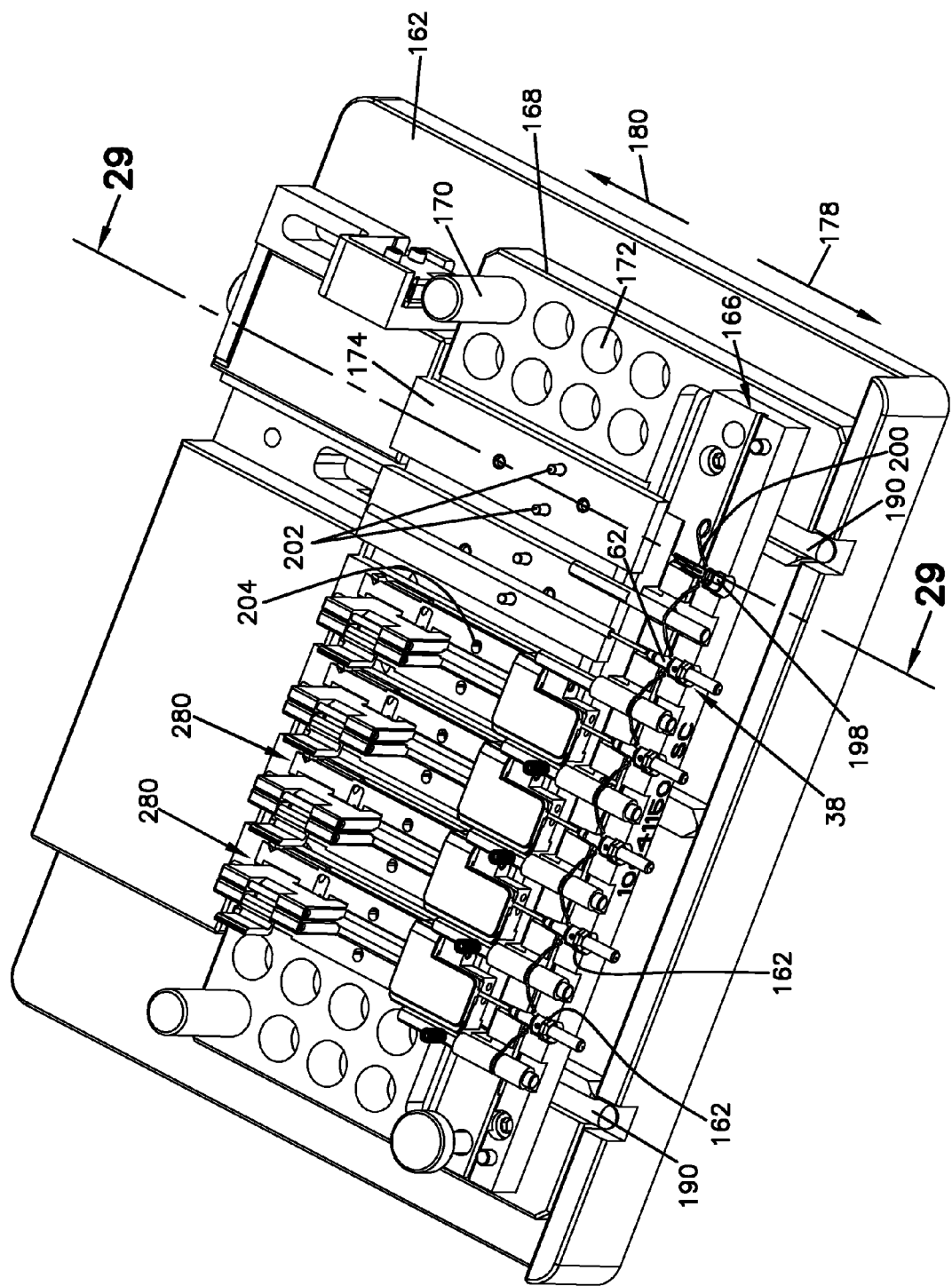
Figure 36:
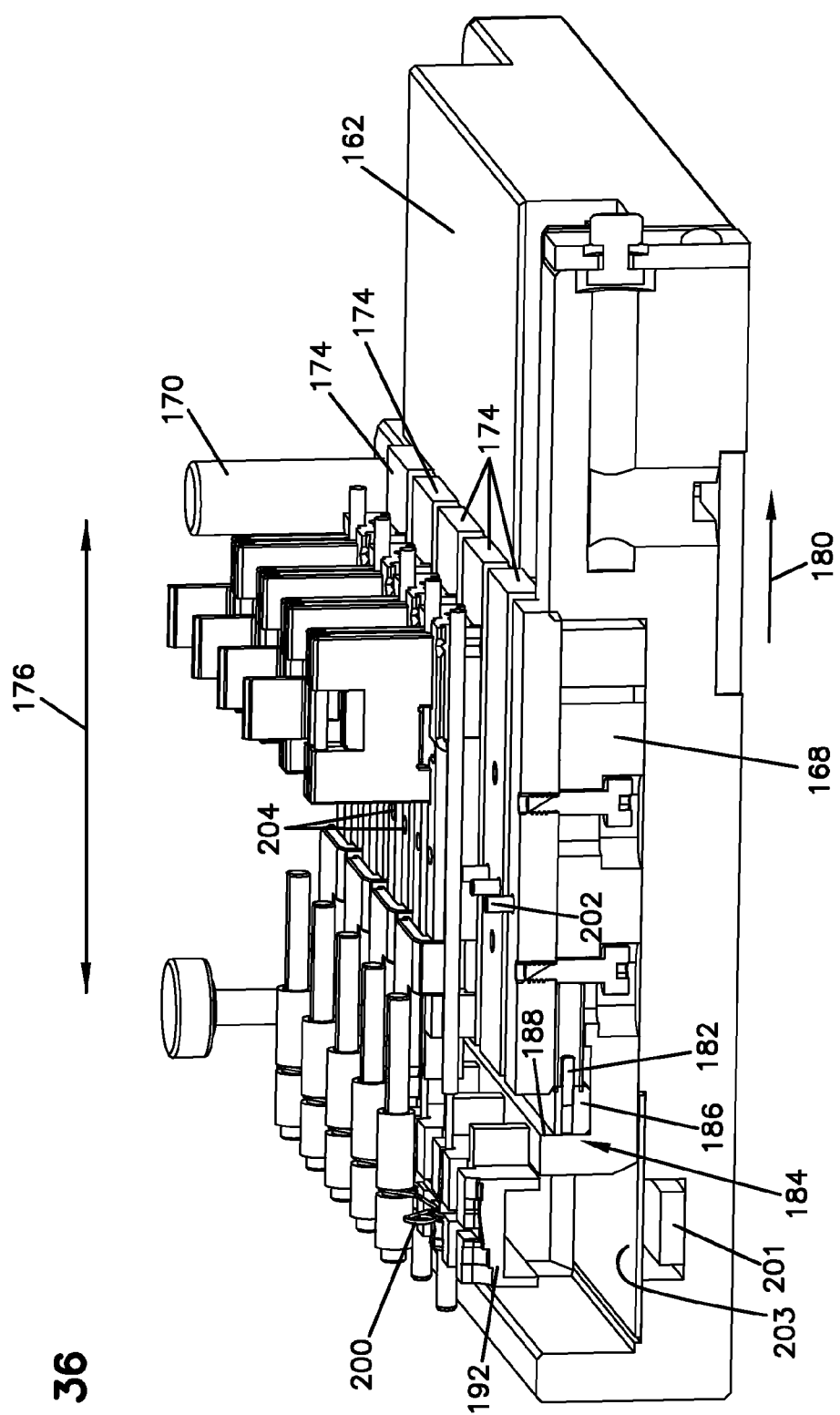

FIGS. 31-33 illustrate positioning example optical fibers to be spliced at an optical splice machine 150 using an example pre-positioning arrangement 400. In FIG. 31, a user mounts the fibers to a mounting area 404. For example, the user can mount a clip 280 holding a first optical fiber 26 to a cable mounting region 405 of the pre-positioning arrangement 400. The user also mounts a ferrule 52 holding a second optical fiber 54 to a stub mounting region 410 of the pre-positioning arrangement 500 so that the first and second optical fibers 26, 54 are aligned relative to each other in an alignment position. The first and second optical fibers 26, 54 are retained in the alignment position using the pre-positioning arrangement 400.

As shown in FIG. 32, the user moves the cable mounting region 405 and the stub mounting region 410 towards the alignment arrangement 155 of the optical splice machine 150 while retaining the first and second optical fibers 26, 54 in the alignment position. As will be understood by a person skilled in the art, the user can move the mounting regions 405, 410 manually or automatically with an electronic mechanism. In some implementations, the user applies force to a handle 403 to pivot or otherwise manually move the frame 402 relative to the base 401.

In FIG. 33, the mounting area 404 has been moved to the second position. The first and second optical fibers 26, 54 are released at the alignment arrangement 155 while the first and second optical fibers 26, 54 are maintained in the alignment position. In some implementations, the retention force being applied to the fibers 26, 54 is simply ceased. In other implementations, a reverse force (e.g., a blowing force) can be applied to the fibers 26, 54 to inhibit the fibers 26, 54 from sticking to the mounting area 404. The user can then move the mounting area 404 back to the first position.

In certain examples, the fusion splice machine 150 can utilize a multi-step fusion process. In one example, the optical fiber stubs 54 are spliced to their corresponding optical fibers 26 by initially performing a pre-softening step in which the ends of the optical fiber stubs 54 are displaced slightly from the ends of their corresponding optical fibers 26 while an arc having a first intensity is applied to the ends of the optical fiber stubs 54 and the ends of the optical fibers 26. The intensity of the arc is sufficient to soften the glass of the fibers and occurs for a relatively short duration. After the pre-fusion softening step, an arc having a second intensity is applied to the ends of the optical fiber stubs 54 and the ends of the optical fibers 26 and the ends of the optical fiber stubs 54 are moved together thereby closing the displacement and bringing the ends in contact with each other. The second intensity of the arc is higher than the first intensity and is sufficiently high to fuse the ends of the optical fiber stubs 54 to the ends of the optical fibers 26.

In certain examples, the ends of the optical fiber stubs 54 are displaced from the ends of their corresponding optical fibers 26 by no more than 12 µm. In certain examples, the ends of the optical fiber stubs 54 are displaced from the ends of their corresponding optical fibers 26 by no more than 10 µm. In certain examples, the ends of the optical fiber stubs 54 are displaced from the ends of their corresponding optical fibers 26 by no more than 8 µm. In an example, the ends of the optical fiber stubs 54 are displaced from the ends of their corresponding optical fibers 26 by no more than 6 µm.

In certain examples, the first arc applied to the slightly displaced ends of the optical fiber stubs 54 and corresponding optical fibers 26 is at least 1.5 mA less than a manufacturer recommended level calibrated by the fusion splice machine 150. In certain examples, the arc applied to the ends of the optical fiber stubs 54 and corresponding optical fibers 26 is at least 2 mA less than a manufacturer recommended level calibrated by the fusion splice machine 150. In certain examples, the arc applied to the ends of the optical fiber stubs 54 and corresponding optical fibers 26 is at least 2.5 mA less than a manufacturer recommended level calibrated by the fusion splice machine 150. In certain examples, the arc applied to the ends of the optical fiber stubs 54 and corresponding optical fibers 26 is at least 3 mA less than a manufacturer recommended level calibrated by the fusion splice machine 150. In certain examples, the arc applied to the ends of the optical fiber stubs 54 and corresponding optical fibers 26 is at least 3.5 mA less than a manufacturer recommended level calibrated by the fusion splice machine 150. In an example, the arc is at least 3.7 mA less than the calibrated level.

In certain examples, the first arc is applied to the slightly displaced ends for a period of no more than 45 ms. In certain examples, the arc is applied to the slightly displaced ends for a period of no more than 40 ms. In certain examples, the arc is applied to the slightly displaced ends for a period of no more than 35 ms. In certain examples, the arc is applied to the slightly displaced ends for a period of no more than 30 ms. In certain examples, the arc is applied to the slightly displaced ends for a period of no more than 25 ms. In certain examples, the arc is applied to the slightly displaced ends for a period of no more than 20 ms.

In certain examples, the second arc applied to the moved together ends of the optical fiber stubs 54 and corresponding optical fibers 26 is at least 0.5 mA greater than the manufacturer recommended level calibrated by the fusion splice machine 150. In certain examples, the arc applied to the moved together ends is at least 1 mA greater than the manufacturer recommended level calibrated by the fusion splice machine 150. In certain examples, the arc applied to the moved together ends is at least 1.2 mA greater than the manufacturer recommended level calibrated by the fusion splice machine 150. In an example, the arc applied to the moved together ends is at least 1.3 mA greater than the manufacturer recommended level calibrated by the fusion splice machine 150.

In certain examples, the second arc is applied to the moved together ends for at least 1000 ms and no more than 2800 ms. In certain examples, the second arc is applied to the moved together ends for at least 1000 ms and no more than 2500 ms. In certain examples, the second arc is applied to the moved together ends for at least 1000 ms and no more than 2400 ms. In certain examples, the second arc is applied to the moved together ends for at least 1000 ms and no more than 2200 ms. In certain examples, the second arc is applied to the moved together ends for at least 1000 ms and no more than 2000 ms.

In certain examples, the ends of the optical fiber stubs 54 and corresponding optical fibers 26 are moved together sufficient to partially overlap the optical fiber stubs 54 and corresponding optical fibers 26. In certain examples, the ends overlap by at least 1 μm and no more than 10 μm. In certain examples, the ends overlap by no more than 9 μm. In certain examples, the ends overlap by no more than 8 μm. In certain examples, the ends overlap by no more than 7 μm. In certain examples, the ends overlap by no more than 6 μm.

In one example splice process, the ends of the optical fiber stubs 54 are displaced about 6 μm from the ends of their corresponding optical fibers 26 while an arc that is at least 3.5 mA less than the calibrated level is applied to the ends of the optical fiber stubs 54 and the ends of the optical fibers 26 for about 20 ms. Then, the ends are pushed together until they overlap by about 7 μm and a second arc, which is at least 1 mA above the calibrated level, is applied for about 2000 ms.

After the fusion splice operation has been completed at the fusion splice station 106, the fiber optic cables 22 with the optical fiber stubs 54 and corresponding ferrules 52 spliced thereto are moved to the overmold station 108. For example, the cables 22 can be slid along the track 144 towards the overmold station 108. As shown in FIGS. 34-37, the overmold station 108 includes an overmold tool 160 that is configured to attach the hub shells 62 to the ferrules 52 to protect the splice location. The overmold tool 160 also is configured to test a tensile strength of the splice.

The overmold tool 160 includes a base 162, a holder fixture 164, and an overmold fixture 166. The holder fixture 164 includes a main plate 168 that mounts on the base 162. The base 162 can include pins 170 received in openings 172 of the main plate 168 to position the main plate 168 on the base 162. A latch or other mechanism can be used to secure the main plate 168 to the base 162 after the main plate 168 has been slid over the alignment pins 170. The holder fixture 164 includes a plurality of holder mounts 174 that are slidable along a front-to-rear axis 176 relative to the main plate 168. The holder mounts 174 are slidable in a forward direction 178 and a rearward direction 180 along the front-to-rear axis 176.

The holder fixture 164 also includes springs 182 corresponding to each of the holder mounts 174. The springs 182 bias the holder mounts 174 in the rear direction 180. The springs 182 can be compressed by an actuator 184 to increase the spring load applied to the holder mounts 174 by the springs 182. For example, the actuator 184 can include an actuator bar 186 mounted within a slot 188 defined by the main plate 168. The actuator 184 further includes actuator pins 190 coupled to the actuator bar 186. The actuator pins 190 are accessible at a front edge of the base 162. Forcing the actuator pins 190 to move in the rear direction 180 also forces the actuator bar 186 to move in the rear direction 180, thereby causing further compression of the springs 182 such that increased spring load is applied to the holder mounts 174.

The overmold fixture 166 mounts on top of the main plate 168 at a forward portion of the main plate 168. The overmold fixture 166 includes a bottom member 192 and a top cover 194. Fastening elements 196 (e.g., bolts) can be used to secure the overmold fixture 166 to the main plate 168 of the holder fixture 164. Pins provided on the bottom member 192 can fit within corresponding openings defined within the top cover 194 to ensure alignment between the bottom member 192 and the top cover 194.

The bottom member 192 defines a plurality of cavities 198 (e.g., receptacles) sized for receiving the outer hub shells 62 of the ferrule assemblies 38. In certain examples, the cavities 198 can have a shape that matches or complements the shape of the outer hub shells 62 such that the outer shell hubs nest within the cavities 198. The top cover 194 can include a plurality of springs 200 that press against the outer hub shells 62 within the cavities 198 of the bottom member 192 when the top cover 198 is mounted to the bottom member 192. In this way, the springs 200 assist in securely retaining the outer hub shells 62 within their corresponding cavities 198. The top cover 194 also includes windows corresponding to each of the cavities 198 for allowing access to the outer hub shells 62 within the cavities 192 even when the top cover 194 is mounted to the bottom member 192 (see FIGS. 34 and 37).

In some implementations, the base 162 includes a light source (e.g., an LED light bar) 201 configured to direct light towards the ferrule assemblies 38. In the example shown, the light source 201 is disposed beneath the bottom member 192. A diffuser 203 can be disposed between the light source 201 and the bottom member 192. Light emitted from the light source 201 may backlight the ferrule assemblies 38 during the overmold process. For example, the ferrule assemblies can be backlit while the overmold material is being injected through the port 70 of the outer hub shell 62.

In certain examples, the bottom member 192 and the top cover 194 can be constructed at least in part of a material that is transmissive to UV light. In certain examples, UV light having a wavelength in the range of 400 nm to 100 nm can be transmitted through the bottom member 192 and the top cover 194. In certain examples, the wavelength of the UV light depends on the type of injection mold material being used. In certain examples, the UV light wavelength ranges from about 300 nm to about 400 nm. In certain examples, the UV light wavelength ranges from about 350 nm to about 380 nm. In an example, the UV light wavelength is about 365 nm. In certain examples, portions of the bottom member 192 and the top cover 194 can be thinned so as to further enhance the ability of UV light to pass through the overmold fixture 166 to reach the cavities 198.

In use, the cable holders 280 are loaded onto their corresponding holder mounts 174 at the overmold station 108. During the holder loading process, pins 202 of the holder mounts 174 fit within corresponding openings 204 defined through the holders 280. In this way, the holders 280 are prevented from moving along the front-to-rear axis 176 relative to their corresponding holder mounts 174. Prior to the holder loading process, the bottom member 192 of the overmold fixture 166 can be pre-mounted in place on the main plate 168 of the holder fixture 164. Once the cable holders 280 have been mounted to the holder mounts 174, the outer hub shells 62 can be loaded into the cavities 198 of the bottom member 192.

To load the outer hub shells 62 into the cavities 198, the holder mounts 174 are urged towards the front direction 178 against the bias of the springs 182 and the spliced optical fiber 26 and optical fiber stub 54 are inserted into the interior of the outer hub shell 62 through the longitudinal slot 66. The outer hub shell 62 is then oriented such that the longitudinal slot 66 faces downwardly and the port 70 faces upwardly. The outer hub shell 62 is then inserted into its corresponding cavity 198 with the port 70 facing upwardly. After the outer hub shell 62 has been loaded into its corresponding cavity 198, the corresponding holder mount 174 is released, thereby allowing the spring 182 to urge the holder mount 174 towards the rear direction 178. The rearward bias of the spring 182 draws the front hub portion 58 of the ferrule assembly 38 against the front of the outer hub shell 62 and also applies tension to the spliced fibers cores of the optical fiber 26 and the optical fiber stub 54.

Next, the top cover 194 is mounted on the bottom member 192 causing the outer hub shells 62 to be securely retained within their corresponding cavities 198. The actuator 184 is then actuated by pressing against the actuator pins 190, thereby causing increased tension to be applied to the splice locations through the optical fibers 26. In this way, the mechanical splice integrity for each of the splices is tested. In the event that one of the splices is mechanically defective, the splice will break when the enhanced tension is applied to the optical fiber 26. Upon breakage of the splice, the corresponding holder mount 174 will move in the rear direction 180, thereby providing a visual indication that the splice has failed. Fiber optic cables 22 with failed splices can be removed for re-processing and replaced with another fiber optic cable assembly.

After the splices have been tension tested, an operator injects overmold material into the outer hub shells 62 through the ports 70. In this way, the overmold material encapsulates the splice locations and fills the interior cavities 64 defined by the outer hub shells 62. Example materials for the overmold material include acrylates, epoxies, urethanes, silicones and other materials. In certain examples, the overmold material can be UV curable (i.e., the material cures when exposed to ultraviolet radiations/light). In certain examples, the overmold material can be a hot melt material injected into the outer hub shells 62 through the ports 70. In still other examples, the overmold material can include a thermoplastic material or a thermal set material. In still other examples, the overmold material for overmolding the splice locations is a UV curable acrylate, such as OPTOCAST™ 3761 manufactured by Electronics Materials, Inc. of Breckenridge, Colo.; ULTRA LIGHT-WELD® 3099 manufactured by Dymax Corporation of Torrington, Conn.; and 3M™ SCOTCH-WELD™ manufactured by 3M Company of St. Paul, Minn.

Figure 37:
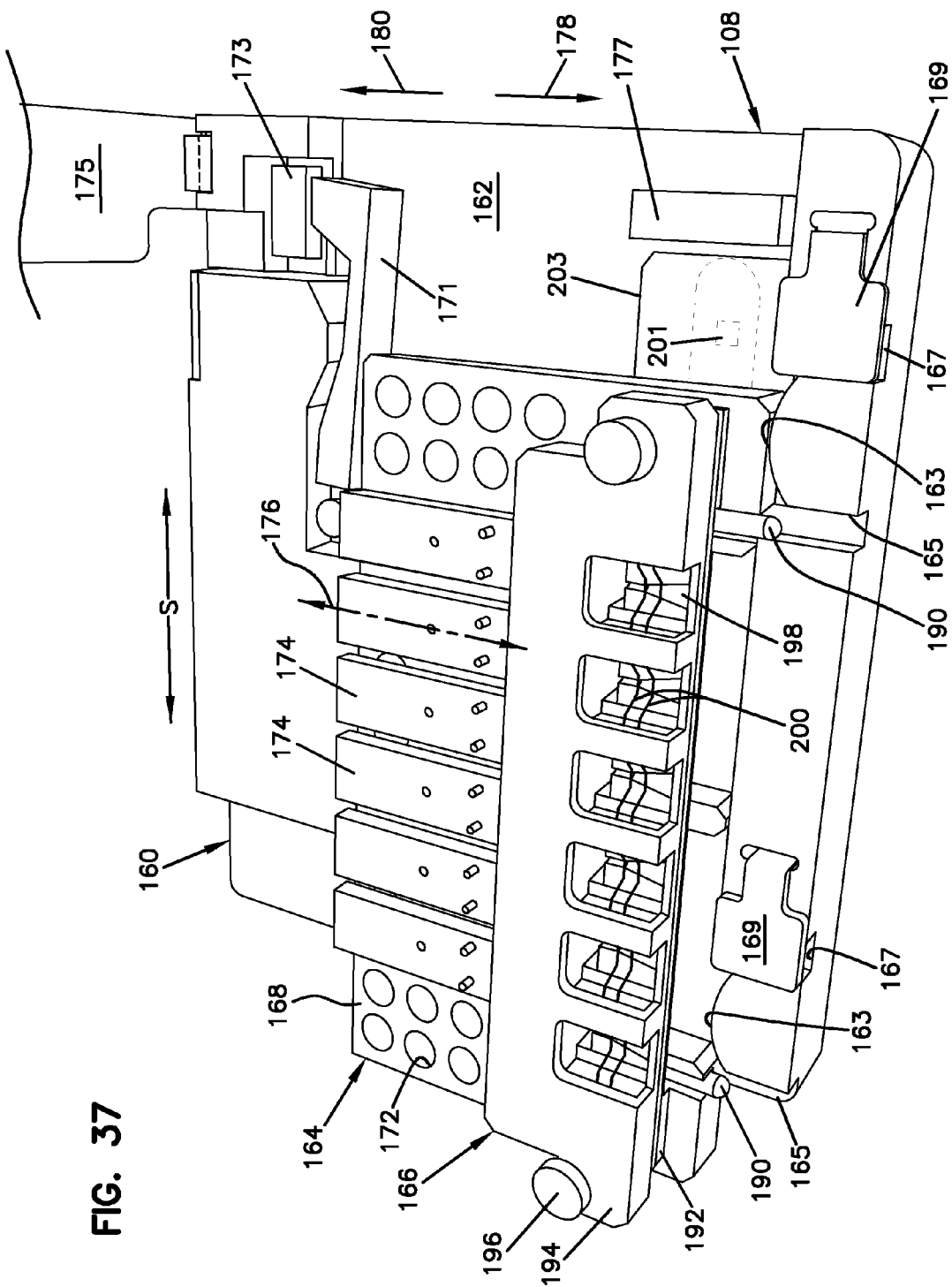
FIG. 37 is an enlarged view of another example overmold station suitable for use in the processing cell of FIG. 7.

FIG. 37 illustrates an example implementation of the overmold tool 160 that automatically applies pressure to the actuator pins 190 as the holder fixture 164 is moved across the base 162 of the overmold tool 160. In certain examples, the overmold tool 160 is configured to enable the holder fixture 164 to slide across the base 162 along a slide axis S. In examples, the slide axis S is generally orthogonal to the front-to-rear axis 176. In certain examples, the base 162 includes a stop member 177 disposed at one end of the diffuser 203 to inhibit continued sliding motion of the holder fixture 164.

In certain implementations, the base 162 includes one or more camming surfaces 163 along which ends of the actuator pins 190 ride when the holder fixture 164 is moved (e.g., slid) across the base 162. The camming surfaces 163 are shaped so that the actuator pins 190 are moved towards the holder mounts 174 as the actuator pins ride along the camming surfaces 163. In examples, the camming surfaces 163 define a convex curvature extending towards the holder mounts 174. In an example, the base 162 includes two camming surfaces 162 that are spaced from each other along the slide axis S. In other examples, the base 162 can include any desired number of camming surfaces 162.

First recesses 165 are defined at first ends of the camming surfaces 163 and second recesses 167 are defined at second ends of the camming surfaces 163. The first recesses 165 are sized and structured to receive the actuator pins 190 without applying pressure to the actuator pins 190 when the holder fixture 164 is mounted to the base 162. The second recesses 167 are sized and structures to receive the actuator pins 190 without applying pressure to the actuator pins 190 when the actuator pins 190 clear the camming surfaces 163.

In certain examples, covers 169 can selectively extend across the second recesses 167 to inhibit access to the second recesses 167 through a top of the second recesses 167. Rather, in certain examples, the actuator pins 190 can access the second recesses 167 only by sliding into the second recesses 167 along the slide axis S. In an example, the covers 169 are hinged or otherwise movable between open and closed positions. When closed, the covers 169 extend across the open tops of the second recesses 167, thereby inhibiting the actuator pins 190 from accessing the second recesses 167 except by movement along the slide axis S. When open, the covers 169 enable the actuator pins 190 to be passed through the open tops of the second recesses 167. For example, the covers 169 enable the holder fixture 164 to be lifted off the base 162 while the actuator pins 190 are disposed in the second recesses 167 while inhibiting the holder fixture 164 to be mounted to the base 162 in such a position along the slide axis S that the actuator pins 190 would be disposed in the second recesses 167. In other words, the covers 169 encourage a user to mount the holder fixture 164 to the base 162 at a position along the slide axis S that the actuator pins 190 would be disposed in the first recesses 165.

In certain examples, the base 162 can include a sensor 173 and an actuator arm 171. The actuator arm 171 is configured to actuate the sensor 173 when the holder fixture 174 is moved across the base 162 towards the stop member 177. For example, in some implementations, the actuator arm 171 is sufficiently flexible that a distal end of the actuator arms 171 deflects towards the sensor 173. In other implementations, the actuator arm 171 is pivotally mounted to the base 162 so that a distal end of the actuator arms 171 deflects towards the sensor 173. In certain examples, a cover 175 can selectively cover the sensor 173 and/or the actuator arm 171 (or portion thereof). In an example, the cover 175 is hinged or otherwise movable between a covered position and an uncovered position.

In certain examples, the actuator arm 171 is configured to actuator the sensor 173 when the actuator pins 190 reach a peak of the camming surfaces 163. In such examples, the sensor 173 can trigger activation of the light source 201, thereby allowing a user to view the optical splices to determine whether any breakage has occurred. In certain examples, the actuator arm 171 is configured to actuate the sensor 173 when the holder fixture 164 reaches the stop member 177, which demarks a filling position of the overmold tool 160. In such examples, the sensor 173 can activate the light source 201 to enable a user to view the injection of the material into the hub shells 62. In certain examples, the sensor 173 can initiate the filling procedure. In certain examples, the actuator arm 171 is configured to actuator the sensor 173 when the holder fixture 164 reaches both the peak position and the stop position.

In use, a user mounts the cable holders 280 onto their corresponding holder mounts 174 and the outer hub shells 62 into the cavities 198 as described above. In some examples, the cable holders 280 and outer hub shells 62 are mounted while the holder fixture 164 is separated from the base 162. In such examples, the holder fixture 164 is then mounted to the base 162 at a first position where the actuator pins 190 of the holder fixture 164 align with the first recesses 165. In other examples, the cable holders 280 and outer hub shells 62 are mounted while the holder fixture 164 is mounted to the base 162 at the first position.

A user then slides the holder fixture 164 across the base 162 along the slide axis S. As the user slides the holder fixture 164 across the base 162, the actuator pins 190 leave the first recesses 165 and cam along the camming surfaces 163, thereby traveling rearwardly away from the cavities 198. Movement of the actuator pins 190 causes movement of the actuator mounts 174 relative to the cavities 198, which applies additional tension to the optical splices. When the actuator pins 190 reach the peak of the camming surfaces 163, the user determines whether any of the splices have broken.

If a predetermined number of splices have broken (e.g., one splice, two splices, etc.), then the user removes the holder fixture 164 without injecting material into the hub shells 62. In an example, the user can lift the holder fixture 164 away from the base 162 while the actuator pins 190 are disposed at the peak. In another example, the user can slide the holder fixture 164 back to the start position and lift the holder fixture 164 away from the base 162. In another example, the user can continue sliding the holder fixture 164 until the pins 190 reach the second recesses 167 and remove the holder fixture 164 from the base 162.

If a predetermined number of splices remain intact (e.g., all of the splices, most of the splices, etc.), then the user continues moving the holder fixture 164 along the slide axis S to the stop member 177. When the holder fixture 164 abuts the stop member 177, the actuator pins 190 are disposed at the second recesses 167. When the holder fixture 164 is disposed at the stop position (i.e., abutting the stop member 177), the cavities 198 are aligned with overmold injectors for a filling operation. Accordingly, in certain examples, the holder fixture 164 may cause deflection of the actuator arm 171 to actuate the sensor 173 to automatically trigger the filling operation.

Figure 38:
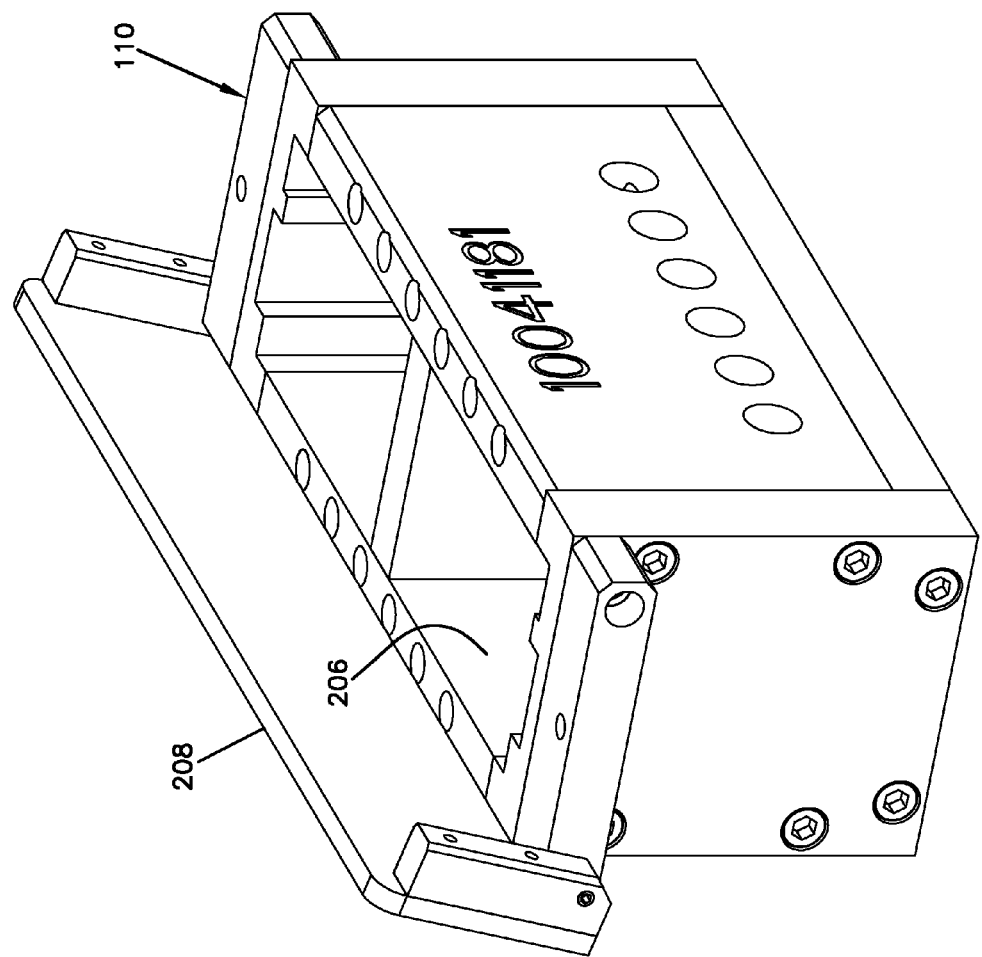
FIG. 38 is an enlarged view of an example UV cure station suitable for use in the processing cell of FIG. 7.
Figure 39:
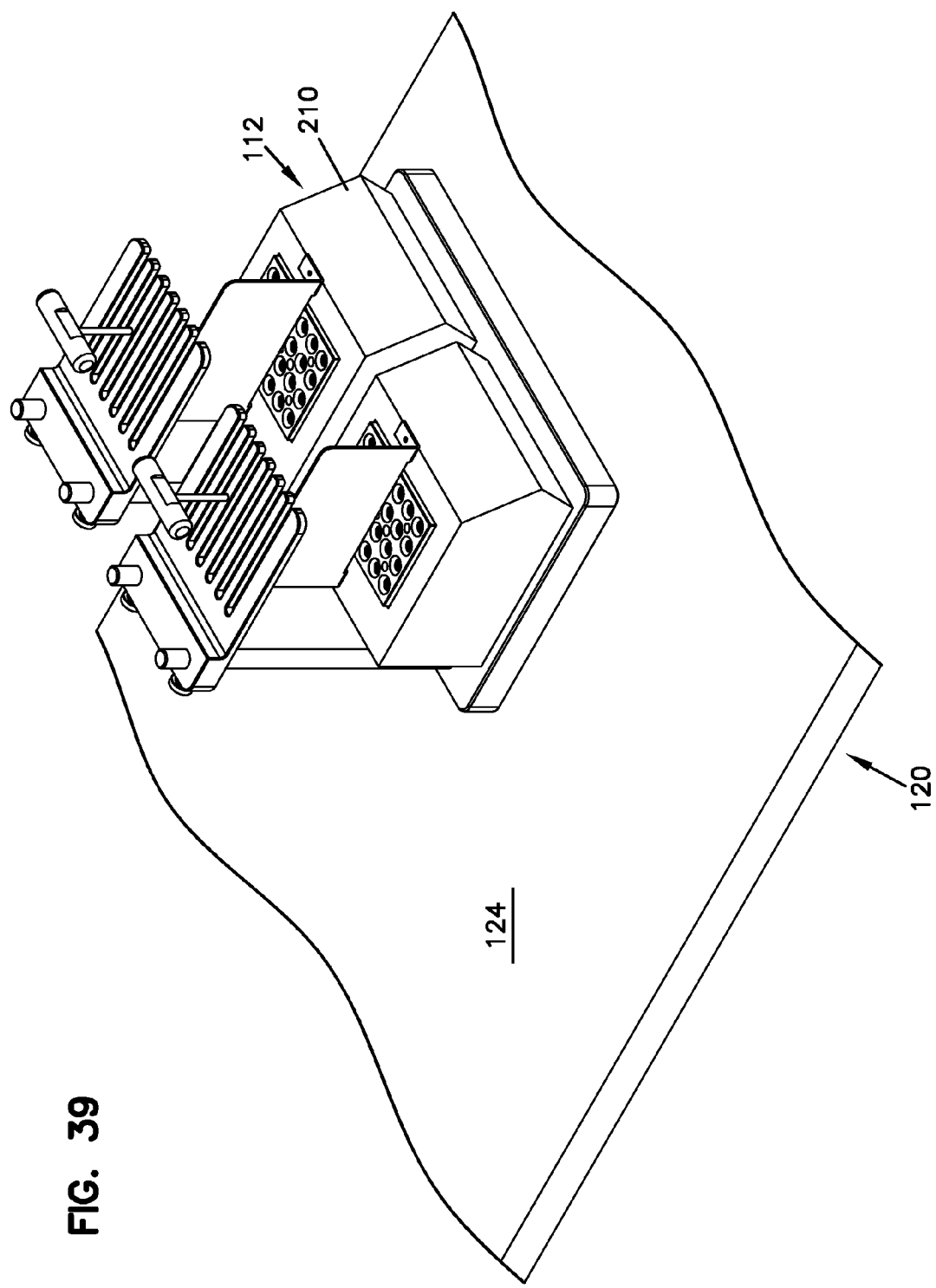
FIG. 39 is an enlarged view of an example heat cure station suitable for use in the processing cell of FIG. 7.

After the overmold material has been injected into the outer hub shells 62, the holder fixture 164 with the overmold fixture 166 mounted thereon is removed from the base 162 and moved to the UV cure station 110. Storage spools holding the cables 22 are slid along the track 144 towards the UV cure station 110. FIG. 38 illustrates one example UV cure station 110 suitable for use in the processing cell 100. The UV cure station 110 includes a UV light chamber 206 that is recessed within the main table 120 (see FIG. 7). One or more sources of UV radiation are provided within the UV light chamber 206. The UV light chamber 206 also includes a top cover 208 that, when closed, is generally flush with the top side of the main table 120 (e.g., see FIG. 7).

To UV cure the overmold material within the outer hub shells 62, a front end of the holder fixture 164 at which the overmold fixture 166 is mounted is inserted into the UV light chamber 206. The cover 208 is then partially closed and the source of UV light within the light chamber 206 is activated to cure the overmold material within the outer hub shells 62. It will be appreciated that the overmold fixture 166 as well as the outer hub shells 62 are made of materials that allow UV light to be transmitted therethrough so as to reach the overmold material within the interior cavities 64 of the outer hub shells 62. Because the ferrule assemblies 38 and cables 22 are secured to the holder fixture 164 and the overmold fixture 166 during the curing process, the cable assemblies 20 remain secure during transit of the cable assemblies 20 from the overmold station 108 to the UV cure station 110.

After the overmold material has been adequately cured at the UV cure station 110, the cables assemblies 20 including the ferrule assemblies 38 are detached from the holder fixture 164 and the overmold fixture 166. In certain examples, the cable holders 280 are removed from the fiber optic cables 22. Thereafter, the fiber optic cable assemblies 20 can be moved (e.g., via the tracks 144) to the heat cure station 112 where the ferrule assemblies are inserted into one or more ovens 210 where final curing of the overmold material takes place through the application of heat.

After curing, the fiber optic connectors 24 are assembled around the cured ferrule assemblies 38. In preparation for assembly, various components of the fiber optic connectors 24 can be loaded over the optical fiber 26 prior to splicing the optical fiber stubs 54 to the optical fibers 26 of the fiber optic cables 22. For example, the boot 50, the crimp sleeve 48, the rear housing 46, and the spring 36 all can be preloaded over the optical fiber 26 prior to splicing the optical fiber 26 to its corresponding optical fiber stub 54. The various components can be slid up the fiber optic cable 22 and held in place by a holder or other structure so as to not interfere with the strip-clean-cleave processing, the fusion splicing, the overmolding, or the curing operations.

Figure 40:
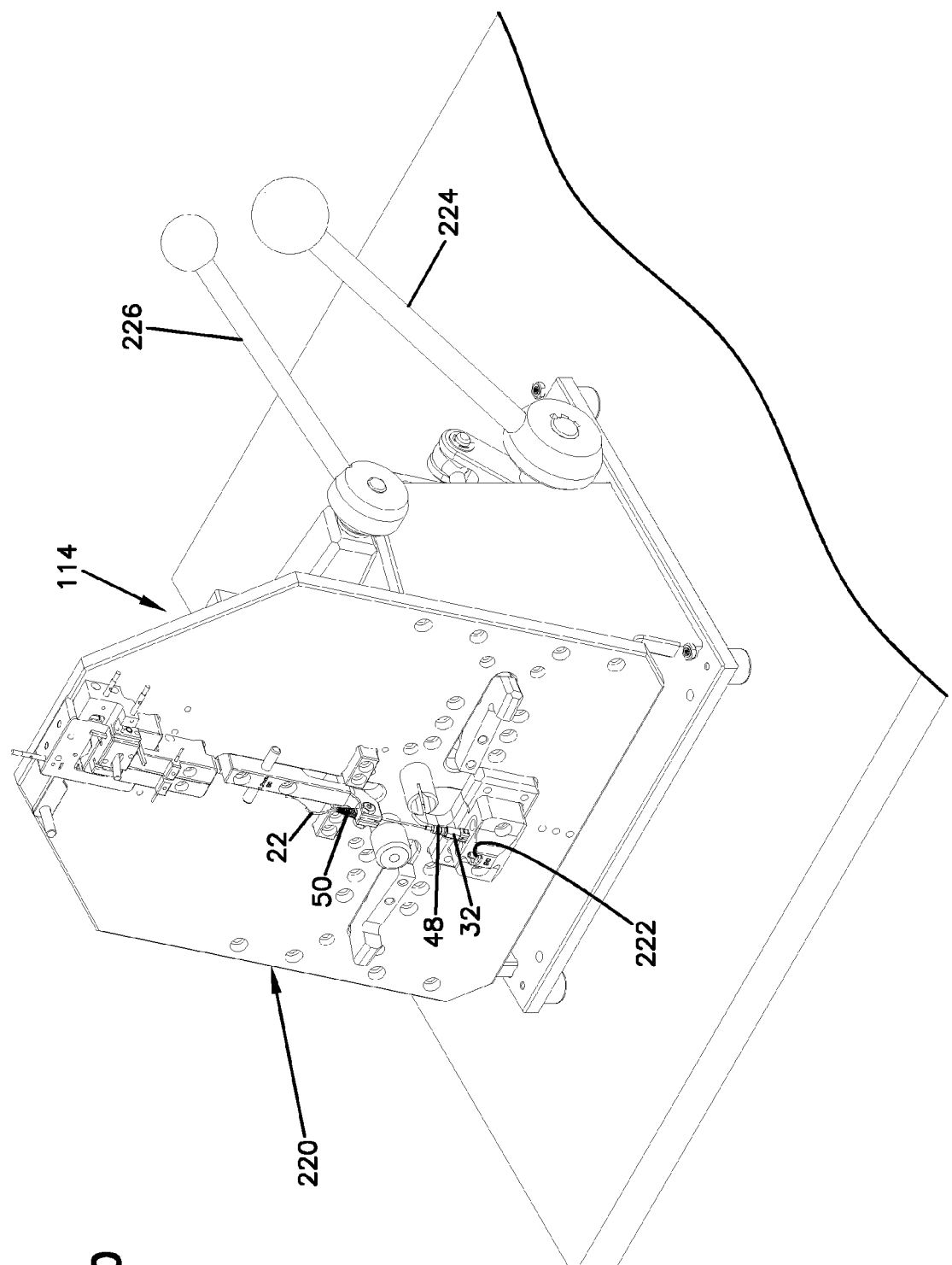
FIG. 40 is an enlarged view of an example connector assembly station suitable for use in the processing cell of FIG. 7.

The various components of the fiber optic connectors 24 are assembled together at the connector assembly station 114. FIG. 40 illustrates one example connector assembly station 114 including a connector assembly tool 220. The connector assembly tool 220 includes a pocket 222 into which the main connector body 32 of the fiber optic connector 24 is loaded. The ferrule assembly 38 and the spring 36 are then slid into the main connector body 32 through the back end of the main connector body 32. Thereafter, a first actuator 224 of the connector assembly tool 220 presses the rear housing 46 into the rear end of the main connector body 32 thereby snapping the two pieces together. In certain examples, the first actuator 224 can include a lever actuated clamp, a hydraulic clamp, a pneumatic clamp, or another type of mechanism for axially pressing the rear housing 46 into the rear end of the main connector body 32. In other implementations, the connector assembly station 114 can include a hand tool that snaps together the ferrule assembly 38 and the connector body 32.

The operator then positions the mechanical reinforcing structure 30 (e.g., aramid yarn such as Kevlar®) of the fiber optic cable 22 uniformly about the rear end of the rear housing 46 and slides the crimp sleeve 48 over the rear end of the rear housing 46 such that the mechanical reinforcing structure 30 is captured between the crimp sleeve 48 and the rear housing 46. Next, the operator actuates a second actuator 226 that automatically crimps the crimp sleeve 48 about the rear end of the rear housing 46, thereby anchoring the mechanical reinforcing structure 30 of the fiber optic cable 22 to the rear housing 46. In certain examples, the second actuator 226 can include a lever actuated clamp, a hydraulic clamp, a pneumatic clamp, or another type of mechanism for radially compressing the crimp sleeve 48. Once crimping has been completed, the connector boot 50 can be slid over the crimp sleeve 48 and rear end of the rear housing 46, thereby completing the assembly of the fiber optic connector 24.

After assembly of the fiber optic connector 24, the fiber optic cable assembly 20 is moved along the track 144 to the test station 116. Light is shown into the ferrule 52 to ensure that the cable 22 is functioning properly. In certain implementations, the test station 116 is a non-contact test station. For example, the test station 116 can be configured to direct an optical signal into the optical fiber held by the ferrule 52 without touching the ferrule 52 to another ferrule or any other reference (i.e., master) connector.

As shown in FIGS. 41-43, the non-contact test station includes a testing device 230 including a receptacle 232 sized for receiving the fiber optic connector 24. The testing device 230 also includes an arrangement for injecting light into the receptacle. In one example, the arrangement includes a light source 234, a launching fiber 236, and lenses 238. The light injecting arrangement is configured to provide a low loss transmission of light into the fiber optic connector 24 without physically contacting the launching fiber 236 to an end face of the optical fiber stub 54. For example, the light source 234 injects light through the launching fiber 236 to the lenses 238. The lenses 238 expand the light and then refocus the light on the end face of the optical fiber stub 54.

The receptacle 232 is configured to receive the fiber optic connector 24 in a repeatable position. The receptacle 232 can also include an alignment structure such as a V-groove 242 (FIG. 42) that engages the ferrule 52 along two lines of contact. A clamp 244, such as a spring-biased clamp, can be used to press the ferrule 52 into the V-groove 242. In one example, the receptacle 232 includes a stop 240 (FIG. 43) that engages the end face of the ferrule 52 when the fiber optic connector 24 is inserted in the receptacle 232. For example, as shown in FIG. 43, an example ferrule 52 has an annular sidewall 55, an end face 51 through which the stub fiber 54 is accessible, and a chamfered surface 53 extending radially outwardly from the end face 51 to the annular sidewall 55. The V-groove 242 and clamp 244 contact the sidewall 55. The stop 240 contacts the end face 51. In an example, the end face 51 extends generally perpendicular to a longitudinal axis of the stub fiber 54. In another example, the end face 51 can be angled (e.g., no more than about 10°, about 7°, about 5°) relative to the longitudinal axis of the stub fiber 54.

In some implementations, the receptacle 232 can include a catch that interfaces with the latch of the fiber optic connector 24 such that the fiber optic connector 24 is retained within the receptacle 232. The catch can be spaced a predetermined distance from the stop 240 such that the ferrule 52 is pushed back a predetermined distance against the spring 36 when the connector 24 is secured within the receptacle 232. The predetermined distance that the ferrule 52 is pushed back against its corresponding spring 36 is selected so as to replicate the degree of displacement that would typically take place when two connectors are optically coupled together through a fiber optic adapter. In this way, any deformation or flexing of the optical fiber 26 that would occur within the fiber optic connector 24 when used in the field is taken into consideration during testing.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A processing system to connectorize optical cables, the processing system comprising:
   a table arrangement on which a plurality of processing stations are disposed;
   a track arrangement that is disposed above the table arrangement and from which coils of the optical cables to be connectorized are hung;
   wherein the processing stations include:
      a strip-clean-cleave station configured to process optical fibers at the end of the optical cables to create a prepared end of the optical fiber;
      a splice station configured to fusion splice the prepared ends of the optical fibers to prepared ends of stub fibers at a splice location, each stub fiber being held by a respective ferrule;
      an overmold station configured to injection mold a hub around each splice location;
      a UV cure station at which UV light is directed towards the hubs to cure the injection mold;
      a heat cure station including an oven configured to receive the ends of the optical cables to finish curing the injection mold; and
      a connector assembly station at which an optical connector is assembled around each hub and respective ferrule; and
   a second strip-clean-cleave station disposed at a separate location from the table arrangement, the second strip-clean-cleave station configured to prepare an end of a fiber stub extending from a ferrule.

2. The processing system of claim 1, wherein the processing stations also include a non-contact testing station including a receptacle to receive each assembled optical connector, and a light source to direct light into the assembled connector to determine coupling loss of the optical cable.

3. The processing system of claim 1, wherein the table arrangement includes a main table and a separate table, wherein the strip-clean-cleave station is disposed at the main table, and wherein the splice station is disposed at the separate table.

4. The processing system of claim 1, wherein the table arrangement includes a first processing line and a second processing line, wherein the first processing line includes the splice station, the overmold station, the UV cure station, the heat cure station, and the connector assembly station, and wherein the second processing line includes a second splice station, a second overmold station, a second UV cure station, a second heat cure station, and a second connector assembly station.

5. The processing system of claim 4, wherein the first and second processing lines share the strip-clean-cleave station.

6. The processing system of claim 4, wherein the first processing line includes the non-contact testing station and the second processing line includes a second non-contact testing station.

7. The processing system of claim 4, wherein the table arrangement is U-shaped including two arm sections extending from a base section, wherein the strip-clean-cleave station is located at the base section, and wherein each of the processing lines extends along part of the base section and along a separate one of the arm sections.

8. The processing system of claim 4, wherein the track arrangement includes a first track disposed over the first processing line and a second track disposed over the second processing line.

9. The processing system of claim 1, further comprising a carrier configured to transport a plurality of processed fiber stubs from the second strip-clean-cleave station to the table arrangement, the carrier inhibiting contamination of the processed fiber stubs.

10. The processing system of claim 9, wherein the carrier defines a plurality of cavities in which the processed fiber stubs can be loaded, the carrier being configured to retain the ferrules holding the processed fiber stubs and to not contact bare glass of the processed fiber stubs.

11. The processing system of claim 10, wherein the carrier is configured to receive the processed stub fibers with dust caps mounted over the ferrules.

12. The processing system of claim 11, wherein the carrier is configured to transport at least fifty processed stub fibers.

13. The processing system of claim 1, wherein the overmold station also performs tensile testing on the splice location.

14. The processing system of claim 1, wherein the UV cure station includes a chamber recessed within the table arrangement.

15. A strip-clean-cleave arrangement configured to prepare an end of an optical fiber that is retained by a holder, the strip-clean-cleave arrangement comprising:
a body at which a plurality of sub-stations are disposed, the body having an input end and an output end;
a walking beam configured to automatically transport the optical fiber between the sub-stations from the input end to the output end using the holder; and
a control unit configured to automatically operate the sub-stations and the walking beam during an operation cycle;
wherein the plurality of sub-stations includes:
a load sub-station at the input end of the body;
a strip sub-station at which a coating is removed from the optical fiber;
a clean sub-station at which remnants of the coating are removed from the optical fiber by an ultrasonic bath;
a cleave sub-station at which an end of the optical fiber is severed to form a prepared end of the optical fiber; and
an unload sub-station at the output end of the body, wherein the load and unload sub-stations are configured to move between inner and outer positions, wherein the load and unload sub-stations are in range of the walking beam when in the respective inner positions, and wherein the load and unload sub-stations are accessible to a user when in the respective outer position.

16. The strip-clean-cleave arrangement of claim 15, wherein the cleave-substation includes a tension cleaver to sever the end of the optical fiber.

17. The strip-clean-cleave arrangement of claim 15, wherein the clean sub-station includes two docks at each of which a separate optical fiber can be received at the ultrasonic bath.

18. The strip-clean-cleave arrangement of claim 17, wherein each of the docks is configured to angle the optical fiber relative to a vibrating floor of the ultrasonic bath.

19. The strip-clean-cleave arrangement of claim 15, wherein the clean sub-station is structured so that the end of the optical fiber touches a vibrating floor of the ultrasonic bath during operation of the clean-substation.

20. The strip-clean-cleave arrangement of claim 15, wherein the clean sub-station includes a leveler arrangement that maintains a level of cleaning fluid within the ultrasonic bath.

21. The strip-clean-cleave arrangement of claim 20, wherein the leveler arrangement includes a leveler tank that drains to a supply tank, a siphon that extends between the leveler tank and the ultrasonic bath, and a piston that pumps water into the leveler tank.

22. The strip-clean-cleave arrangement of claim 15, further comprising a guard arrangement coupled to the body to at least partially surround the sub-stations, the guard arrangement defining apertures through which the load and unload stations are accessible.

23. The strip-clean-cleave arrangement of claim 22, wherein the guard arrangement includes a light curtain extending across the apertures, wherein breaking the light curtain triggers the control unit to pause operation of the walking beam.

24. The strip-clean-cleave arrangement of claim 15, wherein at least one of the sub-stations includes a presence sensor for the holder, and wherein the at least one of the sub-stations operates during the operation cycle of the strip-clean-cleave arrangement only if a presence of the holder is detected by the presence sensor.

25. The strip-clean-cleave arrangement of claim 15, wherein the load sub-station also includes a heating unit configured to straighten a jacket disposed around the optical fiber.

26. A processing system to connectorize optical cables, the processing system comprising:
a table arrangement on which a plurality of processing stations are disposed, the table arrangement including a first processing line of the processing stations and a second processing line of the processing stations, wherein the table arrangement is U-shaped including two arm sections extending from a base section, and wherein each of the processing lines extends along part of the base section and along a separate one of the arm sections;
a track arrangement that is disposed above the table arrangement and from which coils of the optical cables to be connectorized are hung;
wherein the processing stations of the first processing line include:
a strip-clean-cleave station located at the base section, the strip-clean-cleave station being configured to process optical fibers at the end of the optical cables to create a prepared end of the optical fiber;
a splice station configured to fusion splice the prepared ends of the optical fibers to prepared ends of stub fibers at a splice location, each stub fiber being held by a respective ferrule;

an overmold station configured to injection mold a hub around each splice location;

a UV cure station at which UV light is directed towards the hubs to cure the injection mold;

a heat cure station including an oven configured to receive the ends of the optical cables to finish curing the injection mold; and a connector assembly station at which an optical connector is assembled around each hub and respective ferrule;

wherein the processing stations of the second processing line include a second splice station, a second overmold station, a second UV cure station, a second heat cure station, and a second connector assembly station.

27. A processing system to connectorize optical cables, the processing system comprising:

a table arrangement on which a plurality of processing stations are disposed;

a track arrangement that is disposed above the table arrangement and from which coils of the optical cables to be connectorized are hung;

wherein the processing stations include:

a strip-clean-cleave station configured to process optical fibers at the end of the optical cables to create a prepared end of the optical fiber;

a splice station configured to fusion splice the prepared ends of the optical fibers to prepared ends of stub fibers at a splice location, each stub fiber being held by a respective ferrule;

an overmold station configured to injection mold a hub around each splice location;

a UV cure station at which UV light is directed towards the hubs to cure the injection mold, wherein the UV cure station includes a chamber recessed within the table arrangement;

a heat cure station including an oven configured to receive the ends of the optical cables to finish curing the injection mold; and a connector assembly station at which an optical connector is assembled around each hub and respective ferrule.

28. A strip-clean-cleave arrangement configured to prepare an end of an optical fiber that is retained by a holder, the strip-clean-cleave arrangement comprising:

a body at which a plurality of sub-stations are disposed, the body having an input end and an output end;

a walking beam configured to automatically transport the optical fiber between the sub-stations from the input end to the output end using the holder; and a control unit configured to automatically operate the sub-stations and the walking beam during an operation cycle;

wherein the plurality of sub-stations includes:

a load sub-station at the input end of the body;

a strip sub-station at which a coating is removed from the optical fiber;

a clean sub-station at which remnants of the coating are removed from the optical fiber by an ultrasonic bath, wherein the clean sub-station is structured so that the end of the optical fiber touches a vibrating floor of the ultrasonic bath during operation of the clean-substation;

a cleave sub-station at which an end of the optical fiber is severed to form a prepared end of the optical fiber; and an unload sub-station at the output end of the body.

29. A strip-clean-cleave arrangement configured to prepare an end of an optical fiber that is retained by a holder, the strip-clean-cleave arrangement comprising:

a body at which a plurality of sub-stations are disposed, the body having an input end and an output end;

a walking beam configured to automatically transport the optical fiber between the sub-stations from the input end to the output end using the holder; and a control unit configured to automatically operate the sub-stations and the walking beam during an operation cycle;

wherein the plurality of sub-stations includes:

a load sub-station at the input end of the body;

a strip sub-station at which a coating is removed from the optical fiber;

a clean sub-station at which remnants of the coating are removed from the optical fiber by an ultrasonic bath, wherein the clean sub-station includes a leveler arrangement that maintains a level of cleaning fluid within the ultrasonic bath, wherein the leveler arrangement includes a leveler tank that drains to a supply tank, a siphon that extends between the leveler tank and the ultrasonic bath, and a piston that pumps water into the leveler tank;

a cleave sub-station at which an end of the optical fiber is severed to form a prepared end of the optical fiber; and an unload sub-station at the output end of the body.

* * * * *